United States Patent
Kwak et al.

(10) Patent No.: US 12,537,585 B2
(45) Date of Patent: Jan. 27, 2026

(54) METHODS, ARCHITECTURES, APPARATUSES AND SYSTEMS FOR DYNAMIC DETERMINATION OF PROCESSING TIME

(71) Applicant: InterDigital Patent Holdings, Inc., Wilmington, DE (US)

(72) Inventors: Young Woo Kwak, Woodbury, NY (US); Moon Il Lee, Melville, NY (US); Paul Marinier, Brossard (CA); Ghyslain Pelletier, Montréal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 411 days.

(21) Appl. No.: 18/015,406

(22) PCT Filed: Jul. 27, 2021

(86) PCT No.: PCT/US2021/070984
§ 371 (c)(1),
(2) Date: Jan. 10, 2023

(87) PCT Pub. No.: WO2022/027012
PCT Pub. Date: Feb. 3, 2022

(65) Prior Publication Data
US 2023/0318686 A1    Oct. 5, 2023

Related U.S. Application Data

(60) Provisional application No. 63/167,375, filed on Mar. 29, 2021, provisional application No. 63/057,013, filed on Jul. 27, 2020.

(51) Int. Cl.
*H04B 7/00* (2006.01)
*H04B 7/0404* (2017.01)
(Continued)

(52) U.S. Cl.
CPC ....... *H04B 7/06956* (2023.05); *H04B 7/0404* (2013.01); *H04B 7/088* (2013.01)

(58) Field of Classification Search
CPC .. H04B 7/06956; H04B 7/0404; H04B 7/088; H04B 7/0639; H04B 7/0695;
(Continued)

(56) References Cited

U.S. PATENT DOCUMENTS

2019/0260456 A1* 8/2019 Zhou ............... H04L 1/18
2020/0029274 A1* 1/2020 Cheng ............. H04B 17/309
(Continued)

FOREIGN PATENT DOCUMENTS

WO   WO 2019099659 A1   5/2019
WO   WO 2020030010 A1   2/2020

OTHER PUBLICATIONS

"New SID: Study on supporting NR from 52.6GHz to 71 GHz", 3GPP Tdoc RP-193259, 3GPP TSG RAN Meeting #86, Sitges, Spain, Dec. 9-12, 2019, 3 pages.
(Continued)

*Primary Examiner* — Md K Talukder
(74) *Attorney, Agent, or Firm* — Jamie T. Nguyen

(57) ABSTRACT

Procedures, methods, architectures, apparatuses, systems, devices, and computer program products are disclosed that may be implemented in wireless transmit/receive unit (WTRU). In one representative method, the WTRU may determine a processing time value and/or type from among a plurality of processing time values and/or types and the method may include sending, by the WTRU to a network entity, a first message indicating the determined processing time value and/or type and receiving a second message indicating a confirmation of the determined processing time value and/or type. The method further may include applying, after receiving the confirmation of the determined process-
(Continued)

ing time value type, the determined processing time value and/or type to processing of a target associated with the determined processing time value and/or type.

20 Claims, 40 Drawing Sheets

(51) Int. Cl.
*H04B 7/06* (2006.01)
*H04B 7/08* (2006.01)

(58) Field of Classification Search
CPC .. H04B 7/0617; H04B 7/0628; H04B 7/0691; H04W 72/0446; H04W 72/1263; H04W 72/231; H04W 72/232
See application file for complete search history.

(56) References Cited

U.S. PATENT DOCUMENTS

| 2020/0288479 | A1* | 9/2020 | Xi | H04L 5/0092 |
| 2021/0168714 | A1 | 6/2021 | Guan et al. | |
| 2023/0318686 | A1* | 10/2023 | Kwak | H04B 7/0639 455/101 |

OTHER PUBLICATIONS

"New WID on Extending current NR operation to 71 GHz", 3GPP Tdoc RP-193229, 3GPP TSG RAN Meeting #86, Sitges, Spain, Dec. 9-12, 2019, 5 pages.
3rd Generation Partnership Project; Technical Specification Group Radio Access Network;Study on requirements for NR beyond 52.6 GHz (Release 16); 3GPP TR 38.807 V16.0.0 (Dec. 2019), 68 pages.
"New SID: Study on NR beyond 52.6GHz", 3GPP Tdoc RP-181435, 3GPPTSG RAN Meeting #80, La Jolla, USA, Jun. 11-14, 2018, 4 pages.
3rd Generation Partnership Project; Technical Specification Group Radio Access Network; NR; Radio Resource Control (RRC) protocol specification (Release 15); 3GPP TS 38.331 V15.4.0 (Dec. 2018); 474 pages.
3rd Generation Partnership Project; Technical Specification Group Radio Access Network; NR; Physical layer procedures for control (Release 15), 3GPP TS 38.213 V15.3.0, Sep. 2018, 101 pages.
3rd Generation Partnership Project; Technical Specification Group Radio Access Network; NR; Medium Access Control (MAC) protocol specification (Release 15); 3GPP TS 38.321 V15.1.0, Mar. 2018, 67 pages.
3rd Generation Partnership Project; "Technical Specification Group Radio Access Network; Study on Scenarios and Requirements for Next Generation Access Technologies; (Release 16)," 3GPP TR 38.913 V16.0.0 (Jul. 2020).
3rd Generation Partnership Project; Technical Specification Group Radio Access Network; Study on New Radio access technology; 60 GHz unlicensed spectrum (Release 14), 3GPP TR 38.805 V14.0.0 (Mar. 2017), 17 pages.

* cited by examiner

| Region | Country | Frequency (GHz) | | | | | | | | | |
|---|---|---|---|---|---|---|---|---|---|---|---|
| | | 52.6-54.25 | 54.25-55.78 | 55.78-56.9 | 56.9-57 | 57-58.2 | 58.2-59 | 59-59.3 | 59.3-64 | 64-65 | 65-66 | 66-71[1)] |
| ITU Region 1 | Europe/CEPT | | | | | U (Mobile) | U (Mobile) | U (Mobile) | U (Mobile) | U (Mobile) | | |
| | Israel | | | | | | | | | | | |
| | South Africa | | | | | U (Mobile) | U (Mobile) | U (Mobile) | U (Mobile) | U (Mobile) | U (Mobile) | |
| ITU Region 2 | USA | | | | | U (Mobile) | U (Mobile) | U (Mobile) | U (Mobile) | U (Mobile) | U (Mobile) | |
| | Canada | | | | | U (Mobile) | U (Mobile) | U (Mobile) | U (Mobile) | | | |
| | Brazil | | | | | U (Mobile) | U (Mobile) | U (Mobile) | U (Mobile) | | | |
| | Mexico | | | | | U (Mobile) | U (Mobile) | U (Mobile) | U (Mobile) | | | |
| ITU Region 3 | China | | | | | U (Mobile) | | U (Mobile) | U (Mobile) | | | |
| | Japan | | | | | U (Mobile) | U (Mobile) | U (Mobile) | U (Mobile) | | U (Mobile) | |
| | Korea | | | | | U (Mobile) | U (Mobile) | U (Mobile) | U (Mobile) | | | |
| | India | | | | | U (Mobile) | U (Mobile) | U (Mobile) | U (Mobile) | | U (Mobile) | |
| | Taiwan | | | | | U (Mobile) | U (Mobile) | U (Mobile) | U (Mobile) | | | |
| | Singapore | | | | | U (Mobile) | U (Mobile) | U (Mobile) | U (Mobile) | | | |
| | Australia | | | | | U (Mobile) | U (Mobile) | U (Mobile) | U (Mobile) | | | |

Note 1: Access Regime Currently Under Discussion in CEPT

| Region | Country | Frequency (GHz) | | | | | | | | | |
|---|---|---|---|---|---|---|---|---|---|---|---|
| | | 71-74[1] | 74-76[1] | 76-77 | 77-81 | 81-84[1] | 84-86[1] | 86-92 | 92-94 | 94-94.1 | 94.1-95 | 95-100 |
| ITU Region 1 | Europe/CEPT | L (Fixed) | | | | L (Fixed) | | | L (Fixed) | | L (Fixed) | |
| | Israel | L (Fixed) | L (Fixed) | | | L (Fixed) | L (Fixed) | | | | | |
| | South Africa | L (Fixed/Mobile) | L (Fixed/Mobile) | | | L (Fixed/Mobile) | L (Fixed/Mobile) | | L (Fixed/Mobile) | | L (Fixed/Mobile) | |
| ITU Region 2 | USA | L (Fixed) | L (Fixed) | | | L (Fixed) | L (Fixed) | | | | | |
| | Canada | L (Fixed) | L (Fixed) | | | L (Fixed) | L (Fixed) | | | | | |
| | Brazil | L (Fixed) | L (Fixed) | | | L (Fixed) | L (Fixed) | | | | | |
| | Mexico | L (Fixed) | L (Fixed) | | | | | | | | | |
| ITU Region 3 | China | | | | | | | | | | | |
| | Japan | L (Fixed) | L (Fixed) | | | L (Fixed) | L (Fixed) | | | | | |
| | Korea | L (Fixed) | L (Fixed) | | | L (Fixed) | L (Fixed) | | | | | |
| | India | | | | | | | | | | | |
| | Taiwan | L (Fixed) | L (Fixed) | | | L (Fixed) | L (Fixed) | | | | | |
| | Singapore | L (Fixed) | L (Fixed) | | | L (Fixed) | | | | | | |
| | Australia | | | | | | | | | | | |

Note 1: Candidate Frequency Band for IMT Identification Under WRC-19 AI 1.13

| $\mu$ | $\Delta f = 2^\mu \cdot 15$ [kHz] | Cyclic Prefix |
|---|---|---|
| 0 | 15 | Normal |
| 1 | 30 | Normal |
| 2 | 60 | Normal, Extended |
| 3 | 120 | Normal |
| 4 | 240 | Normal |

```
┌─────────────────────────────────────────────────────────────────┐
│ Sending Beam Switching Capability Information Indicating a Set of Beam │
│ Switching Time Values, Wherein the Beam Switching Time Values in the │
│ Set are based on Panel, Beam, and/or Transmission Reception Point TRP │
│ Information, and Wherein the Panel, Beam and/or TRP Information │ — 2310
│ Comprises Any of a Number of Active Panels, a Number of Active Beams, │
│ a Number of Inactive Panels Associated with Active Beams, and/or a │
│ Number of TRPS │
└─────────────────────────────────────────────────────────────────┘
                                  ↓
┌─────────────────────────────────────────────────────────────────┐
│ Receiving Information Indicating Beam Switching to a First Beam of a Set │ — 2320
│ of One or More Active Beams for a Physical Control Channel Transmission │
└─────────────────────────────────────────────────────────────────┘
                                  ↓
┌─────────────────────────────────────────────────────────────────┐
│ Determining an Offset for the Physical Control Channel Transmission │ — 2330
└─────────────────────────────────────────────────────────────────┘
                                  ↓
┌─────────────────────────────────────────────────────────────────┐
│ Determining a Number of Active and/or Inactive Panels Associated with the │ — 2340
│ One or More Active Beams │
└─────────────────────────────────────────────────────────────────┘
                                  ↓
┌─────────────────────────────────────────────────────────────────┐
│ Determining a First Beam Switching Time Value from Among the Set of │
│ Beam Switching Time Values based on Any of a Number of Active Beams │
│ in the Set of One or More Active Beams, The Determined Number of Active │ — 2350
│ and/or Inactive Panels Associated with the One or More Active Beams, │
│ and/or a Number of TRPS Associated with the Physical Control Channel │
│ Transmission │
└─────────────────────────────────────────────────────────────────┘
                                  ↓
┌─────────────────────────────────────────────────────────────────┐
│ On Condition that the Offset is Greater than or Equal to the Determined │
│ First Beam Switching Time, Receiving or Transmitting the Physical Control │ — 2360
│ Channel Transmission Using the First Beam │
└─────────────────────────────────────────────────────────────────┘
```

FIG. 23

METHODS, ARCHITECTURES, APPARATUSES AND SYSTEMS FOR DYNAMIC DETERMINATION OF PROCESSING TIME

CROSS-REFERENCE TO RELATED APPLICATIONS

This application is a U.S. National Stage Application under 35 U.S.C. § 371 of International Patent Application No. PCT/US2021/070984 filed Jul. 27, 2021, which claims the benefit of U.S. Provisional Patent Application Nos. (i) 63/057,013 filed 27 Jul. 2020, and (ii) 63/167,375 filed 29 Mar. 2021, each of which is incorporated herein by reference.

BACKGROUND

The present disclosure is generally directed to the fields of communications, software and encoding, including, for example, to methods, architectures, apparatuses, systems directed to THE dynamic determination of processing time.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures (FIGs.) and the detailed description are not to be considered limiting, and other equally effective examples are possible and likely. Furthermore, like reference numerals ("ref.") in the FIGs. indicate like elements, and wherein:

FIG. 2 is a diagram illustrating a representative table of available frequencies between 52.6 GHz and 71 GHz according to International Telecommunication Union (ITU) regions and countries;

FIG. 3 is a diagram illustrating a representative table of available frequencies between 71 GHz and 100 GHz according to ITU regions and countries;

FIG. 5 is a diagram illustrating a representative table of numerologies, Subcarrier Spacing (SCS) values and CP lengths in New Radio (NR);

FIG. 23 is a diagram illustrating a representative procedure for beam switching for a physical control channel transmission;

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System

The methods, apparatuses and systems provided herein are well-suited for communications involving both wired and wireless networks. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
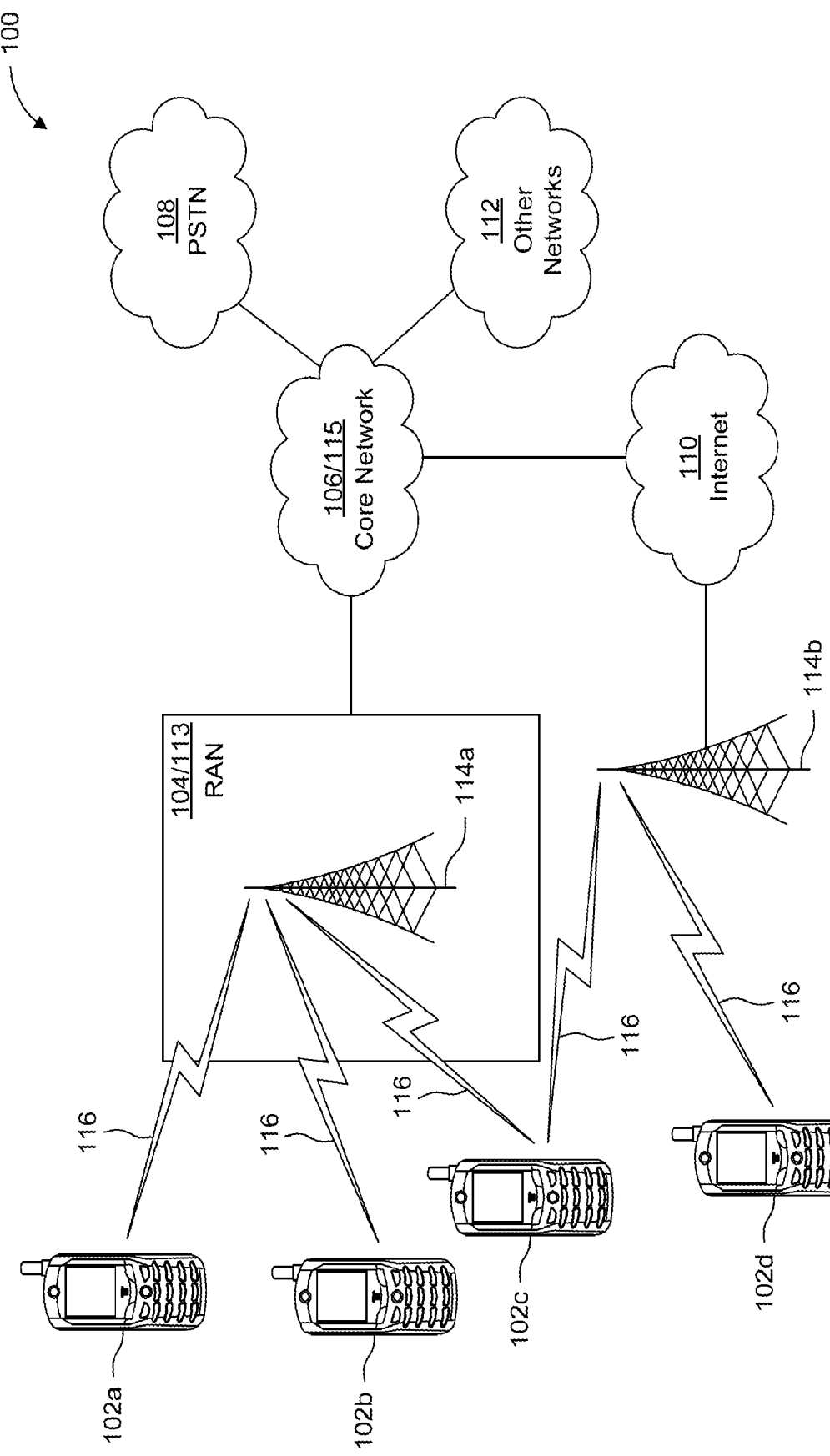
FIG. 1A is a system diagram illustrating an example communications system.

FIG. 1A is a system diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d, e.g., to facilitate access to one or more communication networks, such as the CN 106/115, the Internet 110, and/or the networks 112. By way of example, the base stations 114a, 114b may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in an embodiment, the base station 114a may include three transceivers, i.e., one for each sector of the cell. In an embodiment, the base station 114a may employ multiple-input multiple output (MIMO) technology and may utilize multiple transceivers for each or any sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In an embodiment, the base station 114a and the WTRUs 102a, 102b, 102c may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In an embodiment, the base station 114b and the WTRUs 102c, 102d may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/114 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
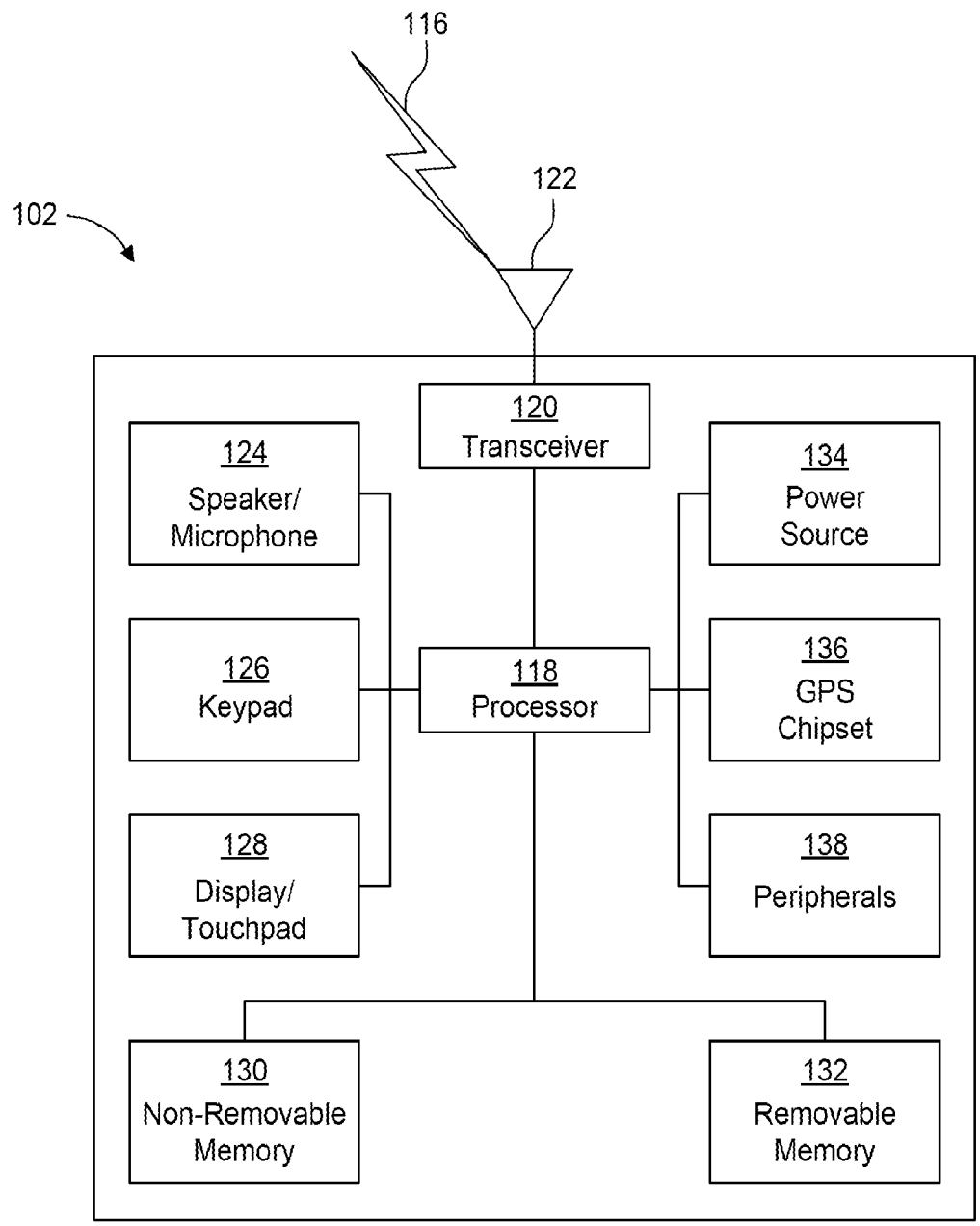
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other elements/peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. For example, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements/peripherals 138, which may include one or more software and/or hardware modules/units that provide additional features, functionality and/or wired or wireless connectivity. For example, the elements/peripherals 138 may include an accelerometer, an e-compass, a satellite transceiver, a digital camera (e.g., for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The elements/peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception)).

Figure 1C:
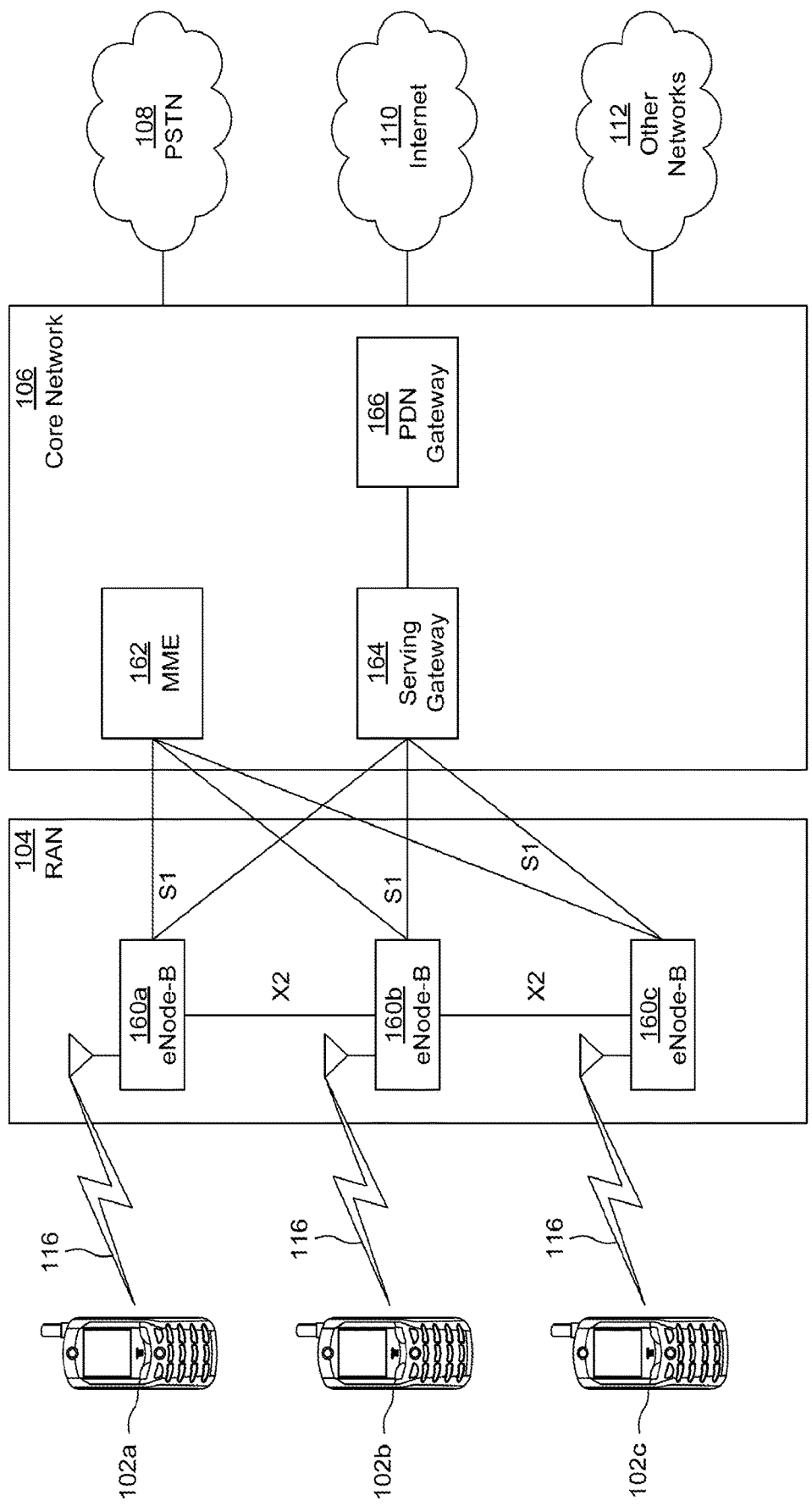
FIG. 1C is a system diagram illustrating an example radio access network (RAN) and an example core network (CN) that may be used within the communications system illustrated in FIG. 1A.

FIG. 1C is a system diagram illustrating the RAN 104 and the CN 106 according to an embodiment. As noted above, the RAN 104 may employ an E-UTRA radio technology to communicate with the WTRUs 102a, 102b, and 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink (UL) and/or downlink (DL), and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While each of the foregoing elements are depicted as part of the CN 106, it will be appreciated that any one of these elements may be owned and/or operated by an entity other than the CN operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode-Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode-B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in infrastructure basic service set (BSS) mode may have an access point (AP) for the BSS and one or more stations (STAs) associated with the AP. The AP may have an access or an interface to a distribution system (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier sense multiple access with collision avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High throughput (HT) STAs may use a 40 MHz wide channel for communication, for example, via a combination of the primary 20 MHz channel with an adjacent or nonadjacent 20 MHz channel to form a 40 MHz wide channel.

Very high throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse fast fourier transform (IFFT) processing, and time domain processing, may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to a medium access control (MAC) layer, entity, etc.

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV white space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support meter type control/machine-type communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or network allocation vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
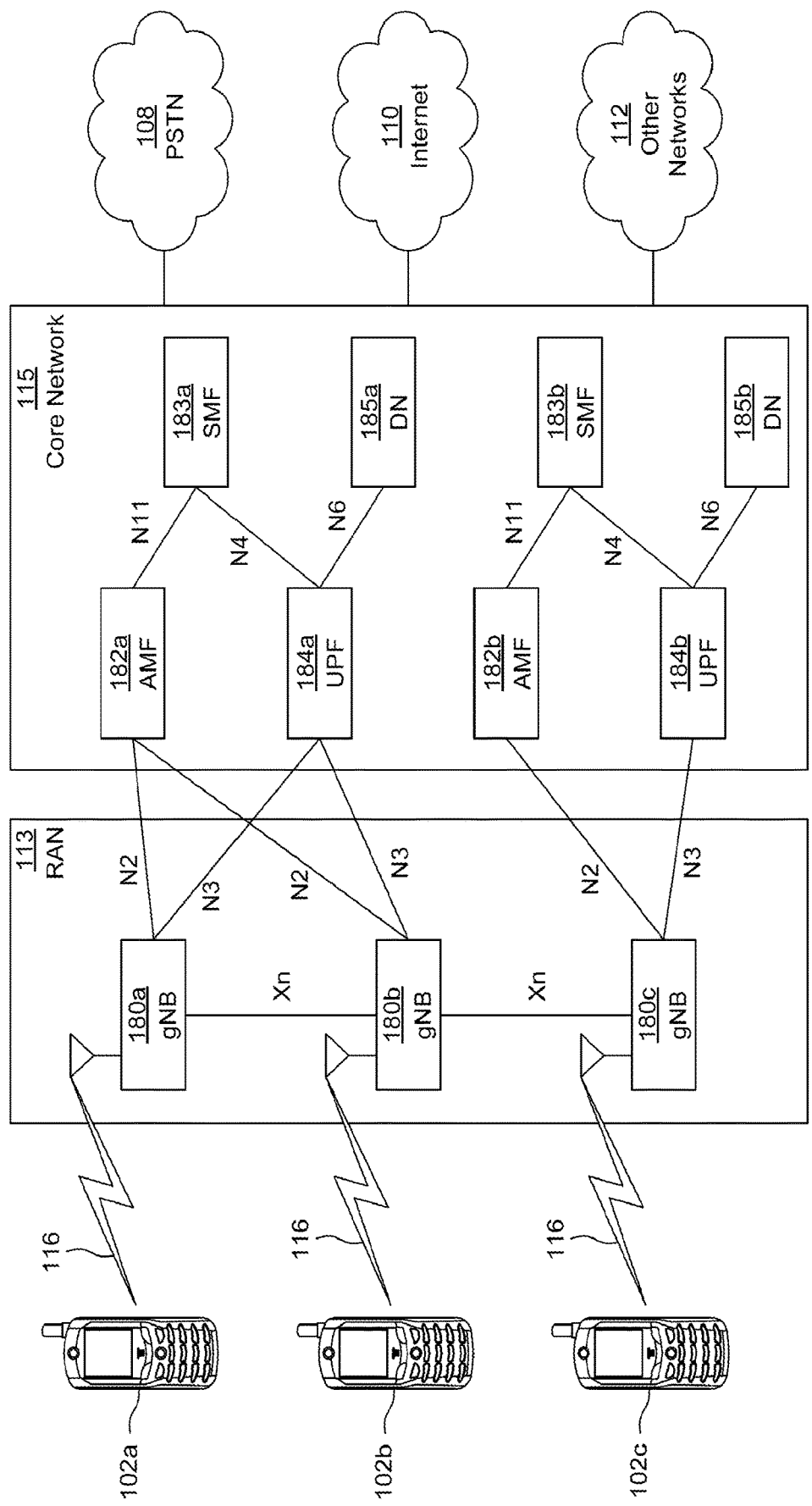
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In an embodiment, the gNBs 180a, 180b, 180c may implement MIMO technology. For example, gNBs 180a, 180b may utilize beamforming to transmit signals to and/or receive signals from the WTRUs 102a, 102b, 102c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., including a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards user plane functions (UPFs) 184a, 184b, routing of control plane information towards access and mobility management functions (AMFs) 182a, 182b, and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one session management function (SMF) 183a, 183b, and at least one Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of NAS signaling, mobility management, and the like. Network slicing may be used by the AMF 182a, 182b, e.g., to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, e.g., to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In an embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to any of: WTRUs 102a-d, base stations 114a-b, eNode-Bs 160a-c, MME 162, SGW 164, PGW 166, gNBs 180a-c, AMFs 182a-b, UPFs 184a-b, SMFs 183a-b, DNs 185a-b, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Although, a Network Access Point (NAP) is shown to be a base station, an eNB and/or a gNB, among others, in FIGS. 1A to 1D, it should be understood other network access points are contemplated including 5G and beyond NAPs. For example, a NAP may include a distributed stack (e.g., set of layers) virtualized over any number of devices (e.g., hardware modules) which, in operation, may act as a NAP.

Abbreviations and Acronyms

The following abbreviations and acronyms may be used as follows.

Δf Sub-carrier spacing
gNB NR NodeB
AP Aperiodic
BLER Block Error Rate
BWP Bandwidth Part
CA Carrier Aggregation
CB Contention-Based (e.g. access, channel, resource)
CDM Code Division Multiplexing
CG Cell Group
CoMP Coordinated Multi-Point transmission/reception
CP Cyclic Prefix
CPE Common Phase Error
CP-OFDM Conventional OFDM (relying on cyclic prefix)
CQI Channel Quality Indicator
CN Core Network (e.g. LTE packet core or NR core)
CRC Cyclic Redundancy Check
CSI Channel State Information
CSI-RS Channel State Information-Reference Signal
CU Central Unit
D2D Device to Device transmissions (e.g. LTE Sidelink)
DC Dual Connectivity
DCI Downlink Control Information
DL Downlink
DM-RS Demodulation Reference Signal
DRB Data Radio Bearer
DU Distributed Unit
EN-DC E-UTRA—NR Dual Connectivity
EPC Evolved Packet Core FD-CDM Frequency Domain-Code Division Multiplexing
FDD Frequency Division Duplexing
FDM Frequency Division Multiplexing
ICI Inter-Cell Interference
ICIC Inter-Cell Interference Cancellation
IP Internet Protocol
LBT Listen-Before-Talk
LCH Logical Channel
LCID Logical Channel Identity
LCP Logical Channel Prioritization
LLC Low Latency Communications
LTE Long Term Evolution (e.g. from 3GPP LTE R8 and up)
MAC Medium Access Control
MAC CE Medium Access Control Control Element
NACK Negative ACK
MBMS Multimedia Broadcast Multicast System
MCG Master Cell Group
MCS Modulation and Coding Scheme
MIMO Multiple Input Multiple Output
MTC Machine-Type Communications
MR-DC Multi-RAT Dual Connectivity
NAS Non-Access Stratum
NE-DC NR-RAN—E-UTRA Dual Connectivity
NR New Radio
NR-DC NR-NR Dual Connectivity
OFDM Orthogonal Frequency-Division Multiplexing
OOB Out-Of-Band (emissions)
$P_{cmax}$ Total available WTRU power in a given transmission interval
Pcell Primary cell of Master Cell Group
PCG Primary Cell Group
PDU Protocol Data Unit
PER Packet Error Rate
PHY Physical Layer
PLMN Public Land Mobile Network
PLR Packet Loss Rate
PRACH Physical Random Access Channel
PRB Physical Resource Block
PRS Positioning Reference Signal
Pscell Primary cell of a Secondary cell group
PSS Primary Synchronization Signal
PT-RS Phase Tracking-Reference Signal
QoS Quality of Service (e.g., from the physical layer perspective)
RAB Radio Access Bearer
RAN PA Radio Access Network Paging Area
RACH Random Access Channel (or procedure)
RAR Random Access Response
RAT Radio Access Technology
RB Resource Block
RCU Radio access network Central Unit
RF Radio Front end
RE Resource Element
RLF Radio Link Failure
RLM Radio Link Monitoring
RNTI Radio Network Identifier
ROM Read-Only Mode (e.g., for MBMS)
RRC Radio Resource Control
RRM Radio Resource Management
RS Reference Signal
RTT Round-Trip Time
SCG Secondary Cell Group
SCMA Single Carrier Multiple Access
SCS Sub-Carrier Spacing
SDU Service Data Unit
SOM Spectrum Operation Mode
SP Semi-persistent
SpCell Primary cell of a master or secondary cell group.
SRB Signaling Radio Bearer
SS Synchronization Signal
SSS Secondary Synchronization Signal
SUL Supplementary Uplink
SWG Switching Gap (e.g., in a self-contained subframe)
TB Transport Block
TBS Transport Block Size
TDD Time-Division Duplexing
TDM Time-Division Multiplexing
TI Time Interval (e.g., integer multiple of one or more symbols)
TTI Transmission Time Interval (e.g., integer multiple of one or more symbols)
TRP Transmission/Reception Point
TRPG Transmission/Reception Point Group
TRS Tracking Reference Signal
TRx Transceiver
UL Uplink
URC Ultra-Reliable Communications
URLLC Ultra-Reliable and Low Latency Communications
V2X Vehicular communications
WLAN Wireless Local Area Networks and related technologies (IEEE 802.xx domain)
Available Wireless Spectrum FIG. 2 is a diagram illustrating a representative table of available frequencies between 52.6 GHz and 71 GHz according to International Telecommunication Union (ITU) regions and countries.

FIG. 3 is a diagram illustrating a representative table of available frequencies between 71 GHz and 100 GHz according to ITU regions and countries.

Above 52.6 GHz, there exists at least 5 GHz of wireless spectrum between 57 to 64 GHz available globally for unlicensed operation as can be seen in FIG. 2. In some countries, there exists up to 14 GHz of wireless spectrum between 57 and 71 GHz for unlicensed operation. Additionally, there exists at least 10 GHz of wireless spectrum available globally between 71 to 76 GHz and 81 to 86 GHz for licensed operation as can be seen in FIG. 3. In some countries, there exists up to 18 GHz of wireless spectrum available between 71 and 114.25 GHz for licensed operation. While frequency ranges above 52.6 GHz potentially contain larger spectrum allocations and larger bandwidths that are not available for bands lower than 52.6 GHz, physical layer channels of NR were designed to be optimized for uses under 52.6 GHz.

Figures 4A, 4B:
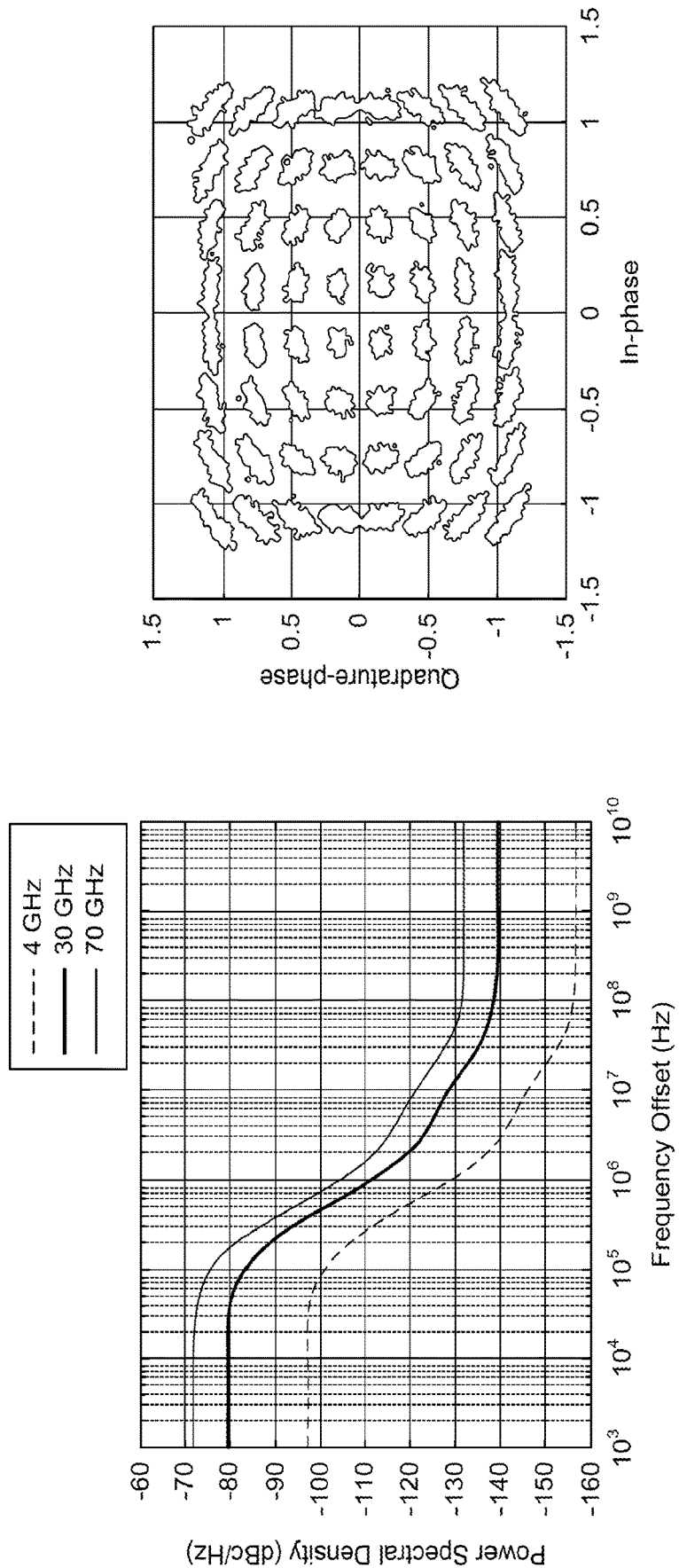
FIG. 4A is a diagram illustrating a representative chart of power spectral density in relation to frequency offset for 4 GHz, 30 GHz and 70 GHz signals.
FIG. 4B is a diagram illustrating a representative chart of a demodulated constellation with phase noise.

To configure NR systems to use frequencies above 52.6 GHz, challenges such as higher phase noise, extreme propagation loss due to high atmospheric absorption, lower power amplifier efficiency, and strong power spectral density regulatory requirements may be considered more difficult to address as compared to frequency bands lower than 52.6 GHz. For example, since phase noise increases with increasing carrier frequency, phase noise becomes more severe and problematic with respect to using frequencies above 52.6 GHz. FIG. 4A is a diagram illustrating a representative chart of power spectral density in relation to frequency offset for 4 GHz, 30 GHz and 70 GHz signals. As can be seen in FIG. 4A, there is a substantial increase in spectral density as carrier frequency increases to 70 GHz as compared to 30 GHz and 4 GHz. FIG. 4B is a diagram illustrating a representative chart of a demodulated constellation with phase noise of Cyclic-Prefix Orthogonal Frequency Domain Multiplexing (CP-OFDM) in 30 GHz. As can be seen in FIG. 4B, phase noise is present across the demodulated constellation. Increases above 52.6 GHz, such as to 70 GHz and above, may be expected to lead to further degradation to demodulated constellation(s).

NR radio technology may use scalable Sub-Carrier Spacing (SCS) to mitigate phase noise in frequency range 2 (FR2) which covers 24.25 to 52.6 GHz signals. Scalable SCS may be expressed as $\Delta$, where $\Delta$ is a SCS and $\mu$ (e.g., numerology) is a non-negative integer. With a scalable SCS, cyclic prefix (CP) length and symbol length are inversely proportional and may allow symbol boundary alignment between different SCSs. In NR, FR2 supports 120/240 kHz SCS values, while frequency range 1 (FR1), which covers 450 to 6000 GHz signals, supports 15/30/60 kHz SCS values. FIG. 5 is a diagram illustrating a representative table of numerologies, SCS values and CP lengths in NR.

In general, phase noise is a random process and directly impacts up and/or down conversion between baseband and RF signals due to temporal instability of the local oscillator(s) used in a given implementation. The phase noise in the frequency domain gives rise to signal jitter in the time domain. When the rate of phase variation is slower with respect to the OFDM symbol duration, the phase noise can be modeled as a constant and can be compensated via estimation. However, when the rate of phase variation is faster with respect to the OFDM symbol duration, the estimation of phase noise and, thereby, the correction thereof may become more difficult. Therefore, for larger SCSs, the easier it may be to compensate for phase noise. The impact of phase noise increases as modulation increases. When modulation increases, the phase difference between each modulation point may become smaller. The smaller phase difference may lead to an increased probability of decoding the modulation incorrectly for a given amount of phase noise.

On the other hand, as the carrier frequency is increased, signal propagation may exhibit less multi-path delay spread due to sharp beamforming with MIMO antenna(s) and the signal propagation characteristics itself at higher frequency. Hence, having longer CPs may become less important in higher carrier frequency ranges. This is one of the reasons why only 60/120 kHz SCS options are supported in FR2.

In view of the foregoing, it may be desirable to modify NR technology to support operation between 52.6 GHz and 71 GHz as well as channel access mechanisms thereof assuming beam based operation for unlicensed spectrum between 52.6 GHz and 71 GHz.

Physical Downlink Control Channel

In NR technology, a Physical Downlink Control Channel (PDCCH) is a physical channel which carries Downlink Control Information (DCI) based Control Resource Set (CORESET), Resource Element Group (REG), Control Channel Element (CCE) and Search Space (SS).

A WTRU 102 may receive configurations of one or more CORESETs. Each of the one or more CORESETs may comprise any of a frequency assignment (e.g., as chunks of 6 resource blocks (RBs)), a length in time (e.g., a number of OFDM symbols), a type of REG bundle, and/or a type of mapping from REG bundles to CCEs (e.g., interleaving or non-interleaving). In certain embodiments, the WTRU 102 may receive configurations of one or more Bandwidth Parts (BWPs). A BWP (e.g., each BWP) may be a set of physical resource blocks (PRBs) on a given carrier and may be selected from a set or subset of common resource blocks according to a specific numerology. A BWP (e.g., each BWP) according to a specific numerology may be configured to include a SCS, a symbol duration and/or a CP length. For example, the WTRU 102 may receive N CORESETs for a given BWP, where N is a whole number (e.g., 3). In some examples, there may be 12 CORESETs in the case of 4 BWPs.

For example, a WTRU 102 may receive a configuration of CORESET with index 0 (CORESET 0) via a four-bit information element in a master information block (MIB) from a gNB 180. The configuration of CORESET 0 may be restricted to a limited number of combinations of parameters compared to other CORESETs. The configuration of CORESET 0 may not be aligned with a frequency grid of other CORESETs.

A REG may be the smallest building block for the PDCCH. The REG may consist of a predetermined number (e.g., 12) resource elements (REs) on one OFDM symbol in time and one RB in frequency. In the REG, a first predetermined number (e.g., 9) REs may be used for control information and another predetermined number (e.g., 3) REs may be used for a Demodulation Reference Signal (DM-RS). Plural REGs (e.g., 2, 3, or 6), adjacent in time and/or frequency, may form a REG bundle which may be used with a (e.g., same) precoder and any DM-RS thereof may be used together for channel estimation. Plural REGs (e.g., 6 REGs in the format of 1, 2, or 3 REG bundles) may form one CCE which may in turn configure a PDCCH. A PDCCH may include one or plural CCEs (e.g., 1, 2, 4, 8, or 16 CCEs). The number of CCEs for a given PDCCH may be referred to as an aggregation level (AL).

Mapping of REG bundles may use interleaving or non-interleaving. In an example of non-interleaving mapping, consecutive REG bundles (e.g., adjacent in frequency) may form a CCE and CCEs adjacent in frequency may form a PDCCH. In an example of interleaving mapping, REGs may be interleaved (or permuted) before being mapped to CCEs, resulting in (generally) non-adjacent REG bundles in one CCE and (generally) non-adjacent CCEs may form a PDCCH.

Figure 6:
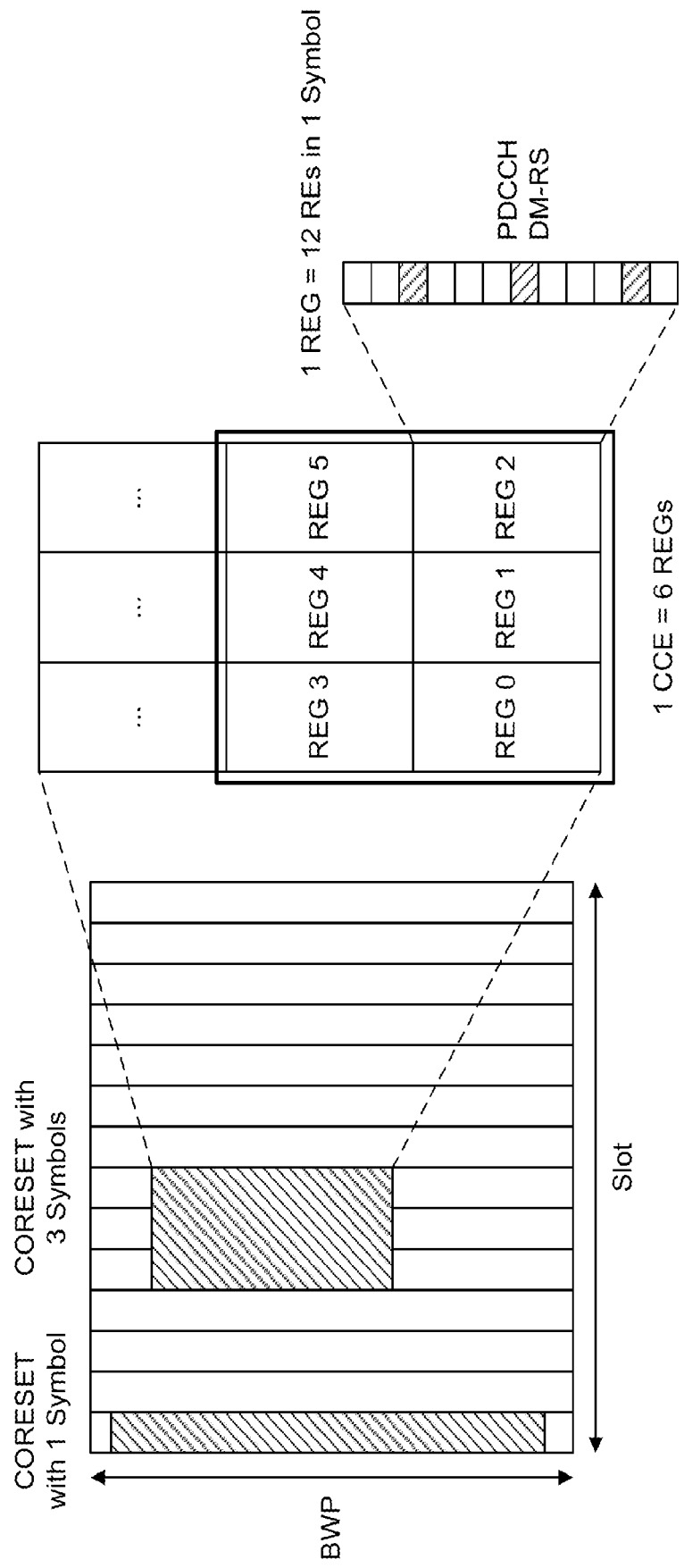
FIG. 6 is a diagram illustrating a representative Bandwidth Part (BWP) over a plurality of time slots.

FIG. 6 is a diagram illustrating a representative relation of a Bandwidth Part (BWP) over a plurality of time slots. In certain embodiments, a given CORESET may be configured with 1 symbol. In certain other embodiments, a given CORESET may be configured with plural (e.g., 3) symbols. As shown in FIG. 6, the CORESET with 3 symbols may include a CCE which is configured from 6 REGs (e.g., REGs #0 to #5) and each REG may include 12 REs in one symbol. The PDCCH DM-RS may be included in one or more of the REs of a given REG.

A WTRU 102 may receive a configuration of a SS or a set of SSs (e.g., for plural aggregation levels). The SS or the set of SSs may include a set of PDCCH candidates. Based on the set of PDCCH candidates, the WTRU 102 may monitor the set of PDCCH candidates. For example, the monitoring may be determined by any of an associated CORESET, a number of PDCCH candidates for and/or within each aggregation level, and/or a set of monitoring occasions. The monitoring occasions may be determined by any of a monitoring periodicity (e.g., in terms of slots), a monitoring offset, and/or a monitoring pattern (e.g., with 14 bits corresponding to the possible patterns of symbols inside a slot).

WTRU Processing Time

In order to process channels and signals, a WTRU 102 may require, determine, select and/or set a processing time to measure, to decode and/or to encode new data based on the measurement and the decoding.

Figure 7:
FIG. 7 is a diagram illustrating a representative processing time for a Physical Downlink Shared Channel (PDSCH) and an Acknowledgment (ACK)/Negative ACK (ACK/NACK)

FIG. 7 is a diagram illustrating a representative processing time for a Physical Downlink Shared Channel (PDSCH)

and an ACK/NACK. As shown in FIG. 7, a WTRU 102 receives a first transmission (e.g., a PDSCH transmission) 702 from a network entity (e.g., a gNB 180). The WTRU 102 may transmit a valid Hybrid Automatic Repeat Request (HARQ) ACK/NACK message 704 at K1 on condition that the first uplink symbol of the Physical Uplink Control Channel (PUCCH), which carries the HARQ ACK/NACK information, starts no earlier than L1 symbols (e.g., a number of symbols from when the PDSCH transmission is received by the WTRU 102). L1 may be defined as N1+d1,1, where N1 is determined based on subcarrier spacing, WTRU capability and DM-RS configuration and d1,1 is determined based on the PDSCH transmission ending position and/or length.

Figure 8:
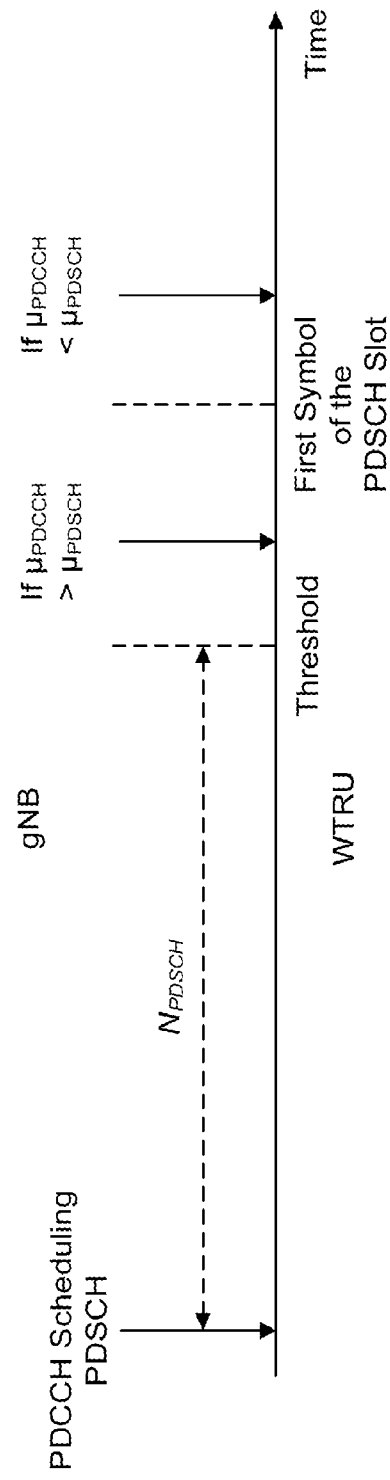
FIG. 8 is a diagram illustrating a representative processing time for cross-carrier scheduling where a Physical Downlink Control Channel (PDCCH) is scheduling a PDSCH.

FIG. 8 is a diagram illustrating a representative processing time for cross-carrier scheduling. As shown in FIG. 8, a WTRU 102 receives a transmission 802 via a first channel (e.g., a PDCCH transmission) from a network entity (e.g., a gNB 180) for scheduling a second channel (e.g., a PDSCH). On condition that a SCS of the first channel is less than a SCS of the second channel (e.g., $SCS_{PDCCH} < SCS_{PDSCH}$), the WTRU 102 may be expected to receive the scheduled PDSCH transmission if the first symbol in the PDSCH allocation starts no earlier than the first symbol of the PDSCH slot starting at least $N_{PDSCH}$ PDCCH symbols after the end of the PDCCH transmission for scheduling the PDSCH. It should be noted that this does not take into account the effect of a receive timing difference between the scheduling cell and the scheduled cell. In a case where the SCS of the first channel is greater than the SCS of the second channel (e.g., $SCS_{PDCCH} > SCS_{PDSCH}$), the WTRU 102 may be expected to receive the scheduled PDSCH transmission if the first symbol in the PDSCH allocation starts no earlier than $N_{PDSCH}$ PDCCH symbols after the end of the PDCCH transmission for scheduling the PDSCH. It should be noted that this does not take into account the effect of a receive timing difference between the scheduling cell and the scheduled cell. Here, $N_{PDSCH}$ is a function of the SCS of the scheduling PDCCH.

Figures 9, 10:
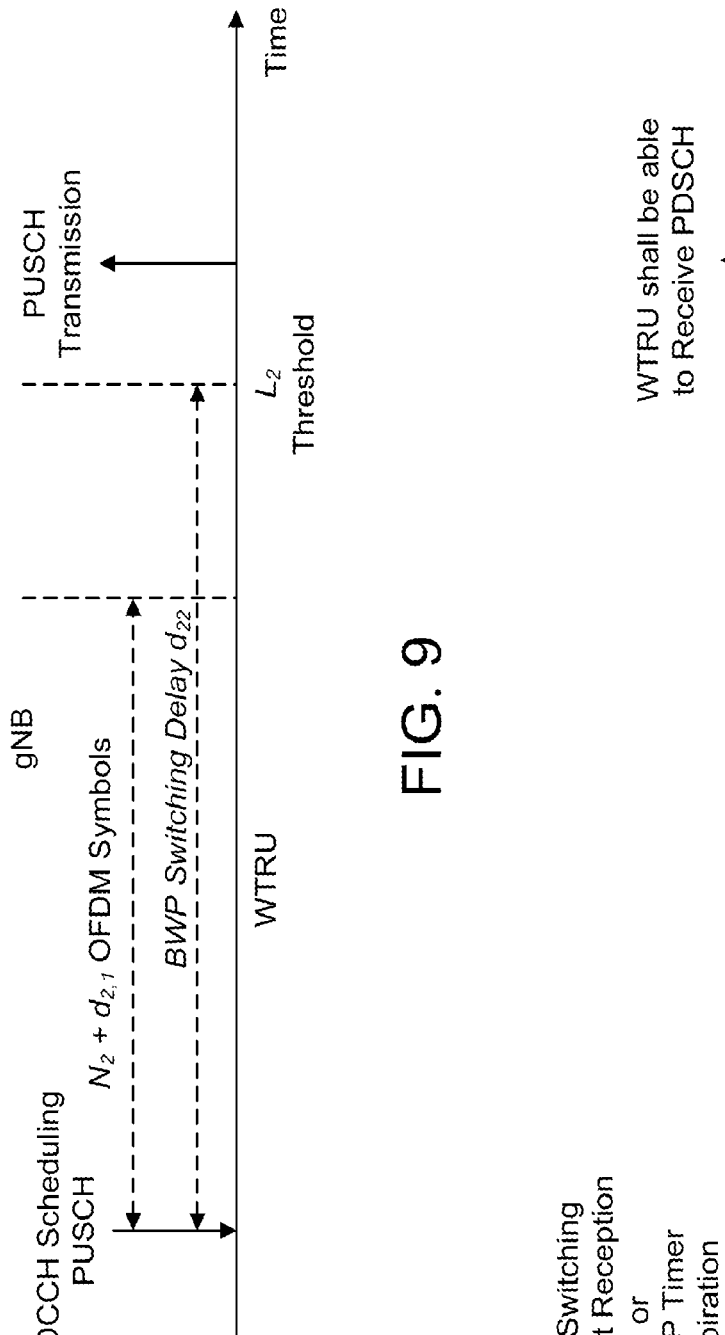
FIG. 9 is a diagram illustrating a representative processing time between a PDCCH scheduling a Physical Uplink Shared Channel (PUSCH) and a PUSCH transmission.
FIG. 10 is a diagram illustrating a representative processing time for a BWP switching operation.

FIG. 9 is a diagram illustrating a representative processing time between a PDCCH transmission 902 scheduling a PUSCH and a PUSCH transmission 904. As shown in FIG. 9, a WTRU receives a transmission 902 via a first channel (e.g., a PDCCH transmission) from a network entity (e.g., a gNB 180) for scheduling a second channel (e.g., a PUSCH transmission 904). If a first uplink symbol in a PUSCH allocation for a transport block is no earlier than a symbol L2 after the PDCCH transmission 902 then the WTRU 102 may transmit the transport block. Here, L2 is a next uplink symbol having a cyclic prefix (CP) starting a number of symbols after an end of a last symbol of the PDCCH transmission 902 for scheduling the PUSCH. The number of symbols may be determined as a maximum of (N2+d2,1) and d2,2. In FIG. 9, N2 is based on (e.g., a function of) SCS, WTRU capability and a number of additional DM-RS symbols, d2,1 is based on the PDSCH ending position and/or length, and d2,2 is a BWP switching time.

FIG. 10 is a diagram illustrating a representative processing time for a BWP switching operation. As shown in FIG. 10, a WTRU 102 may be configured to perform a BWP switching operation that may be based on DCI and/or a timer expiration at 1002. A BWP may be switched to be activated after a time $T_{BWPswitchDelay}$ which is a number of slots (1) from a slot n in which the WTRU 102 received a BWP switching request; and/or (2) from a slot n which may correspond to when a BWP timer has expired. The WTRU 102 may receive a PDSCH transmission at 1004 after the BWP switching operation. Here, the time $T_{BWPswitchDelay}$ may be based on WTRU capability (e.g., type 1 or type 2) and a SCS. Here, the Type 1 WTRU capability may be 1 ms or less and the Type 2 WTRU capability may be 3 ms or less.

Figure 11:
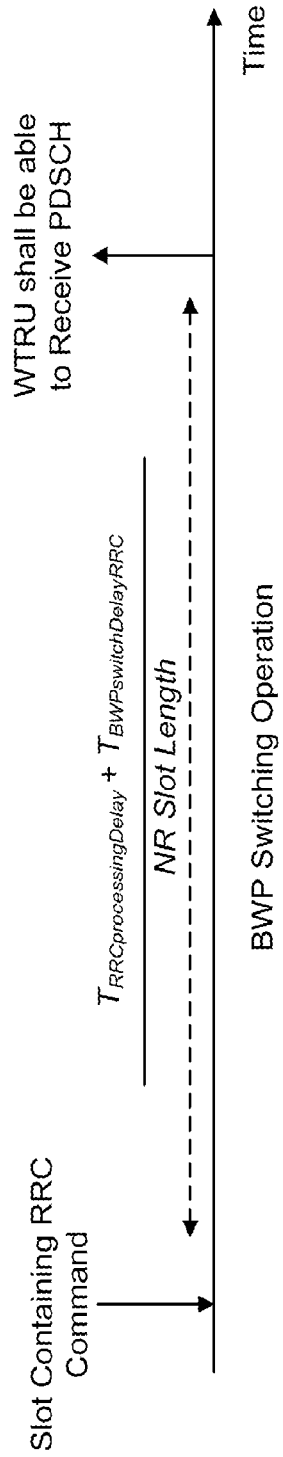
FIG. 11 is a diagram illustrating a representative processing time for another BWP switching operation.

FIG. 11 is a diagram illustrating a representative processing time for another BWP switching operation. As shown in FIG. 11, a WTRU 102 may be configured to perform a BWP switching operation that may be based on a Radio Resource Control (RRC) command. A BWP may be switched to activate (e.g., an activated state) after a predetermined number of slots from a slot n in which the WTRU 102 received the RRC command at 1102. The WTRU 102 may receive a PDSCH transmission at 1104 after the BWP switching operation. In FIG. 11, the predetermined number may be based on a time $T_{RRCprocessingDelay}$, a time $T_{BWPswitchDelayRRC}$, and/or a NR slot length. For example, the time $T_{RRCprocessingDelay}$ may be based on a type of RRC procedures and/or RRC configurations (e.g., RRC reconfigurations of a Scell addition, a Scell release, a Scell Group (SCG) establishment, a SCG modification, a SCG release and/or other RRC reconfigurations). In some cases, the time $T_{RRCprocessingDelay}$ may be in the range from 5 ms to 80 ms. In some cases, the time $T_{RRCprocessingDelay}$ may be in the range from 10 ms to 16 ms. In some cases, the time $T_{BWPswitchDelayRRC}$ may be 6 ms, for example.

Figure 12:
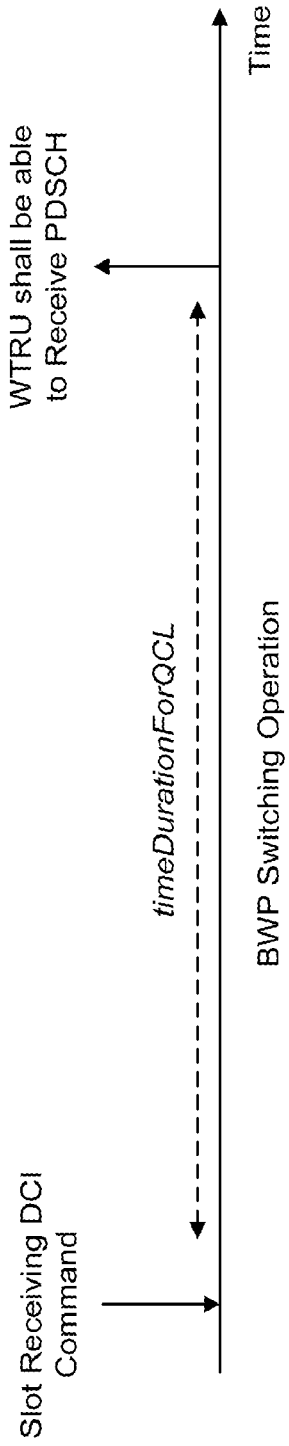
FIG. 12 is a diagram illustrating a representative processing time for yet another BWP switching operation.

FIG. 12 is a diagram illustrating a representative processing time for yet another BWP switching operation. As shown in FIG. 12, a WTRU 102 may be configured to perform a BWP switching operation that may be based on a DCI command. A BWP may be switched to being activated after a time (e.g., timeDurationForQCL) from a slot n in which the WTRU 102 received the DCI command at 1202. The WTRU 102 may be able to receive a PDSCH transmission or transmit a PUSCH with target Transmit Configuration Indication (TCI) state of a serving cell no later than at a time corresponding to slot n+timeDurationForQCL at 1204. For example, timeDurationForQCL may correspond to a minimum number of OFDM symbols in which the WTRU 102 is able to perform PDCCH reception and apply spatial Quasi-Co-Located (QCL) information in the received DCI command for PDSCH processing.

Figure 13:
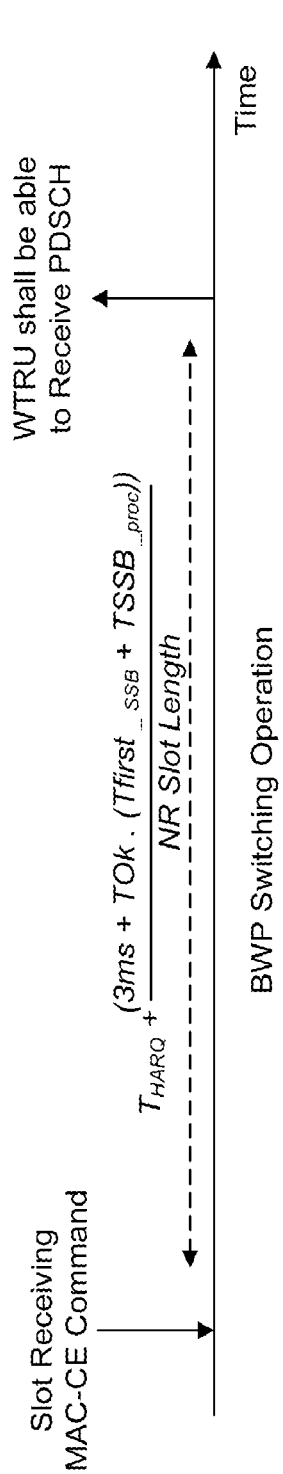
FIG. 13 is a diagram illustrating a representative processing time for still another BWP switching operation.

FIG. 13 is a diagram illustrating a representative processing time for still another BWP switching operation. As shown in FIG. 13, a WTRU 102 may be configured to perform a BWP switching operation that may be based on a Media Access Control (MAC) Control Element (CE) command on condition that a TCI state is known. A BWP may be switched to being activated after a predetermined number of slots from a slot n in which the WTRU 102 received the MAC-CE command at 1302. The WTRU 102 may be able to receive a PDSCH transmission or transmit a PUSCH with target Transmit Configuration Indication (TCI) state of a serving cell no later than at a time corresponding to slot n+the predetermined number of slots at 1304. Here, the predetermined number may be based on a set value (e.g., 3 ms), a time $T_{HARQ}$, a time $T_{Ok}$, a time $T_{first-SSB}$, a time $T_{SSB-proc}$ and/or a NR slot length. For example, $T_{HARQ}$ may be a time between downlink (DL) data and an ACK, the time $T_{first-SSB}$ may be a time to a first SSB transmission after the MAC-CE command is decoded by the WTRU 102, and/or the time $T_{SSB-proc}$ may be 2 ms. For example, the time $T_{Ok}$ may take a value of 1 on condition that the known (e.g., target) TCI state is not in an active TCI state list for the PDSCH, and may take a value of 0 otherwise.

Figure 14:
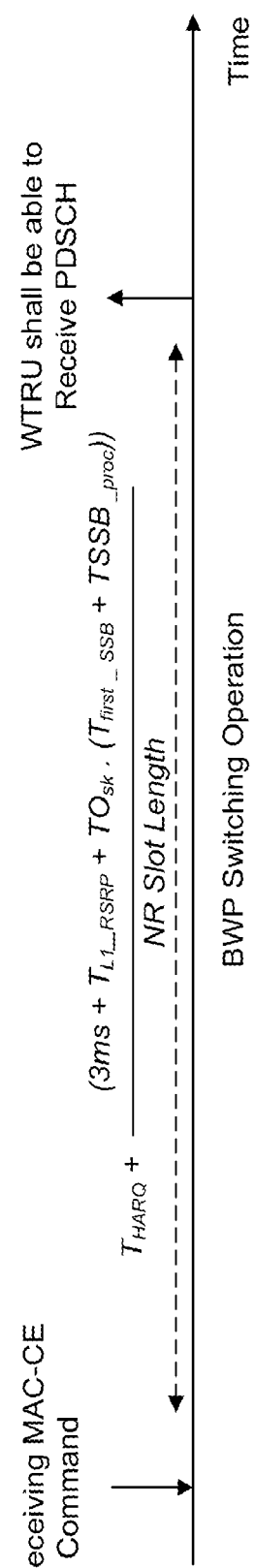
FIG. 14 is a diagram illustrating a representative processing time for a further BWP switching operation.

FIG. 14 is a diagram illustrating a representative processing time for another BWP switching operation. As shown in FIG. 14, a WTRU 102 may be configured to perform a BWP switching operation that may be based on a MAC-CE command on condition that a TCI state is unknown. A BWP may be switched to being activated after a predetermined number of slots from a slot n in which the WTRU 102 received the MAC-CE command at 1402. The WTRU 102 may be able to receive a PDSCH transmission or transmit a PUSCH with target Transmit Configuration Indication (TCI) state of a serving cell no later than at a time corresponding to slot n+the predetermined number of slots at 1404. The predetermined number may be based on a set value (e.g., 3 ms), a time $T_{HARQ}$, a time $T_{Ok}$, a time $T_{L1\text{-}RSRP}$, a time $T_{first\text{-}SSB}$, a time $T_{SSB\text{-}proc}$ and/or a NR slot length. For example, $T_{HARQ}$ may be a time between downlink (DL) data and an ACK, the time $T_{first\text{-}SSB}$ may be a time to a first SSB transmission after the MAC-CE command is decoded by the WTRU 102, and/or the time $T_{SSB\text{-}proc}$ may be 2 ms. For example, the time $T_{Ok}$ may take a value of 1 for Channel State Information Reference Signal (CSI-RS) based Layer 1 Reference Signal Received Power (L1-RSRP) measurement, a value of 0 for Synchronization Signal Block (SSB) based L1-RSRP measurement when TCI state switching involves QCL-Type D, and a value of 0 when TCI state switching involves QCL Types A, B and/or C. The time $T_{L1\text{-}RSRP}$ may be the time for L1-RSRP measurement for reception (Rx) beam refinement. For example, the time $T_{L1\text{-}RSRP}$ may be specified separately for SSB based measurement and/or for CSI-RS based measurement.

A WTRU 102 may be configured to perform a BWP switching operation that may be based on a RRC command according to whether a TCI state is known or unknown. A BWP may be switched to being activated after a predetermined number of slots from a slot n in which the WTRU 102 received the RRC command. The WTRU 102 may be able to receive a PDSCH transmission or transmit a PUSCH with target Transmit Configuration Indication (TCI) state of a serving cell no later than at a time corresponding to slot n+the predetermined number of slots. In the case where the TCI state is known, the predetermined number of slots may be calculated as $(T_{RRC\_processing}+T_{Ok}*(T_{first\text{-}SSB}+T_{SSB\text{-}proc}))/$NR slot length. In the case where the TCI state is unknown, the predetermined number of slots may be calculated as $(T_{RRC\_processing}+T_{L1\text{-}RSRP}+T_{Ok}*(T_{first\text{-}SSB}+T_{SSB\text{-}proc}))/$NR slot length. A time $T_{RRC\_processing}$ may be a RRC processing time. A time $T_{first\text{-}SSB}$ may be a time to a first SSB transmission after RRC processing by the WTRU 102 in a cases where the SSB is QCL-Type A or QCL-Type C to target TCI state. When the TCI state switch involves QCL-Type D, the time $T_{first\text{-}SSB}$ may be a time to a first SSB transmission after L1-RSRP measurement. When the TCI state switch involves other QCL-Types, the time $T_{first\text{-}SSB}$ may be a time to a first SSB transmission after RRC processing by the WTRU 102.

The TCI state may be a known TCI state if one or more conditions are met. For example, during a period from a last transmission of a RS resource used for the L1-RSRP measurement reporting for the target TCI state to a completion of an active TCI state switch, where the RS resource for L1-RSRP measurement may be the RS in the target TCI state or may be QCLed to the target TCI state, the TCI state may be a known TCI state. As another example, when a TCI state switch command is received within 1280 ms after a last transmission of the RS resource for beam reporting or measurement, the TCI state may be considered to be known. As yet another example, when the WTRU 102 has sent at least one L1-RSRP or L1-Signal to Noise Plus Interference (SINR) report for the target TCI state before a TCI state switch command, the TCI state may be implicitly a known (or unknown) TCI state. As yet another example, when the TCI state remains detectable during a TCI state switching period, the TCI state may be a known TCI state. As still another example, when the SSB associated with the TCI remains detectable during the TCI state switching period, the TCI state may be a known state. For example, when a SINR of the TCI state is greater than or equal to a predetermined value (e.g., −3 dB), the TCI state may be a known TCI state. In other cases, the TCI state may be an unknown TCI state.

Figure 15:
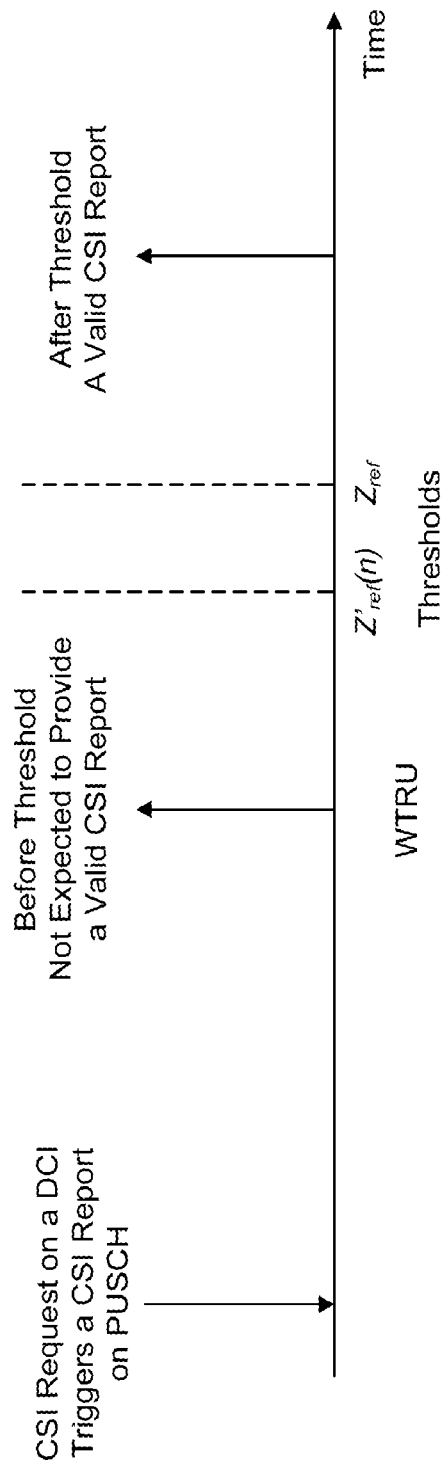
FIG. 15 is a diagram illustrating a representative processing time for Channel State Information (CSI) reporting according to a CSI request.

FIG. 15 is a diagram illustrating a representative processing time for Channel State Information (CSI) reporting according to a CSI request. As shown in FIG. 15, upon a CSI request field in a DCI triggering a CSI report(s) on a PUSCH transmission at 1502, the WTRU 102 may be configured to provide a CSI report for the n-th triggered report (e.g., a valid CSI report) at 1504, if a first uplink symbol to carry the corresponding CSI report(s) including the effect of the timing advance, starts no earlier than at a symbol Zref, or, if the first uplink symbol to carry the n-th CSI report including the effect of the timing advance, starts no earlier than at symbol Z'ref(n). The WTRU 102 may not be expected to provide a CSI report for the n-th triggered report (e.g., a valid CSI report) at 1506. For example, Zref may be a CSI computation time and/or delay (e.g., ms or symbols) based on the numerology and/or CSI type, and Z'ref(n) may be a Channel State Information-Reference Signal (CSI-RS) processing time, for example based on the latest CSI-RS resource for channel measurement and/or interference measurement of the n-th CSI report.

Figure 16:
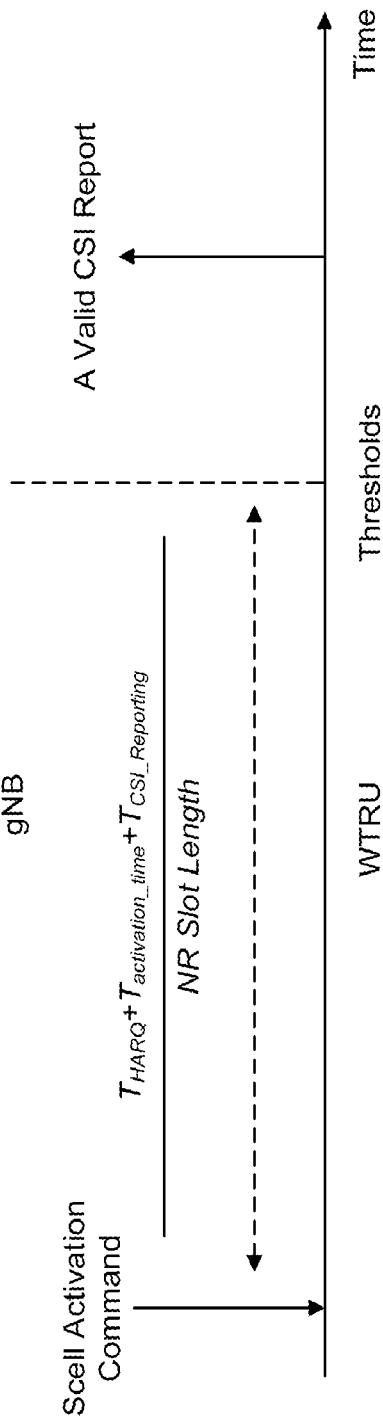
FIG. 16 is a diagram illustrating a representative processing time for CSI reporting according to a secondary cell (Scell) activation command.

FIG. 16 is a diagram illustrating a representative processing time for CSI reporting according to a secondary cell (Scell) activation command. As shown in FIG. 16, upon receiving a Scell activation command in a slot n at 1602, the WTRU 102 may be configured to transmit a CSI report (e.g., a valid CSI report) no later than a time corresponding to slot $n+((T_{HARQ}+T_{activation\_time}+T_{CSI\_Reporting})/$NR slot length) at 1604. In FIG. 16, $T_{HARQ}$ may be a timing (e.g., time offset between DL data and ACK), $T_{activation\_time}$ may be an Scell activation delay in milliseconds and $T_{CSI\_Reporting}$ may be a delay including uncertainty in acquiring an available downlink CSI reference resource (e.g., CSI-RS and/or SSB) and/or a WTRU processing time for CSI reporting and uncertainty in acquiring a first available CSI reporting resources (e.g., PUCCH and/or PUSCH). For example, the available downlink CSI reference resource may be a first available downlink CSI reference resource. For example, the available CSI reporting resources may be a first available CSI reporting resources.

Above 52.6 GHz, it may be desirable for a WTRU 102 to increase or reduce a maximum processing time and dynamically changing the processing time at a given moment, for example, in consideration that a maximum size of data channels may be changed (e.g., increased/decreased), a number of antenna elements may be changed (e.g., increased/decreased) a number of antenna panels may be changed (e.g., increased/decreased), and/or a number of beams may be changed (e.g., increased/decreased).

Larger carrier bandwidths (e.g., 2 GHz) may be available and maximum size of data channels (e.g., transport block size) may be also increased in consideration of, for example, increasing demand for high data rates and system capacity in moving into additional frequency ranges in the spectrum above 52.6 GHz. Due to potential increases in maximum transport block size, the processing time to decode the data channels may change, in some cases drastically, based on, for example, Modulation and Coding Scheme (MCS), system bandwidth, BWP bandwidth and scheduled time and/or frequency resources.

As carrier frequency increases and wavelength decreases, the required spacing between antenna elements may decrease. The reduced spacing may enable higher antenna gains, but may introduce more implementation complexity when controlling the antenna elements. In order to efficiently control larger numbers of antenna elements, physical groupings of antenna elements (e.g., antenna panels) may be supported. Through activating or deactivating antenna panels, it may be possible to strike a sufficient balance between performance and power efficiency at the WTRU 102. However, due to the larger numbers of antennas and panels, the processing time and/or time gap to activate antennas and/or panels, decode control channels and/or data channels, activate BWPs and/or activate cells may change, in some cases drastically, change considering the activation, deactivation and/or switching of antennas and/or panels.

While larger numbers of antenna elements may provide higher antenna gains, it may come at the cost of narrowed beam widths. In order to cover an entire cell, a large number of beams may be implemented for any of: a WTRU 102 and/or a gNB 180. Although beam activation/deactivation may be introduced to efficiently manage the beams, frequencies above 52.6 GHz may require relatively larger numbers of activated beams than existing frequency ranges (e.g., FR1 or FR2) due to narrowed beam widths. Given that activated beams may require constant monitoring, the required processing time for the beams may change dynamically based on the activation and the deactivation thereof.

Conventional processing time determination methods are based on fixed parameters such as subcarrier spacing and WTRU capabilities. The existing WTRU capabilities for conventional processing time determination methods consider worst case scenarios in attempt to reduce implementation complexity of a WTRU 102 and a gNB 180. While the existing WTRU capabilities may reduce implementation complexity in existing frequency ranges (e.g., FR1 and FR2), such capabilities may require and/or may use a more redundant processing time than prospective implementations may need and/or use when moving to frequencies above 52.6 GHz. The increased redundant processing time may bring increases in processing delays and corresponding system capacity loss if not addressed.

In certain representative embodiments, methods, apparatus and systems may be implemented for dynamic WTRU determination of processing time. In certain representative embodiments, methods, apparatus and systems may be implemented for WTRU CSI reporting based on dynamic WTRU determination of processing time. In certain representative embodiments, methods, apparatus and systems may be implemented for WTRU reporting of preferred processing times and/or values and/or parameters. For example, processing time may refer to a minimum processing time for a WTRU 102 to process a channel or signal, and may be a time window having a starting time "x" and a finishing time "y" or may have a starting time "x" and a duration "z" or may correspond to a numerology. In some embodiments, the processing time may be determined by, used in, described in or based on a numerology, a number of slots, a number of symbols, and/or in units of absolute time (e.g., milliseconds).

In certain representative embodiments, methods, apparatus and systems may be implemented for a WTRU 102 to be configured to determine to skip monitoring one or more PDCCH search spaces during a processing time (e.g., a time window [x, y]). For example, whether the WTRU 102 may skip monitoring a respective PDCCH search space within the processing time may be determined based on at least in part on a type of at least the respective PDCCH search space(s) or an identity thereof. In some certain embodiments, a first type of PDCCH search space may not be required to be monitored within a processing time window while a second type of PDCCH search space may be required to be monitored within the processing time window. As an example, the first type of PDCCH search space may be a WTRU-specific search space and the second type of PDCCH search space may be a common search space, or vice versa.

In certain representative embodiments, methods, apparatus and systems may be implemented for a WTRU 102 to be configured to determine to drop a triggered CSI reporting or otherwise not report a triggered CSI reporting. For example, after a CSI reporting is requested (e.g., by a network entity) within a processing time window, the WTRU 102 may drop the triggered CSI reporting or may otherwise not report the triggered CSI reporting. In certain embodiments, the triggering may be that a CSI reporting timing indicated in an associated DCI is within the corresponding processing time window.

In certain representative embodiments, methods, apparatus and systems may be implemented for a WTRU 102 to be configured to determine not report an updated CSI. For example, after a CSI reporting is requested within a processing time window, the WTRU 102 may determine not to report an updated CSI or CSI measurement associated with an indicated CSI reference signal.

In certain representative embodiments, methods, apparatus and systems may be implemented for a WTRU 102 to be configured to ignore a request (e.g., a reporting request). The WTRU 102 may be configured to ignore the request by determining to process the request as if the request had not been received by the WTRU 102. The WTRU 102 may be configured to ignore the request by determining to process the request as being received and by taking action other than reporting within a corresponding processing time window. For example, after a WTRU 102 is triggered to send a reporting regarding at least a channel or a signal in a corresponding slot, the WTRU 102 may determine the slot is within a processing time window and determine to ignore the triggering or otherwise not send the reporting.

In certain representative embodiments, methods, apparatus and systems may be implemented for a WTRU 102 to be configured to perform processing regarding a received reporting request at a delayed time (e.g., after the processing time window). For example, the WTRU 102 may be configured to receive a request to process at least a channel or a signal and determine to report the processing result(s) thereof at an n-th slot. However, if the n-th slot is within a processing time window, the WTRU 102 may be configured to report the processing result(s) at a m-th slot which is later than the processing time window. As a first example, the m-th slot may be a first available slot after the processing time window. The available slot may correspond to the channel or the signal reported on in the processing results. As a second example, the m-th slot may be a slot which is determined (e.g., autonomously) by the WTRU 102. As a third example, the m-th slot may be determined based on an offset with a reference slot, and the reference slot may be the n-th slot or a last slot of the processing time window. In addition, the offset may be configured or indicated in an associated DCI.

In certain representative embodiments, methods, apparatus and systems may be implemented for a WTRU 102 to be configured to transmit or receive a physical channel or a reference signal according to at least one spatial domain filter. As described herein, spatial domain filter may be used interchangeably with beam. For example, a WTRU 102 may be configured to transmit a physical channel or signal using a same spatial domain filter as used for receiving a RS (e.g., CSI-RS) or a Synchronization Signal (SS) block. The WTRU 102 transmission may be referred to as "target", and the received RS or SS block may be referred to as "reference" or "source". In such case, the WTRU 102 may be said to transmit the target physical channel or signal according to a spatial relation with a reference to such RS or SS block. The WTRU 102 may be configured to transmit a first physical channel or signal according to a same spatial domain filter as used for transmitting a second physical channel or signal. The first and second transmissions may be referred to as "target" and "reference" (or "source"), respectively. For example, a WTRU 102 may transmit a first (e.g., target) physical channel or signal according to a spatial relation with a reference to a second (e.g., reference) physical channel and/or signal.

In certain representative embodiments, methods, apparatus and systems may be implemented in which a spatial relation may be implicit, configured by RRC or signaled by Medium Access Control (MAC) Control Element (MAC CE) or DCI. For example, a WTRU 102 may be configured to transmit (e.g., implicitly transmit) a PUSCH and/or a Demodulation Reference Signal (DM-RS) of PUSCH according to a same spatial domain filter as a Sounding Reference Signal (SRS) indicated by an SRS Resource Indicator (SRI) indicated in DCI or configured by RRC. In another example, a spatial relation may be configured by RRC for an SRI or signaled by MAC CE for a PUCCH. Such a spatial relation may also be referred to as a "beam indication."

In certain representative embodiments, methods, apparatus and systems may be implemented for a WTRU 102 to be configured to receive a first (target) downlink channel or signal according to a same spatial domain filter or a same spatial reception parameter as a second (reference) downlink channel or signal. For example, an association may exist between a physical channel, such as PDCCH or PDSCH, and the respective DM-RS of the physical channel. On condition that the first and second signals are reference signals (RSs), such an association may exist after the WTRU 102 is configured with a quasi-colocation (QCL) Type D (e.g., QCL assumption) between corresponding antenna ports. Such association may be configured as a TCI state. A WTRU 102 may receive an indication of an association between a CSI-RS or SS block and a DM-RS by an index to a set of TCI states configured by RRC and/or signaled by MAC CE. Such an indication may also be referred to as a "beam indication".

As described herein, processing time may be used interchangeably with a processing time, a processing time window, a time window, a time gap, a switching time, a processing time, a processing delay, a processing delay, a timing difference, a processing time capability, a processing time capability type, a time offset, a preparation time, an activation time, a deactivation time, a switching time, an activation delay, a deactivation delay, a switching delay, and/or values thereof. In some instances, the values thereof may refer to minimum values. In some instances, the values thereof may refer to maximum values.

As described herein, time period may be used interchangeably with time duration, slot, mini-slot, symbol, frame, sub-frame, and/or values/durations thereof. In some instances, the values thereof may refer to minimum values. In some instances, the values thereof may refer to maximum values.

As described herein, processing of one or more channels and/or one or more signals may be used interchangeably to describe or otherwise refer to any of receiving and decoding a PDSCH, encoding and transmitting a PUSCH, encoding and transmitting an ACK/NACK, receiving and measuring Channel State Information (e.g., a CSI-RS and/or a SSB), processing, encoding and transmitting a CSI report, activating a TCI state, deactivating a TCI state, and/or switching a TCI state.

As described herein, processing time may be used interchangeably with processing time value, processing delay, processing delay value, timing difference, timing difference value, processing time capability, processing time capability type, time offset, time offset value, preparation time, preparation time value, activation/deactivation/switching time, activation/deactivation/switching time value, activation/deactivation/switching delay and/or activation/deactivation/switching delay value.

As described herein, TCI state activation or deactivation or switching may be used interchangeably with timeDurationForQCL, beam switching delay, TCI switch delay, spatial-relation activation or deactivation or switching, Scell activation or deactivation or switching, and/or beam activation or deactivation or switching, respectively.

As described herein, transmission/reception point (TRP) may be used interchangeably with CORESET group, CORESET pool, higher layer index, search space group, and/or panel.

As described herein, WTRU panel may be used interchangeably with SRS resource, SRS resource set, SRS resource set identity, WTRU antenna panel, WTRU Tx antenna panel, WTRU Rx antenna panel, and/or WTRU panel index. A WTRU panel may be associated with one or more antenna ports and/or beam indices.

As described herein, number of activated WTRU panels may be used interchangeably with number of activated SRS resources, number of activated SRS resource sets, number of activated WTRU panel indices and maximum number of transmission layers (e.g., for a WTRU and/or a BWP).

As described herein, WTRU panel may be used interchangeably with number of activated SRS resources, number of activated SRS resource sets, number of activated WTRU panel indices and maximum number of transmission layers (e.g., for a WTRU and/or a BWP).

As described herein, processing time value may be used interchangeably with WTRU processing type, PDCCH decoding type, PDSCH decoding type, PUCCH encoding type, PUSCH encoding type, CSI reporting type, and/or WTRU capability type.

As described herein, BWP activation/reactivation may be used interchangeably with enabling WTRU transmission, monitoring and/or reception of DL and/or UL signals, and (re-)initializing (any suspended) type-1 configured grants.

As described herein, BWP deactivation may be used interchangeably with disabling WTRU transmission, monitoring and/or reception of DL and/or UL signals, and suspending type-1 configured grants but still consistent with this invention.

As described herein, BWP switching may be used interchangeably with transitions between activation and deactivation of one or more BWPs and vice versa.

As described herein, NAP may be used interchangeably with base station, eNB, and/or gNB 180.

The following description includes individual examples for purposes of simplicity and clarity. While these examples may be described separately and/or separately, it should be understood that combinations of the following examples are well within the scope of the disclosure.

Determination of Processing Time

Figure 17:
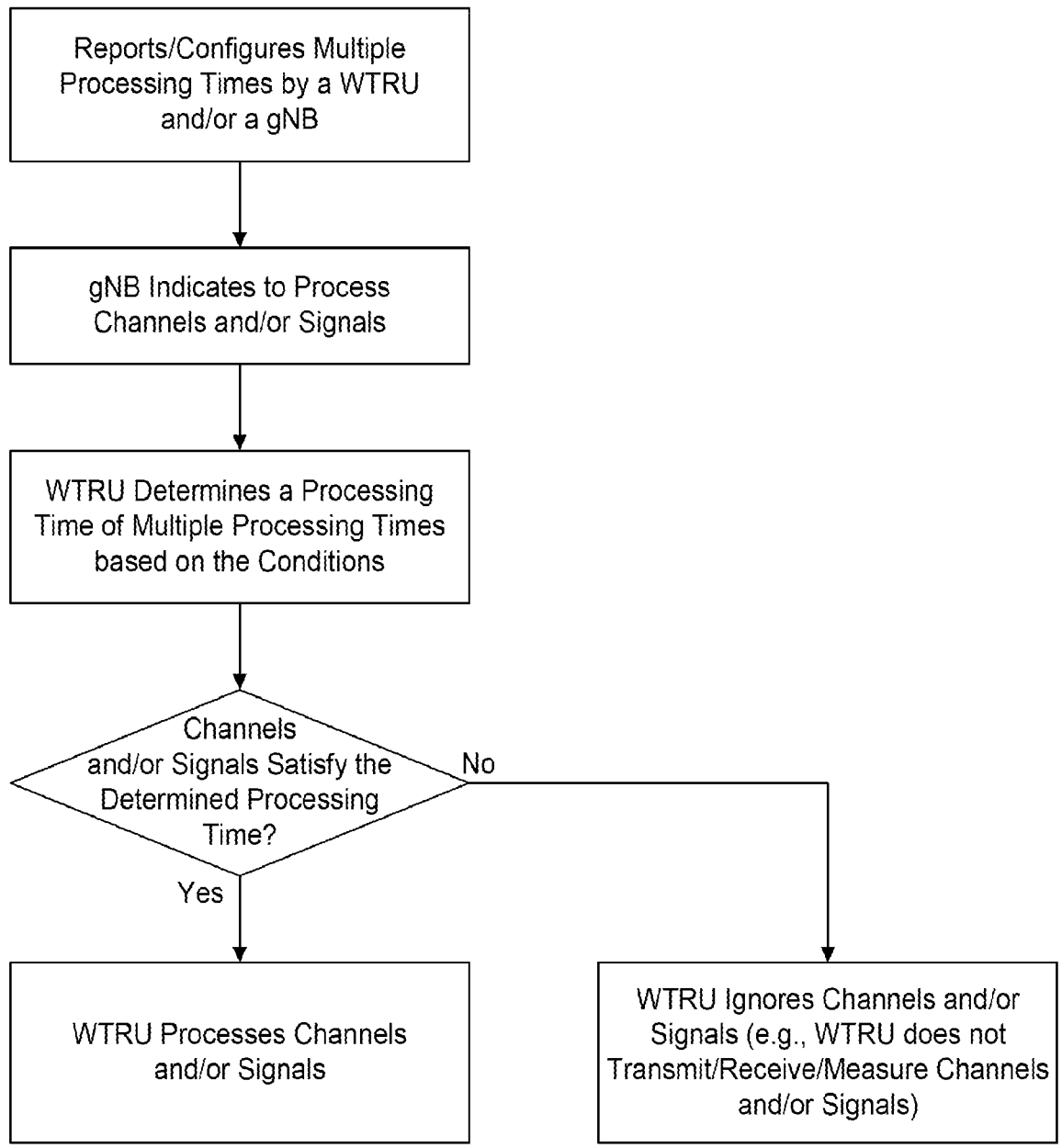
FIG. 17 is a diagram illustrating a representative procedure for determination of one or more processing time values to process one or more channels and/or signals.

FIG. 17 is a diagram illustrating a representative procedure for determination of one or more processing time values to process one or more channels and/or signals. As shown in FIG. 17, a WTRU 102 may report and/or be configured with one or more processing times which are for processing one or more channels and/or signals at 1702. A set of processing time values may be determined and/or used based, at least in part, on one or more of (1) predefined processing time values, (2) WTRU capabilities, and/or (3) an indication or configuration from a gNB 180. It should be understood that a set of processing times may be inclusive of both a single processing time value and plural processing time values. In certain representative embodiments, the UE may be provided with a set of predefined processing time values. In other representative embodiments, the WTRU 102 may determine or report a set of processing time values based on one or more WTRU capabilities. In still other representative embodiments, the WTRU 102 may be configured with a set of processing time values from a gNB 180. For example, configuring the WTRU 102 with a set of processing time values may be based, at least in part, on one or more RRC messages and/or one or more MAC CEs. After being configured with one or more processing times which are for processing one or more channels and/or signals, the gNB 180 may indicate one or more channels and/or signals to be processed at 1704 and the WTRU 102 may then determine one or more processing times from among the set of processing times which are to be applied to process the channels and/or signals at 1706. In certain embodiments, the WTRU 102 may be configured to send a report which includes at least the determined one or more processing times (e.g., to the gNB 180).

In certain embodiment as described herein, a WTRU 102 may be described as being configured to determine any of a threshold, processing time, reporting time and/or the like. It should be apparent and understood that it is fully intended that any use of to determine may also refer to a WTRU 102 actually performing such determination (e.g., determining).

After the determination of the one or more processing times (e.g., time values) from among the set of processing times which are to be applied to process the channels and/or signals, the WTRU 102 may be configured to determine whether or not the corresponding one or more channels and/or signals satisfy the determined one or more processing times (e.g., can be successfully decoded and/or transmitted within the determined processing time(s)) at 1708. On condition that the corresponding one or more channels and/or signals satisfy the determined one or more processing times (e.g., can be successfully decoded within the determined processing time(s)), the WTRU 102 may be configured to perform one or more processes (e.g., one or more operations and/or acts), such as transmission, reception, measurement and/or reporting, on the corresponding one or more channels and/or signals at 1710. On condition that the corresponding one or more channels and/or signals are deemed to not satisfy the determined one or more processing times, the WTRU 102 may be configured to ignore the corresponding one or more channels and/or signals at 1712. In certain embodiments, a WTRU 102 may ignore one or more channels and/or signals by not performing processes thereon (e.g., not performing transmission, reception, measurement and/or reporting on the channels and/or signals to be ignored).

Processing Time—Modes of Operation

In certain representative embodiments, the WTRU 102 may be configured to perform processing time configuration according to one or more modes of operation. The one or more modes may include a dynamic determination mode and/or a semi-static determination mode. A number, or a maximum number, of configured processing times may be determined based on a determined mode operation which is configured or to be used by the WTRU 102. For example, a mode of operation may be determined based on a number of processing time values in the set of processing values used, configured, determined, and/or supported as a WTRU capability. A WTRU 102 may be configured to determine a mode of operation based on a number of configured/indicated processing time values. After a gNB 180 indicates or configures one processing time value, the WTRU 102 may then determine to use a particular mode of operation (e.g., semi-static determination mode). After the gNB 180 indicates or configures plural processing time values, the WTRU 102 may then determine to use another particular mode of operation (e.g., dynamic determination mode).

As another example, a mode of operation may be determined based on a WTRU capability and/or a gNB configuration based on the WTRU capability reporting.

As yet another example, a WTRU 102 may be configured to request a preferred mode of operation for processing time determination. For example, a WTRU 102 is configured to support plural modes of operation, and the WTRU 102 may indicate to a gNB 180 as to a preferred mode of operation among the plural modes of operation. For instance, the WTRU 102 may determine the preferred mode of operation based on one or more of cell configuration, cell activation, panel configuration, panel activation, TCI state configuration, TCI state activation, spatial relation configuration, spatial relation activation, RS configuration, RS activation, plural TRP support, CORESET pool support, and/or a higher layer index.

In certain representative embodiments, in accordance with a first mode of operation (e.g., semi-static determination mode), a WTRU 102 may use an indicated or configured processing time value for processing one or more channels and/or signals. In certain embodiments, in accordance with a second mode of operation (e.g., dynamic determination mode), a WTRU 102 may determine a processing time value based on one or more system parameters, WTRU-specific parameters, and/or channel conditions. As an example, the system parameters may include one or more of a physical cell identity, a number of SSB(s) configured or used in a serving cell, a SCS of one or more broadcasting channels, a frequency range, waveforms used such as OFDM and/or DFT-s-OFDM (e.g., a first waveform may be referred to as a waveform without transform precoding disabled, such as OFDM, and a second waveform may be referred to as a waveform with transform precoding enabled, such as DFT-s-OFDM). As another example, the WTRU-specific parameters may include one or more of BWP configuration parameters or parameters related thereto (e.g., SCS, bandwidth, DM-RS configuration, PDCCH configuration(s), Modulation and Coding Scheme (MCS) table), BWP identity, and/or Discontinuous Reception (DRX) configuration. The WTRU-specific parameters may include whether SCS of BWPs in a same carrier are the same or different.

Processing Time—Determination Thresholds

In certain representative embodiments, one or more thresholds may be used in the WTRU determination of a processing time value. A threshold may be based, at least in part, on one or more of a predetermined value, a gNB indication (e.g., via RRC, MAC CE and/or DCI), and/or a WTRU capability (e.g., capability report by the WTRU 102). The thresholds may comprise more than one value (e.g., two or more values) to determine a processing time value from among three or more of processing time values as potential candidates. For example, a WTRU 102 may be configured to determine that a parameter value (e.g., system parameter, WTRU-specific parameter, and/or channel condition) is less than (or less than or equal to) to a first threshold, which in turn may determine a first processing time value. The WTRU 102 may be configured to determine that the parameter value is greater than (or greater than or equal to) the first threshold and less than or equal to (or less than) a second threshold, which in turn may determine a second processing time value. The WTRU 102 may be configured to determine that the parameter value is greater than (or greater than or equal to) the second threshold which in turn may determine a third processing time value. It should be understood that a threshold may be based on any combination or permutation of any of one or more predetermined values, one or more gNB indications, and/or one or more WTRU capabilities.

Processing Time—PDSCH/PUSCH

In certain representative embodiments, a processing time value may be determined from a plurality of processing time values, and the determined processing time value may be a processing time value at least for (1) decoding PDSCH and encoding/transmitting ACK/NACK, and/or (2) encoding/transmitting PUSCH. In the case of decoding PDSCH and encoding/transmitting ACK/NACK, the processing time to decode the PDSCH and encode/transmit the ACK/NACK may be determined at least in part on a PDSCH transmission of the NAP (e.g., gNB) and/or another network entity. For example, the processing time may be defined, at least in part, as a time between an end of a last symbol of the PDSCH carrying a scheduled Transport Block (TB) and an uplink symbol for ACK/NACK transmission. In the case of encoding/transmitting PUSCH, the processing time may be determined based on a PDCCH scheduling the PUSCH. For example, the processing time may be defined, at least in part, as a start time and/or a trigger time to appropriately generate a first uplink symbol in the scheduled PUSCH for timely transmission. The processing time may be defined to begin at a last symbol (e.g., the end of the last symbol) of the PDCCH scheduling the PUSCH.

Processing Time—WTRU Determination

In certain representative embodiments, a WTRU 102 may be configured to determine a processing time value from a plurality of processing time values based, at least in part, on one or more of a frequency range property, SCS property, configuration, activation and/or indication associated with PDCCH (e.g., a CORESET property and/or a search space property, etc.), a PDSCH property (e.g., PDSCH size, PDSCH location, PDSCH type, etc.), a PUSCH property (e.g., PUSCH size, PUSCH location, PUSCH size, etc.), priority indicator, carrier aggregation, channel coding type, channel estimation type, waveform usage, scheduling restriction, a LBT property, a link type, and/or a power saving property.

In the case of frequency range, as a first example, after a scheduling PDCCH is received in a first frequency range (e.g., FR1 or FR2), a WTRU 102 may be configured to determine a first processing time value from among plural processing time values. After a scheduling PDCCH is received in a second frequency range (e.g., frequency range 3 (FR3) or frequency range 4 (FR4)), the WTRU 102 may be configured to determine a second processing time value from among the plural processing time values. In certain embodiments, FR3 and FR4 may refer to sets of signals above a particular frequency (e.g., above 52.6 GHz) and/or segments of wireless spectrum above a particular frequency (e.g., above 52.6 GHz). Other sets and/or segments are possible for any of FR3 and/or FR4.

As another example regarding frequency range, after a scheduling PDSCH, and/or a PUSCH, is received in a first frequency range (e.g., FR1 or FR2), a WTRU 102 may be configured to determine a first processing time value from among plural processing time values. In addition, after a scheduling PDSCH, and/or a PUSCH is received in a second frequency range (e.g., frequency range 3 (FR3) or frequency range 4 (FR4)), the WTRU 102 may be configured to determine a second processing time value from among the plural processing time values.

In the case of SCS, a WTRU 102 may be configured to determine a first processing time value from among plural processing time values based at least in part on SCS of a PDCCH which is scheduling a PDSCH (and/or a PUSCH) being less than (or equal to) a threshold. The WTRU 102 may be configured to determine a second processing time value from among plural processing time values based at least in part on the SCS of the PDCCH scheduling the PDSCH (and/or PUSCH) being larger than the threshold.

As another example regarding SCS, a WTRU 102 may be configured to determine a first processing time value from among plural processing time values based at least in part on SCS of a scheduled PDSCH (and/or a PUSCH) being less than (or equal to) a threshold. The WTRU 102 may be configured to determine a second processing time value from among plural processing time values based at least in part on the SCS of the PDCCH scheduling the PDSCH (and/or PUSCH) being larger than the threshold.

In the case of PDCCH, the configuration, activation and/or indication associated with a PDCCH may relate to an aggregation level (e.g., a number of Control Channel Elements (CCE)). A WTRU 102 may determine a processing time value from among plural processing time values based on an aggregation level of a scheduling PDCCH. For example, the WTRU 102 may be configured to determine a first processing time value from among the plural processing time values to decode a PDSCH or encode a PUSCH based at least in part on the aggregation level of a scheduling PDCCH being less than (or equal to) a threshold. The WTRU 102 may determine a second processing time value to decode the PDSCH or encode the PUSCH from among the plural processing time values based at least in part on the aggregation level of the scheduling PDCCH being less than (or equal to) the threshold.

The configuration, activation and/or indication associated with a PDCCH may relate to a number of CORESETs and/or search spaces. A WTRU 102 may determine a processing time value from among plural processing time values based on a number of CORESETs and/or search spaces. In certain embodiments, a plurality of CORESETs and/or search spaces may be used to schedule one or more PDSCHs and/or PUSCHs. In some instances, this may provide improvements in reliability of DCI. For example, the WTRU 102 may be configured to determine a first processing time value from among the plural processing time values to decode a PDSCH or encode a PUSCH based at least in part on a number of CORESETs and/or search spaces of one or more of scheduling PDCCHs being less than (or equal to) a threshold. The WTRU 102 may be configured to determine a second processing time value to decode the PDSCH or encode the PUSCH from among the plural processing time values based at least in part on the number of CORESETs and/or search spaces of the one or more of scheduling PDCCHs being greater than the threshold.

In addition, a gNB 180 may schedule one or more PDSCHs and/or PUSCHs, and a WTRU 102 may be configured to monitor a plurality of CORESETs and/or search spaces. A WTRU 102 may be configured to determine a processing time value from among plural processing time values based on the monitored CORESETs and/or search spaces. For example, the WTRU 102 may be configured to determine a first processing time value from among the plural processing time values to decode a PDSCH or encode a PUSCH based at least in part on the number of monitored CORESETs and/or search spaces being less than (or equal to) a threshold. The WTRU 102 may be configured to determine a second processing time value to decode the PDSCH or encode the PUSCH from among the plural processing time values based at least in part on the number of monitored CORESETs and/or search spaces being greater than the threshold.

The configuration, activation and/or indication associated with a PDCCH may relate to a number of blind decodings (e.g., attempts). For example, a WTRU 102 may be configured to determine a first processing time value from among the plural processing time values based at least in part on a number of PDCCH blind decodings in a time period (e.g., slot, mini-slot, etc.) being less than (or equal to) a threshold. The WTRU 102 may be configured to determine a second processing time value from among the plural processing time values based at least in part on the number of PDCCH blind decodings in the time period being greater than the threshold.

The configuration, activation and/or indication associated with a PDCCH may relate to a CORESET and/or search space order. The order may be based at least in part on a parameter (e.g., identifier, index, etc.) of the CORESETs and/or search spaces. For example, a WTRU 102 may be configured to determine a first processing time value to decode the PDSCH or encode the PUSCH from among the plural processing time values based at least in part on the order being less than (or equal to) a threshold. The WTRU 102 may be configured to determine a second processing time value from among the plural processing time values to decode the PDSCH or encode the PUSCH based at least in part on the order being greater than the threshold.

The configuration, activation and/or indication associated with a PDCCH may relate to at least one CORESET and/or search space location (e.g., time location or frequency location). A WTRU 102 may be configured to determine a processing time value from among plural processing time values based on one or more of time locations of at least one CORESET and/or search space of a scheduling PDCCH. For example, the WTRU 102 may be configured to determine a first processing time value from among plural processing time values based at least in part on a starting symbol of at least one CORESET and/or search space in which the WTRU 102 receives the scheduling PDCCH. The CORESET and/or search space may start from an n-th symbol. This may otherwise be referred to herein as scheduling CORESET and/or search space. The WTRU 102 may be configured to determine a first processing time value from among the plural processing time values based at least in part on 'n' being less than (or equal to) a threshold. The WTRU 102 may be configured to determine a second processing time value from among the plural processing time values based at least in part on 'n' being greater than the threshold.

As another example, a WTRU 102 may be configured to determine a first processing time value from among plural processing time values based at least in part on an ending symbol of at least one scheduling CORESET and/or search space. The scheduling CORESET and/or search space may end at an n-th symbol. The WTRU 102 may be configured to determine a first processing time value from among the plural processing time values based at least in part on 'n' being less than (or equal to) a threshold. The WTRU 102 may be configured to determine a second processing time value from among the plural processing time values based at least in part on 'n' being greater than the threshold.

For example, a WTRU 102 may be configured to determine a processing time value from among plural processing time values based on one or more of frequency locations of at least one CORESET and/or search space of a scheduling PDCCH. For example, frequency distance between center frequency and the CORESET/search space may be used. The WTRU 102 may determine a first processing time value from among the plural processing time values based at least in part on the frequency distance being smaller than (or equal to) a threshold. The WTRU 102 may determine a second processing time value from among the plural processing time values based on least in part on the frequency distance being larger than the threshold.

The configuration, activation and/or indication associated with a PDCCH may relate to at least one search space type. A WTRU 102 may be configured to determine a processing time value from among plural processing time values based on a search space type configuration of a scheduling PDCCH. For example, the WTRU 102 may be configured to determine a first processing time value from among plural processing time values based at least in part on the search space type being a first type (e.g., common). The WTRU 102 may be configured to determine a second processing time value from among the plural processing time values based at least in part on the search space type being a second type (e.g., WTRU-specific). As above, the WTRU 102 may perform the determination based on the search space type according to configured DCI formats. For example, the WTRU 102 may be configured to determine the first processing time value on condition that DCI formats "0_0" and/or "1_0" are configured. For example, the second processing time value may be determined on condition that any of DCI formats "0_1", "0_2", "1_1", "1_2", etc. are configured.

The configuration, activation and/or indication associated with a PDCCH may relate to at least one slot duration. The WTRU 102 may be configured to determine a processing time value from among plural processing time values based on a number of consecutive slots of at least one search space of a scheduling PDCCH. For example, the WTRU 102 may be configured to determine a first processing time value from among plural processing time values based at least in part on the number of slots (e.g., duration) of at least one search space being less than (or equal to) a threshold. The WTRU 102 may be configured to determine a second processing time value from among the plural processing time values based at least in part on the number of slots of the at least one search space type being greater than the threshold.

The configuration, activation and/or indication associated with a PDCCH may relate to at least one data combining type and/or repetition type. The WTRU 102 may be configured to determine a processing time value from among plural processing time values based on a data combining type and/or a repetition type of a scheduling PDCCH. The WTRU 102 may be configured to support PDCCH repetition to provide added reliability for one or more CORESETs and/or search spaces. For example, the WTRU 102 may be configured to determine a first processing time value from among plural processing time values based at least in part on the WTRU 102 not supporting PDCCH repetition (or not supporting data combining) for the scheduling CORESET and/or search space. The WTRU 102 may be configured to determine a second processing time value from among the plural processing time values based at least in part on the WTRU 102 supporting PDCCH repetition (or supporting data combining) for the scheduling CORESET and/or search space.

As another example, the WTRU 102 may be configured to determine a first processing time value from among plural processing time values based at least in part on a first type of PDCCH repetition (e.g., number of repetitions) being provided for the scheduling CORESET and/or search space. The WTRU 102 may be configured to determine a second processing time value from among the plural processing time values based at least in part on the WTRU 102 supporting a second type of PDCCH repetition (e.g., number of repetitions) for the scheduling CORESET and/or search space.

As yet another example, the WTRU 102 may be configured to determine a first processing time value from among plural processing time values based at least in part on a first type of data combining (e.g., no data combining or chase combining) being provided for the scheduling CORESET and/or search space. Further, the WTRU 102 may be configured to determine a second processing time value from among the plural processing time values based at least in part on the WTRU 102 supporting a second type of data combining (e.g., soft combining or incremental redundancy) for the scheduling CORESET and/or search space.

The configuration, activation and/or indication associated with a PDCCH may relate to at least one search space skipping and/or search space switching. The WTRU 102 may be configured to determine a processing time value from among plural processing time values based on one or more search space types and/or a number of blind decodings. The number of blind decodings may be configured and/or indicated for one or more search spaces. For example, the WTRU 102 may be configured with a one or more first search spaces associated with a first search space type and/or a first number of blind decodings and configured with one or more second search spaces associated with a second search space type and/or a second number of blind decodings. Based on the configuration, the WTRU 102 may receive an activation of the one or more first search spaces or the one or more second search spaces. On condition that the WTRU 102 receives an activation of at least one of the first search spaces, the WTRU 102 may determine to use a first processing time. On condition that the WTRU 102 receives an activation of at least one of the second search spaces, the WTRU 102 may determine to use a second processing time.

As another example, on condition that the WTRU 102 receives an activation of at least one of the first search spaces and at least one of the second search spaces, the WTRU 102 may determine the first processing time or the second processing time. In a further example, the WTRU 102 may prioritize using either of the first search spaces and the second search spaces (e.g., activated search spaces) based on a prioritization. For example, the WTRU 102 may determine a first processing time associated with a first search space (e.g., with priority) over a second processing time associated with a second search space on condition that both the first search space(s) and a second search space(s) are (e.g., determined to be) activated. The prioritization may be based on any of predefined rules, a received configuration and/or indication (e.g., from a gNB 180), and/or a determination by the WTRU 102.

The predefined rules may be based, for example, on any of search space ID, search space type, number of configured blind detections, and/or DCI format. For example, the WTRU 102 may prioritize the search spaces based on having a higher or lower search space ID. For example, the WTRU 102 may prioritize the search spaces based on one of the search spaces having a first search space type rather than a second search space type. For example, the WTRU 102 may prioritize the search spaces based on the search spaces having a higher or lower number of configured blind detections configured for the respective search spaces. For example, the WTRU 102 may prioritize the search spaces based on one of the search spaces having a first DCI format rather than a second DCI format.

As another example, the WTRU 102 may prioritize the search spaces based on a NAP (e.g., gNB 180) configuration and/or indication. For example, the WTRU 102 may determine to use one of the first search spaces based on the gNB configuration and/or indication. For example, the WTRU 102 may receive the gNB configuration and/or indication to use one of the one or more first search spaces, such as on condition that both first and second search spaces are configured. The WTRU 102 may determine to use one of the one or more first search spaces based on information indicated by the configuration and/or indication.

As another example, the WTRU 102 may prioritize the search spaces based on a determination made by the WTRU 102. The WTRU 102 may determine to use one of the first search spaces based on any of a power parameter and/or a channel parameter. The WTRU 102 may determine to use one of the first search spaces or second search spaces based on a power parameter such as WTRU battery status. On condition that the charged amount of the WTRU battery is less than or equal to a threshold, the WTRU 102 may determine to use one of the first search spaces. On condition that the charged amount of the WTRU battery is greater than the threshold, the WTRU 102 may determine to use one of the second search spaces. The WTRU 102 may also determine to use one of the first search spaces or second search spaces based on a channel parameter such as a measured and/or calculated channel quality. On condition that the channel quality is less than or equal to a threshold, the WTRU 102 may determine to use one of the first search spaces. On condition that the channel quality is greater than the threshold, the WTRU 102 may determine to use one of the second search spaces. The channel quality may, for example, include or be based on any of a hypothetical PDCCH BLER, RSRP, RSRQ, SINR, L1-RSRP, L1-RSRQ, CQI, etc. The threshold may be based on one or more predefined values, configured and/or indicated values (e.g., from a gNB 180), and/or reported values (e.g., via WTRU capability). Multiple thresholds may be used for the determination in certain representative embodiments.

In the case of a time domain property of PDSCH and/or PUSCH, the WTRU 102 may be configured to determine a processing time value based at least in part on one or more of a symbol of a slot and/or a slot offset (e.g., difference in time domain) between PDCCH and a scheduled PDSCH/PUSCH. For example, the WTRU 102 may be configured to determine a first processing time value from among the plural processing time values based at least in part on a n-th symbol (e.g., starting symbol or ending symbol) being less than (or equal to) a threshold. Further, the WTRU 102 may be configured to determine a second processing time value from among the plural processing time values based at least in part on the n-th symbol (e.g., starting symbol or ending symbol) being greater than the threshold.

As another example, the WTRU 102 may be configured to determine a first processing time value from among the plural processing time values based at least in part on a slot offset between PDCCH and a scheduled PDSCH/PUSCH being less than (or equal to) a threshold. Further, the WTRU 102 may be configured to determine a second processing time value from among the plural processing time values based at least in part on the slot offset between PDCCH and the scheduled PDSCH/PUSCH being less than (or equal to) a threshold.

In the case of a frequency domain property of PDSCH and/or PUSCH, the WTRU 102 may be configured to determine a processing time value based at least in part on one or more of a frequency distance (e.g., difference in frequency domain). For example, the WTRU 102 may be configured to determine a first processing time value from among the plural processing time values based at least in part on a frequency distance between a carrier frequency (e.g., a center frequency of the carrier) and the scheduled PDSCH and/or PUSCH being less than (or equal to) a threshold. Further, the WTRU 102 may be configured to determine a second processing time value from among the plural processing time values based at least in part on the frequency distance between the carrier frequency and the scheduled PDSCH and/or PUSCH being greater than the threshold.

As another example, the WTRU 102 may be configured to determine a first processing time value from among the plural processing time values based at least in part on a frequency distance between a scheduling PDCCH and the scheduled PDSCH and/or PUSCH being less than (or equal to) a threshold. Further, the WTRU 102 may be configured to determine a second processing time value from among the plural processing time values based at least in part on the frequency distance between the scheduling PDCCH and the scheduled PDSCH and/or PUSCH being greater than the threshold.

In the case of a PDSCH and/or PUSCH property, the WTRU 102 may be configured to determine a processing time value based at least in part on any of a PDSCH and/or PUSCH Transport Block Size (TBS), a PDSCH and/or PUSCH Modulation and Coding Scheme (MCS) (e.g., a MCS index), a PDSCH and/or PUSCH rank (e.g., number of transmission layers), a PDSCH code rate, a PUSCH code rate, and/or multi-slot scheduling. For example, the WTRU 102 may be configured to determine a first processing time value from among plural processing time values based at least in part on a TBS of the scheduled PDSCH and/or PUSCH being less than (or equal to) a threshold. Further, the WTRU 102 may be configured to determine a second processing time value from among the plural processing time values based at least in part on the TBS of the scheduled PDSCH and/or PUSCH being greater than the threshold.

As another example, the WTRU 102 may be configured to determine a first processing time value from among plural processing time values based at least in part on a MCS index of the scheduled PDSCH and/or PUSCH being less than (or equal to) a threshold. Further, the WTRU 102 may be configured to determine a second processing time value from among the plural processing time values based at least in part on the MCS index of the scheduled PDSCH and/or PUSCH being greater than the threshold.

As yet another example, the WTRU 102 may be configured to determine a first processing time value from among plural processing time values based at least in part on a rank of the scheduled PDSCH and/or PUSCH being less than (or equal to) a threshold. Further, the WTRU 102 may be configured to determine a second processing time value from among the plural processing time values based at least in part on the rank of the scheduled PDSCH and/or PUSCH being greater than the threshold.

As still another example, the WTRU 102 may be configured to determine a first processing time value from among plural processing time values based at least in part on a code rate of the scheduled PDSCH and/or PUSCH being less than (or equal to) a threshold. Further, the WTRU 102 may be configured to determine a second processing time value from among the plural processing time values based at least in part on the code rate of the scheduled PDSCH and/or PUSCH being greater than the threshold.

As an additional example, the WTRU 102 may be configured to determine a first processing time value from among plural processing time values based at least in part on whether or not one or more (e.g., scheduled) parameters of a scheduled PDSCH and/or PUSCH are less than or equal to a threshold. The WTRU 102 may be configured to determine a second processing time value from among the plural processing time values based at least in part on whether or not one or more (e.g., scheduled) parameters of a scheduled PDSCH and/or PUSCH are greater than the threshold. The one or more (e.g., scheduled) parameters of the scheduled PDSCH and/or PUSCH may be based on any of a number of scheduled slots, a number of TBs, multi-slot (e.g., PDCCH) monitoring, one or more time domain resource allocation (TDRA) field configurations and/or indications, and/or one or more frequency domain resource allocation (FDRA) field configurations and/or indications.

In the case of multi-slot monitoring, the WTRU 102 may determine a first processing time value based on a (e.g., maximum) number of monitored candidates (e.g., PDCCH candidates) and/or a (e.g., maximum) number of non-overlapped CCEs being defined per slot. The WTRU 102 may determine a second processing time value based on the (e.g., maximum) number of monitored candidates (e.g., PDCCH candidates) and/or the (e.g., maximum) number of non-overlapped CCEs being defined for multiple slots and/or a span corresponding to multiple slots.

In the case of TDRA field configurations and/or indications, the WTRU 102 may determine a first processing time based on one or more TDRA field configurations (e.g., any of slot offset K0, HARQ-ACK timing K1, slot offset K2, starting symbol S, and/or allocation length L) being less than or equal to a threshold. The WTRU 102 may determine a second processing time value based on one or more of the TDRA field configurations being greater than the threshold.

As an example, the WTRU 102 may determine a first processing time value based on a first TDRA field configuration and/or indication being less than or equal to a first threshold and a second TDRA field configuration and/or indication being less than or equal to a second threshold. Otherwise, the WTRU 102 may determine a second processing time value (e.g., based on the first and/or second thresholds being exceeded). In yet another example, three or more configurations and/or thresholds may be used with three or more (e.g., corresponding) thresholds to determine a processing time value from among multiple processing time values. A respective threshold may be based on any of one or more predefined values, one or more configured and/or indicated values from a RAN (e.g., gNB 180), and/or one or more reported values of the WTRU 102 (e.g., WTRU capabilities).

In the case of FDRA field configurations and/or indications, the WTRU 102 may determine a first processing time based on one or more FDRA field configurations (e.g., any of RBG size, total number of RBGs, frequency resource allocation type and/or number of allocated RBs and/or RBGs) being less than or equal to a threshold. The WTRU 102 may determine a second processing time value based on one or more of the FDRA field configurations being greater than the threshold.

As an example, the WTRU 102 may determine a first processing time value based on a first FDRA field configuration and/or indication being less than or equal to a first threshold and a second FDRA field configuration and/or indication being less than or equal to a second threshold. Otherwise, the WTRU 102 may determine a second processing time value (e.g., based on the first and/or second thresholds being exceeded).

As an example, the WTRU 102 may determine a first processing time value based on a first FDRA field configuration and/or indication being less than or equal to a first threshold and a second FDRA field configuration and/or indication being less than or equal to a second threshold. Otherwise, the WTRU 102 may determine a second processing time value (e.g., based on the first and/or second thresholds being exceeded). In yet another example, three or more configurations and/or thresholds may be used with three or more (e.g., corresponding) thresholds to determine a processing time value from among multiple processing time values. A respective threshold may be based on any of one or more predefined values, one or more configured and/or indicated values from a RAN (e.g., gNB 180), and/or one or more reported values of the WTRU 102 (e.g., WTRU capabilities).

In the case of a PDSCH and/or PUSCH data combining type and/or repetition type, the WTRU 102 may be configured to determine a processing time value from among plural processing time values based on a data combining type and/or a repetition type of a scheduled PDSCH and/or PUSCH. The WTRU 102 may be configured to support PDSCH repetition to provide added reliability. For example, the WTRU 102 may be configured to determine a first processing time value from among plural processing time values based at least in part on the WTRU 102 not being configured to support PDSCH repetition (or data combining) for the scheduled PDSCH and/or PUSCH. Further, the WTRU 102 may be configured to determine a second processing time value from among the plural processing time values based at least in part on the WTRU 102 being configured to support PDSCH repetition (or data combining) for the scheduled PDSCH and/or PUSCH.

As another example, the WTRU 102 may be configured to determine a first processing time value from among plural processing time values based at least in part on a first type of PDSCH repetition (e.g., number of repetitions) being provided for the scheduled PDSCH and/or PUSCH. Further, the WTRU 102 may be configured to determine a second processing time value from among the plural processing time values based at least in part on the WTRU 102 supporting a second type of PDSCH repetition (e.g., number of repetitions) for the scheduled PDSCH and/or PUSCH.

As yet another example, the WTRU 102 may be configured to determine a first processing time value from among plural processing time values based at least in part on a first type of data combining (e.g., no data combining or incremental redundancy) being provided for the scheduling CORESET and/or search space. Further, the WTRU 102 may be configured to determine a second processing time value from among the plural processing time values based at least in part on the WTRU 102 supporting a second type of data combining (e.g., soft combining or incremental redundancy) for the scheduling CORESET and/or search space.

In the case of TCI states and/or SRIs, the WTRU 102 may be configured to determine a processing time value from among plural processing time values based at least in part on whether one or more (e.g., indicated) TCI states and/or SRI(s) are activated or not. For example, the WTRU 102 may support PDSCH and/or PUSCH transmission with one or more TCI states, one or more QCL Type-D RSs in the TCI states, and/or one or more SRI(s) for beam indication (e.g., QCL Type-D and/or spatial relation filter). The WTRU 102 may determine a first processing time value based on the one or more TCI states, the one or more QCL Type-D RSs and/or the SRIs being activated. The WTRU 102 may determine a second processing time value based on the one or more TCI states, the one or more QCL Type-D RSs and/or the SRIs not being activated.

In the case of TCI states, the WTRU 102 may be configured to determine a processing time value from among plural processing time values based at least in part on one or more of a number of activated panels, a number of TRPs and/or a number of beams. A WTRU 102 may be configured with plural WTRU panels and any panel may be associated with a respective panel identifier (ID). Further, the WTRU 102 may be configured to activate and/or deactivate one or more panels (e.g., based on control and/or signaling from a gNB 180). For example, the WTRU 102 may be configured to determine a first processing time value from among plural processing time values based at least in part on a number of activated panels of the WTRU 102 being less than (or equal to) a threshold. The WTRU 102 may be configured to determine a second processing time value from among the plural processing time values based at least in part on the number of activated panels of the WTRU 102 being less than (or equal to) the threshold.

For example, a WTRU 102 may be configured with plural SRS resources and/or resource sets for uplink (UL) transmission. The WTRU 102 may be configured to activate and/or deactivate one or more SRS resources and/or resource sets (e.g., a SRS resource indicator (SRI) and/or a SRS resource set indicator may be provided to the WTRU 102 via PDCCH). In other words, a NAP (e.g., gNB 180) may indicate one or more beams and/or one or more WTRU panels to be activated (e.g., for UL transmission). For example, the WTRU 102 may be configured to determine a first processing time value from among plural processing time values based at least in part on a number of activated SRS resources and/or resource sets being less than (or equal to) a threshold. Further, the WTRU 102 may be configured to determine a second processing time value from among the plural processing time values based at least in part on the number of activated SRS resources and/or resource sets being less than (or equal to) the threshold.

In addition, a WTRU 102 may be configured with plural TRPs and may be configured to activate and/or deactivate one or more of the TRPs. For example, a NAP (e.g., gNB 180) may indicate one or more TRPs to be activated and the gNB 180 may schedule PDSCH transmission based on the activated TRPs. The WTRU 102 may be configured to determine a first processing time value from among plural processing time values based at least in part on a number of activated TRPs being less than (or equal to) a threshold. Further, the WTRU 102 may be configured to determine a second processing time value from among the plural processing time values based at least in part on the number of activated TRPs being less than (or equal to) the threshold.

A WTRU 102 may be configured with plural TCI states or may be configured to activate and/or deactivate plural TCI states. For example, the WTRU 102 may be configured to determine a first processing time value from among plural processing time values based at least in part on a number of configured and/or activated TCI states being less than (or equal to) a threshold. The WTRU 102 may be configured to determine a second processing time value from among the plural processing time values based at least in part on the number of configured and/or activated TCI states being less than (or equal to) the threshold.

In the case of a priority indicator, the WTRU 102 may be configured to determine a priority of PUCCH and/or PUSCH based on the priority indicator. For example, the WTRU 102 may be configured to determine a first processing time value from among plural processing time values based at least in part on a priority indicator (e.g., 0) being less than (or equal to) a threshold. The WTRU 102 may be configured to determine a second processing time value from among the plural processing time values based at least in part on the priority indicator (e.g., 1) being greater the threshold.

In the case of carrier aggregation, the WTRU 102 may be configured to determine a processing time value based at least in part on one or more of a number of active cells, a number of scheduled PDSCHs, PUSCHs and/or cells, a number of PDSCHs and/or PUSCHs. For example, a WTRU 102 may be provided in a location with plural serving cells. Hence, the WTRU 102 may be configured to determine a first processing time value from among plural processing time values based at least in part on a number of activated cells being less than (or equal to) a threshold. The WTRU 102 may be configured to determine a second processing time value from among the plural processing time values based at least in part on the number of activated cells being greater than the threshold.

A WTRU 102 may be configured to be simultaneously scheduled with plural PDSCHs and/or PUSCHs (e.g., via scheduling by one or more PDCCHs of one or more gNBs 180). The WTRU 102 may be configured to determine a first processing time value from among plural processing time values based at least in part on a number of simultaneously scheduled PDSCHs, PUSCHs and/or cells being less than (or equal to) a threshold. The WTRU 102 may be configured to determine a second processing time value from among the plural processing time values based at least in part on the number of simultaneously scheduled PDSCHs, PUSCHs and/or cells being greater than the threshold.

A WTRU 102 may be configured to be simultaneously transmit plural PDSCHs and/or simultaneously receive plural PUSCHs. For instance, plural PDCCHs having different slot offsets may be used by the WTRU 102 to transmit plural PDSCHs in one or more cells. Hence, the WTRU 102 may be configured to determine a first processing time value from among plural processing time values based at least in part on a number of simultaneously transmitted PDSCHs and/or simultaneously received PUSCHs being less than (or equal to) a threshold. Further, the WTRU 102 may be configured to determine a second processing time value from among the plural processing time values based at least in part on the number of simultaneously transmitted PDSCHs and/or simultaneously received PUSCHs being greater than the threshold.

In the case of channel coding, the WTRU 102 may be configured to determine a processing time value based at least in part on one or more channel coding types of one or more channels (e.g., PDCCH, PDSCH, PUCCH, PUSCH, etc.). In certain embodiments, the types of channel code may include one or more of repetition code, simplex code, polar code, parity-check code (e.g., low-density parity check), Reed Muller code, turbo code and/or convolutional code. For example, a WTRU 102 may be configured to determine a first processing time value from among plural processing time values based at least in part on a first type of channel coding being used for transmission and/or reception (e.g., at the WTRU 102). Further, the WTRU 102 may be configured to determine a second processing time value from among the plural processing time values based at least in part on a second type of channel coding being used for transmission and/or reception.

In the case of reference signal(s), the WTRU 102 may be configured to determine a processing time value based at least in part on one or more estimation types (e.g., DM-RS estimation) of one or more channels (e.g., PDCCH, PDSCH, PUCCH, PUSCH, etc.). For example, DM-RS channel estimation may be semi-statically configured (e.g., via RRC) or may be dynamically indicated (e.g., via DCI or MAC CE) and a WTRU 102 may be configured to determine a first processing time value from among plural processing time values based at least in part on DM-RS channel estimation being a first type (e.g., semi-static). Further, the WTRU 102 may be configured to determine a second processing time value from among the plural processing time values based at least in part on DM-RS channel estimation being a second type (e.g., dynamic).

As another example, the estimation types may include frequency domain bundling types (e.g., PRG and/or PRB bundling types). For example, frequency domain bundling types may include any one or more of (1) wideband, (2) 4 PRBs, (3) 2 PRBs, (4) 1 PRB, (5) implicit determination between 4 PRBs and wideband, and/or (6) implicit determination between 2 PRBs and wideband. Hence, a WTRU 102 may be configured to determine a first processing time value from among plural processing time values based at least in part on a first type of the frequency domain bundling types. Further, the WTRU 102 may be configured to determine a second processing time value from among the plural processing time values based at least in part on a second type of the frequency domain bundling types.

As yet another example, the estimation types may include time domain bundling types (e.g., slot aggregation). The WTRU 102 may be configured to determine a first processing time value from among plural processing time values based at least in part on a number of bundled slots in the time domain being less than (or equal to) a threshold. Further, the WTRU 102 may be configured to determine a second processing time value from among the plural processing time values based at least in part on the number of bundled slots in the time domain being greater than the threshold.

As still another example, the estimation types may include usage of one or more of Phase Tracking RSs (PT-RSs) and/or additional DM-RS(s). For example, one or more of additional reference signals, such as PT-RSs and/or additional DM-RSs, may be used to enhance DM-RS channel estimation performance. The WTRU 102 may be configured to determine a first processing time value from among plural processing time values based at least in part on one or more of the PT-RSs and/or additional DM-RSs not being used. Further, the WTRU 102 may be configured to determine a second processing time value from among the plural processing time values based at least in part on the one or more of the PT-RSs and/or additional DM-RSs being used.

In the case of waveform usage, the WTRU 102 may be configured to determine a processing time value based at least in part on one or more waveforms used, determined, indicated or configured for one or more channels and/or one or more signals. For example, a WTRU 102 may be configured to determine a first processing time value from among plural processing time values based at least in part on a first waveform (e.g., transform precoding enabled) being used for a channel. Further, the WTRU 102 may be configured to determine a second processing time value from among the plural processing time values based at least in part on a second waveform (e.g., transform precoding disabled) being used for the channel.

As another example, a WTRU 102 may be configured to determine a first processing time value from among plural processing time values based at least in part on a same waveform being used for DL and UL. Further, the WTRU 102 may be configured to determine a second processing time value from among the plural processing time values based at least in part on different waveforms (e.g., CP-OFDM, DFT-S OFDM and/or single carrier) being used for DL and/or UL.

In the case of scheduling restriction, the WTRU 102 may be configured to determine a processing time value based at least in part on a scheduling restriction value and/or level. For example, the scheduling restriction may include one or more of a maximum TBS, a maximum modulation order, a maximum transmission rank, a maximum number of scheduled RBs, etc. In certain embodiments, a scheduling restriction may imply that a WTRU 102 is not configured to expect to receive or be scheduled with a scheduling parameter which is restricted. Hence, the WTRU 102 may be configured to determine a first processing time value from among plural processing time values based at least in part on a first scheduling restriction level (e.g., WTRU 102 is configured to use a full range of scheduling parameters). Further, the WTRU 102 may be configured to determine a second processing time value from among the plural processing time values based at least in part on a second scheduling restriction level (e.g., WTRU 102 is configured to use a subset of scheduling parameters).

In the case of a LBT property, the WTRU 102 may be configured to determine a processing time value based at least in part on one or more LBT types and/or one or more LBT categories. The LBT types and/or LBT categories may be supported by the WTRU 102 and/or the NAP for transmission and/or reception. For example, the WTRU 102 may determine a first processing time based on the WTRU 102 and/or the NAP (e.g., gNB 180) supporting (e.g., using) a first LBT type and/or a first LBT category for transmission and/or reception. The WTRU 102 may determine a second processing time based on the WTRU 102 and/or the NAP (e.g., gNB 180) supporting (e.g., using) a second LBT type and/or a second LBT category for transmission and/or reception.

In the case of a link type, the WTRU 102 may be configured to determine a processing time value based at least in part on a link type used, determined, indicated, and/or configured for a channel and/or signal. The link type may include any of a non-terrestrial network (NTN), an Intelligent Reflecting Surface (IRS), a sidelink, an uplink and/or a downlink. For example, the WTRU 102 may determine a first processing time based on the WTRU 102 using a first link type for transmission and/or reception. The WTRU 102 may determine a second processing time based on the WTRU 102 using a second link type for transmission and/or reception.

In the case of a power saving property, the WTRU 102 may be configured to determine a processing time value based at least in part on one or more power saving related parameters. The power saving related parameters may be received by any of RRC, MAC CE and/or DCI, such as via DCI format 2_6 scrambled by PS-RNTI). The power saving related parameters may include any of block numbers (e.g., block number 1, block number 2, . . . , block number N), a (e.g., maximum) number of transmission layers, a wake up indication, a Scell dormancy indication, and/or a size of a DCI format (e.g., DCI format 2_6). For example, the WTRU 102 may determine a first processing time based on the WTRU 102 receiving a configuration and/or indication of one or more first power saving parameters. The WTRU 102 may determine a second processing time based on the WTRU 102 receiving a configuration and/or indication of one or more second power saving parameters.

It should be understood from the foregoing examples that a processing time value may be determined based on any combination or permutation of any of frequency range property, SCS property, PDCCH configuration, PDSCH property, PUSCH property, priority indicator, carrier aggregation, channel coding type, channel estimation type, waveform usage, scheduling restriction, LBT property, link type, and/or power saving property.

ACK, NACK and IPT—WTRU Reporting

In certain representative embodiments, a WTRU 102 may be configured to receive one or more PDCCHs which schedule one or more PDSCHs and may further report one or more results of decoding the PDSCHs based on reporting of an ACK, a NACK and/or an Insufficient Processing Time (IPT). For example, the WTRU 102 may be configured to, after one or more PDSCHs and one or more corresponding ACK/NACK resources satisfy a processing time value (e.g., requirement) and after the one or more PDSCHs are successfully decoded, report an ACK (e.g., to a gNB 180). As another example, the WTRU 102 may be configured to, after the one or more PDSCHs and the one or more corresponding ACK/NACK resources do not satisfy the processing time value and/or the one or more PDSCHs are not successfully decoded (e.g., based on a parity bit check), report a NACK (e.g., to a gNB 180). As yet another example, the WTRU 102 may be configured to, after the one or more PDSCHs and the one or more corresponding ACK/NACK resources do not satisfy the processing time value, report an IPT to a network entity (e.g., to a gNB 180).

The reporting of an ACK, a NACK and/or an IPT (e.g., an ACK/NACK/IPT report) may be based at least in part on one or more of a MAC CE, UCI in PUCCH and/or UCI in PUSCH. For example, a WTRU 102 may be configured to report decoding results using one or more MAC CEs. Further, a MAC CE may include a MAC CE sub-header which has a Logical Channel Identifier (LCID).

As another example, a WTRU 102 may be configured to report decoding results using HARQ-ACK reporting (e.g., UCI carried by or in PUCCH). The WTRU 102 may be configured to separately encode and/or jointly encode an IPT with HARQ-ACK information (e.g., ACK/NACK). Hence, in a case where a gNB 180 configures WTRU 102 reporting with HARQ-ACK information, the WTRU 102 may be configured to determine a number of bits (e.g., maximum)

used for HARQ-ACK reporting in consideration of IPT reporting. The WTRU 102 may transmit specific bits (e.g., "0"s or "1"s) on condition that the gNB 180 does not trigger IPT reporting. In certain embodiments, the IPT reporting may be reported with one or more least significant bits and/or one or more most significant bits of HARQ-ACK reporting.

As yet another example, a WTRU 102 may be configured to report decoding results using HARQ-ACK reporting (e.g., UCI carried by or in PUSCH). The WTRU 102 may be configured to separately encode and/or jointly encode one or more processing time values with HARQ-ACK information (e.g., ACK/NACK). Hence, in a case where a gNB 180 configures WTRU reporting with HARQ-ACK information, the WTRU 102 may be configured to determine a number of bits (e.g., maximum) used for HARQ-ACK reporting in consideration of IPT reporting. The WTRU 102 may transmit specific bits (e.g., "0"s or "1"s) on condition that the gNB 180 does not trigger IPT reporting. In certain embodiments, the IPT reporting may be reported with one or more least significant bits and/or one or more most significant bits of HARQ-ACK reporting.

TCI State Activation, Deactivation and Switching—WTRU Determination

In certain representative embodiments, a WTRU 102 may be configured with plural TCI states (e.g., a set of TCI states) by a network entity (e.g., a gNB 180 using one or more RRC messages). Based on the configured TCI states, the WTRU 102 may be configured to receive an indication to activate and/or deactivate and/or switch one or more of the configured set of TCI states (e.g., via RRC, MAC CE and/or DCI). After a processing time of 'X' (e.g., X slots, X symbols or X ms) from the indication, the WTRU 102 may be further configured to activate and/or deactivate and/or switch the one or more TCI states based on the indication. For example, a WTRU 102 may be configured to receive a TCI state switch indication at slot n, and apply the indicated TCI state no later than at a slot n+X.

The WTRU 102 may be configured with one or more TCI state types which may be used, defined, and/or determined based on one or more conditions, and/or may be configured to determine a processing time window for one or more channels and/or signals based on the configured TCI state types. In certain embodiments, a first TCI state type may be referred to as a known TCI state and a second TCI state type may be referred to as a unknown TCI state. For example, the WTRU 102 may be configured to determine a first processing time for one or more channels and/or the signals based at least in part on an indicated TCI state for the channels and/or signals being a first TCI state type (e.g., known TCI state). The WTRU 102 may be configured to determine a second processing time for one or more channels and/or the signals based at least in part on an indicated TCI state for the channels and/or signals being a second TCI state type (e.g., unknown TCI state). In some cases, the first processing time may be shorter than the second processing time.

In certain embodiments, a WTRU 102 may be configured to determine whether a given TCI state is a known TCI state based at least in part on one or more conditions being satisfied as follows. For example, a TCI state may be considered to be a known TCI state on condition that, during a period from a last transmission of a RS resource used for L1-RSRP measurement reporting for a target TCI state to a completion of an active TCI state switch (e.g., to a target TCI state), the RS resource used for L1-RSRP measurement being the RS resource in the target TCI state or QCLed to the target TCI state. In such cases, a TCI switch command may be received within a time period 'X' (e.g., X ms, X slots or X symbols) upon the last transmission of the RS resource for beam reporting or measurement. For example, a TCI state may be considered to be known on condition that a WTRU 102 has sent at least 'X' reports for a target TCI state before a TCI state switch command is received. For example, a TCI state may be considered to be a known TCI state on condition that the time duration between the last transmission of a channel and/or a signal (e.g., associated with the TCI state) and a current transmission of the channel and/or the signal (e.g., associated with the TCI state) is less than a threshold 'Z' (e.g., Z [ms], Z slots and/or Z symbols). Otherwise, in certain embodiments, the WTRU 102 may be configured to determine the TCI state as an unknown TCI state (e.g., when the one or more conditions are not satisfied).

The WTRU 102 may be configured to determine the time period 'X' based at least in part on one or more of a FR and/or a SCS. As an example, a WTRU 102 may be configured to determine a first processing time value (e.g., X=1280 ms) from among plural processing time values based at least in part on a TCI state switch command being in a first frequency range (e.g., FR1 or FR2). Further, the WTRU 102 may be configured to determine a first processing time value (e.g., X=640 ms) from among plural processing time values based at least in part on the TCI state switch command being in a second frequency range (e.g., frequency range 3 (FR3) or frequency range 4 (FR4)).

For example, a WTRU 102 may be configured to determine a first processing time value (e.g., X=1280 ms) from among plural processing time values based at least in part on a target channel of a TCI state switch command being in a first frequency range (e.g., FR1 or FR2). Further, the WTRU 102 may be configured to determine a second processing time value (e.g., X=640 ms) from among plural processing time values based at least in part on the target channel of the TCI state switch command being in a second frequency range (e.g., FR3 or FR4).

For example, a WTRU 102 may be configured to determine a first processing time value (e.g., X=1280 ms) from among plural processing time values based at least in part on a SCS of a TCI state switch command being less than (or equal to) a threshold. Further, the WTRU 102 may be configured to determine a second processing time value (e.g., X=640 ms) from among plural processing time values based at least in part on the SCS of the TCI state switch command being greater than the threshold.

For example, a WTRU 102 may be configured to determine a first processing time value (e.g., X=1280 ms) from among plural processing time values based at least in part on a SCS of target channel of a TCI state switch command being less than (or equal to) a threshold. Further, the WTRU 102 may be configured to determine a second processing time value (e.g., X=640 ms) from among plural processing time values based at least in part on the SCS of the target channel of the TCI state switch command being greater than the threshold.

Further, a WTRU 102 may be configured to determine that a TCI state is known where at least 'X' reports (e.g., L1-RSRP and/or L1-SINR) have been sent for a target TCI state before a TCI state switch command. The WTRU 102 may be configured to determine the number of reports (e.g., 'X') based at least in part on one or more of a FR and/or a SCS. As an example, a WTRU 102 may be configured to determine a first number (e.g., a first value for 'X') of reports for the target TCI state based at least in part on a TCI state switch command being received in a first frequency range (e.g., FR1 or FR2). Further, the WTRU 102 may be configured to determine a second number (e.g., a second value for 'X') of reports for the target TCI state based at least in part on a TCI state switch command being received in a second frequency range (e.g., FR3 or FR4).

For example, a WTRU 102 may be configured to determine a first number (e.g., a first value for 'X') of reports for the target TCI state based at least in part on a target channel of a TCI state switch command being received in a first frequency range (e.g., FR1 or FR2). Further, the WTRU 102 may be configured to determine a second number (e.g., a second value for 'X') of reports for the target TCI state based at least in part on a TCI state switch command being received in a second frequency range (e.g., FR3 or FR4).

For example, a WTRU 102 may be configured to determine a first number (e.g., a first value for 'X') of reports for the target TCI state based at least in part on a SCS of a TCI state switch command being less than (or equal to) a threshold. Further, the WTRU 102 may be configured to determine a second number (e.g., a second value for 'X') of reports for the target TCI state based at least in part on the SCS of the TCI state switch command being greater than the threshold.

For example, a WTRU 102 may be configured to determine a first number (e.g., a first value for 'X') of reports for the target TCI state based at least in part on a SCS of a target channel of a TCI state switch command being less than (or equal to) a threshold. Further, the WTRU 102 may be configured to determine a second number (e.g., a second value for 'X') of reports for the target TCI state based at least in part on the SCS of the target channel of the TCI state switch command being greater than the threshold.

A WTRU 102 may be configured to determine that a TCI state is known on condition that the TCI state remains detectable during a TCI state switching period. A WTRU 102 may be configured to determine that a TCI state is known on condition that a SSB associated with the TCI state remains detectable during the TCI state switching period. A detectable TCI state may satisfy one or more of a Signal-to-Noise Ratio (SNR) of the TCI state is greater than (or equal to) 'X' dB, an average L1-RSRP and/or latest L1-RSRP of the TCI state is greater than (or equal to) 'Y' dBm and/or an average L1-SINR and/or latest L1-SINR of the TCI state is greater than (or equal to) 'Z' dBm. In certain embodiments, a WTRU 102 may be configured to determine values for X, Y and/or Z based at least in part on one or more of frequency range and/or SCS. As an example, if a TCI state switch command is received in a first frequency range (e.g., FR1 or FR2), a WTRU 102 may determine one or more first values (e.g., −3 dB and/or −100 dBm) as X, Y and/or Z. If the TCI state switch command is received in a second frequency range (e.g., frequency range 3 (FR3) or frequency range 4 (FR4)), the WTRU 102 may determine one or more second values (e.g., 0 dB and/or −90 dBm) as X, Y and/or Z.

For example, if a target channel of a TCI state switch command is in a first frequency range (e.g., FR1 or FR2), a WTRU 102 may determine one or more first values (e.g., −3 dB and/or −100 dBm) as X, Y and/or Z. If the target channel of the TCI state switch command is in a second frequency range (e.g., frequency range 3 (FR3) or frequency range 4 (FR4)), the WTRU 102 may determine one or more second values as X, Y and/or Z (e.g., 0 dB and/or −90 dBm).

For example, if subcarrier spacing of a TCI state switch command is smaller than (or equal to) a threshold, a WTRU 102 may determine one or more first values (e.g., −3 dB and/or −100 dBm) as X, Y and/or Z. If the subcarrier spacing of the TCI state switch command is larger than a threshold, the WTRU 102 may determine one or more second values as X, Y and/or Z (e.g., 0 dB and/or −90 dBm).

For example, if subcarrier spacing of a target channel of a TCI state switch command is smaller than (or equal to) a threshold, a WTRU 102 may determine one or more first values (e.g., −3 dB and/or −100 dBm) as X, Y and/or Z. If the subcarrier spacing of the target channel of the TCI state switch command is larger than a threshold, the WTRU 102 may determine one or more second values as X, Y and/or Z (e.g., 0 dB and/or −90 dBm).

A WTRU 102 may be configured to determine that a TCI state is known on condition that a time duration between a last transmission of a channel and/or a signal associated with the TCI state and current transmission of a channel and/or a signal is less than a threshold (e.g., Z [ms], Z slots, Z symbols). The WTRU 102 may be configured to determine the threshold Z based at least in part on one or more of subcarrier spacing, bandwidth, traffic type, and/or periodicity (e.g., of an associated CSI-RS and/or SSB for L1-RSRP measurement). However, in certain embodiments, a WTRU 102 may be configured to not consider (e.g., disregard) a last transmission of a channel and/or a signal associated with a TCI state on condition that a PDSCH was received with a TCI state and the associated HARQ feedback is negative HARQ-ACK (e.g., NACK), and/or on condition that the associated CSI reporting includes L1-RSRP reporting which is less than a threshold (e.g., L1-RSRP measurement is lower than a threshold).

Processing Time—WTRU Determination with TCI State Indications

In certain representative embodiments, a WTRU 102 may be configured to determine a processing time value from a plurality of processing time values based, at least in part, on one or more of a frequency range property, SCS property, TCI state type (e.g., known or unknown TCI state), configured and/or activated TCI states and/or beams, configured and/or activated WTRU panels, configured and/or activated TRPs, RS type(s), association(s) between activated TCI state(s) and WTRU panels, a LBT property, a link type, and/or a power saving property.

In the case of frequency range, the WTRU 102 may be configured to determine a first processing time value from among plural processing time values based at least in part on a TCI state indication (e.g., via PDCCH, MAC CE and/or RRC) being received in a first frequency range (e.g., FR1 or FR2). Further, the WTRU 102 may be configured to determine a second processing time value from among plural processing time values based at least in part on the TCI state indication being received in a second frequency range (e.g., FR3 or FR4).

For example, the WTRU 102 may be configured to determine a first processing time value from among plural processing time values based at least in part on a target channel (e.g., PDCCH, PDSCH, PUCCH and/or PUSCH) of a TCI state indication (e.g., via PDCCH, MAC CE and/or RRC) being received in a first frequency range (e.g., FR1 or FR2). Further, the WTRU 102 may be configured to determine a second processing time value from among plural processing time values based at least in part on the target channel of the TCI state indication being received in a second frequency range (e.g., FR3 or FR4).

In the case of SCS, the WTRU 102 may be configured to determine a first processing time value from among plural processing time values based at least in part on SCS of a TCI state indication (e.g., via PDCCH, MAC CE and/or RRC) being less than (or equal to) a threshold. Further, the WTRU 102 may be configured to determine a second processing time value from among plural processing time values based at least in part on the SCS of the TCI state indication (e.g., via PDCCH, MAC CE and/or RRC) being larger than the threshold.

For example, the WTRU 102 may be configured to determine a first processing time value from among plural processing time values based at least in part on SCS of a target channel (e.g., PDCCH, PDSCH, PUCCH and/or PUSCH) for TCI state switching, activation and/or deactivation being less than (or equal to) a threshold. Further, the WTRU 102 may be configured to determine a second processing time value from among plural processing time values based at least in part on the SCS of the target channel for TCI state switching, activation and/or deactivation being larger than the threshold.

In the case of TCI state type, the WTRU 102 may be configured to determine a first processing time value (e.g., a first value for timeDurationQCL) from among plural processing time values based at least in part on a TCI state being determined as being a known TCI state. Further, the WTRU 102 may be configured to determine a second processing time value from among plural processing time values based at least in part on the TCI state being determined as being an unknown TCI state.

In the case of configured and/or activated TCI states and/or beams, a WTRU 102 may be configured with plural TCI states (e.g., via one or more RRC messages) and/or plural beams. Based on the plural TCI states, a network entity (e.g., a gNB 180) may activate and/or deactivate (e.g., via MAC CE) one or more of the plural TCI states for PDSCH and/or PUSCH transmission. Based on the activated TCI states, the gNB 180 may indicate one or more of the beams for PDSCH and/or PUSCH transmission. For example, the WTRU 102 may be configured to determine a first processing time value from among plural processing time values based at least in part on a number of the configured and/or activated TCI states (or beams) being less than (or equal to) a threshold. Further, the WTRU 102 may be configured to determine a second processing time value from among plural processing time values based at least in part on the number of configured and/or activated TCI states (or beams) being larger than the threshold.

In the case of configured and/or activated WTRU panels, a WTRU 102 may be configured with plural SRS resources and/or resource sets for transmission (e.g., UL transmission). Based on the plural SRS resources and/or resource sets, a network entity (e.g., a gNB 180) may activate and/or deactivate one or more of the plural SRS resources and/or resource sets. For example, a SRS resource indicator (SRI) and/or SRS resource set indicator may be received by the WTRU 102 (e.g., via PDCCH). Based on the activated TCI states, the gNB 180 may indicate one or more beams and/or one or more of WTRU panels (e.g., for UL transmission). For example, the WTRU 102 may be configured to determine a first processing time value from among plural processing time values based at least in part on a number of the configured and/or activated SRS resources and/or resource sets being less than (or equal to) a threshold. Further, the WTRU 102 may be configured to determine a second processing time value from among plural processing time values based at least in part on the number of configured and/or activated SRS resources and/or resource sets being larger than the threshold.

In the case of configured and/or activated TRPs, a WTRU 102 may be configured with plural TRPs. Based on the plural TRPs, a network entity (e.g., a gNB 180) may activate and/or deactivate one or more of the plural TRPs. Based on the activated TRPs, the gNB 180 may indicate, activate, deactivate and/or switch TCI states for any respective TRP. For example, the WTRU 102 may be configured to determine a first processing time value from among plural processing time values based at least in part on a number of the configured and/or activated TRPs being less than (or equal to) a threshold. Further, the WTRU 102 may be configured to determine a second processing time value from among plural processing time values based at least in part on the number of configured and/or activated TRPs being larger than the threshold.

In the case of RS type(s), a WTRU 102 may be configured to determine a first processing time value from among plural processing time values based at least in part on one or more RSs of a TCI state indication (e.g., via PDCCH, MAC CE and/or RRC) being a first type (e.g., periodic, semi-static or aperiodic). Further, the WTRU 102 may be configured to determine a second processing time value from among plural processing time values based at least in part on the one or more RSs of the TCI state indication (e.g., via PDCCH, MAC CE and/or RRC) being a second type (e.g., non-first type).

In the case of association(s) between activated TCI state(s) and WTRU panel(s), an active or inactive state of a WTRU panel may be informed, indicated or reported to a NAP (e.g., gNB 180).

For example, a WTRU 102 may be configured to determine a first processing time value from among plural processing time values based at least in part on activated TCI states being associated with a WTRU panel with an active state. Further, the WTRU 102 may be configured to determine a second processing time value from among plural processing time values based at least in part on activated TCI states being associated with a WTRU panel with an inactive state.

For example, the WTRU 102 may receive information indicating one or more activated and/or one or more deactivated panels. The indication may include any of panel IDs, RS resource IDs, RS resource set IDs, antenna port IDs, etc. The active and/or inactive state of any respective WTRU panel may be determined by a WTRU 102. The WTRU 102 may measure associated RSs and/or antenna ports with a panel. Based on the measurement, the WTRU 102 may determine whether the panel is activated or not (e.g., active or inactive). For example, if a measured quality of one or more associated RSs and/or antenna ports is less than or equal to a threshold, the WTRU 102 may determine the panel as deactivated. If the measured quality of the one or more associated RSs and/or antenna ports s is greater than the threshold, the WTRU 102 may determine the panel as activated. The threshold (e.g., used for a respective determination) may be based on one or more predefined, configured and/or indicated values received by a NAP (e.g., gNB 180) and/or reported values by the WTRU 102 (e.g., WTRU capabilities).

For example, an active or inactive state of a WTRU panel may be implicitly determined based on one or more predefined conditions (e.g., a TCI state associated with a WTRU panel which has not been used for at least a time period).

As another example, the association between a WTRU panel and any of TCI states, RSs, and/or antenna ports may be informed, indicated, and/or reported to a NAP (e.g., gNB 180). The WTRU 102 may receive a configuration and/or indication which indicates associated panels with a TCI state. The configuration and/or indication may include any of associated TCI state IDs, associated panel IDs, associated RS resource IDs, associated RS resource set IDs, associated antenna port IDs, etc. The WTRU 102 may determine a first TCI state as an activated TCI state based on one or more activated RSs for one or more panels being associated with the first TCI state. The WTRU 102 may determine the first TCI state as a deactivated TCI state based on one or more deactivated RSs for one or more panels being associated with the first TCI state.

As another example, the WTRU 102 may be configured to determine active and/or inactive states of the TCI states, RSs and/or antenna ports. The WTRU 102 may measure associated RSs and/or antenna ports with the TCI states. Based on the measurement, the WTRU 102 may determine whether the TCI states are activated or not. For example, the WTRU 102 may determine a respective TCI state as deactivated based on a measured quality of the associated RSs and/or antenna ports being less than or equal to a threshold. The WTRU 102 may determine a respective TCI state as deactivated based on a measured quality of the associated RSs and/or antenna ports being greater than the threshold. The threshold (e.g., used for a respective determination) may be based on one or more predefined, configured and/or indicated values received by a NAP (e.g., gNB 180) and/or reported values by the WTRU 102 (e.g., WTRU capabilities).

As another example, the WTRU 102 may be configured to (e.g., implicitly) determine active and/or inactive states of the TCI states, RSs and/or antenna ports based on predefined and/or configured conditions. A respective TCI state may be implicitly determined to be inactive when the TCI state has not been used for a certain time period.

For example, a WTRU 102 may be configured to determine a first processing time value from among plural processing time values based at least in part on activated TCI states being associated with more than 'K' WTRU panels with an active state (e.g., K may be a positive number such as '1'). Further, the WTRU 102 may be configured to determine a second processing time value from among plural processing time values based at least in part on activated TCI states being associated with less than (or equal to) 'K' WTRU panels with an inactive state.

In the case of a LBT property, the WTRU 102 may be configured to determine a processing time value based at least in part on one or more LBT types and/or one or more LBT categories. The LBT types and/or LBT categories may be supported by the WTRU 102 and/or the NAP for transmission and/or reception. For example, the WTRU 102 may determine a first processing time based on the WTRU 102 and/or the NAP (e.g., gNB 180) supporting (e.g., using) a first LBT type and/or a first LBT category for transmission and/or reception. The WTRU 102 may determine a second processing time based on the WTRU 102 and/or the NAP (e.g., gNB 180) supporting (e.g., using) a second LBT type and/or a second LBT category for transmission and/or reception.

In the case of a link type, the WTRU 102 may be configured to determine a processing time value based at least in part on a link type used, determined, indicated, and/or configured for a channel and/signal. The link type may include any of a non-terrestrial network (NTN), an Intelligent Reflecting Surface (IRS), a sidelink, an uplink and/or a downlink. For example, the WTRU 102 may determine a first processing time based on the WTRU 102 using a first link type for transmission and/or reception. The WTRU 102 may determine a second processing time based on the WTRU 102 using a second link type for transmission and/or reception.

In the case of a power saving property, the WTRU 102 may be configured to determine a processing time value based at least in part on one or more power saving related parameters. The power saving related parameters may be received by any of RRC, MAC CE and/or DCI, such as via DCI format 2_6 scrambled by PS-RNTI). The power saving related parameters may include any of block numbers (e.g., block number 1, block number 2, . . . , block number N), a (e.g., maximum) number of transmission layers, a wake up indication, a Scell dormancy indication, and/or a size of a DCI format (e.g., DCI format 2_6). For example, the WTRU 102 may determine a first processing time based on the WTRU 102 receiving a configuration and/or indication of one or more first power saving parameters. The WTRU 102 may determine a second processing time based on the WTRU 102 receiving a configuration and/or indication of one or more second power saving parameters.

It should be understood from the foregoing examples that a processing time value may be determined based on any combination or permutation of any of frequency range property, SCS property, TCI state type, configured and/or activated TCI states and/or beams, configured and/or activated WTRU panels, configured and/or activated TRPs, RS type(s), association(s) between activated TCI state(s) and WTRU panels, LBT properties, link types and/or power saving properties.

Beam Information—WTRU Acquisition

In certain representative embodiments, a WTRU 102 may be configured to request a beam measurement (e.g., RS transmission, RS measurement and/or beam reporting) to a NAP (e.g., gNB 180). For example, the WTRU 102 may be configured to request beam measurement to acquire beam information and/or reduce processing time such as when a TCI state to be activated is unknown. The WTRU 102 request of beam measurement may include one or more of a WTRU request of aperiodic/semi-persistent CSI-RS, a WTRU request of aperiodic/semi-persistent SRS, a WTRU request of aperiodic/semi-persistent Tracking Reference Signal (TRS) and/or a WTRU request of aperiodic/semi-persistent CSI reporting. In certain representative embodiments, a WTRU may be configured to request beam measurement when receiving a gNB 180 configuration and/or indication, when a newly activated TCI state is unknown, when a SINR of one or more RSs in a newly activated TCI state is lower than a threshold, and/or when a WTRU 102 receives a TCI state switch, activation and/or deactivation from a NAP (e.g., gNB 180).

Further, a WTRU 102 may be configured to determine uplink resources (e.g., one or more of PUCCH, PUSCH and/or PRACH) to request a beam measurement based at least in part from dedicated uplink resources and/or existing uplink resources. In other words, the WTRU 102 may be configured with one or more dedicated uplink resources (e.g., based on one or more RRC messages). The WTRU 102 may be configured with one or more existing uplink resources and may be configured to request beam measurement by dropping information to be reported in a future report and reporting a beam measurement request, or jointly transmitting the beam measurement request with the information to be reported. For example, the WTRU 102 may be configured to request beam measurement based on PUCCH resource(s) for an ACK/NACK report. The beam measurement request may be transmitted with or at a same time (e.g., simultaneously) as the ACK/NACK is transmitted, and the beam measurement request may be jointly encoded with the ACK/NACK or independently coded. The simultaneous transmission of a beam measurement request may be based on one or more of whether or not the ACK/NACK is for a report one or more TCI state switches, activation and/or deactivation (e.g., from a gNB 180), and whether or not a newly activated TCI state is known or unknown.

BWP Activation Time—WTRU Determination

In certain representative embodiments, one or more BWPs may be configured or used with a carrier for UL and/or DL signal transmission and/or reception. The one or more BWPs may, either separately or in groupings, have a state of active, inactive or dormant. In the case of an active BWP (e.g., a BWP with an active state), a WTRU 102 may be configured to perform a first set of procedures for UL and/or DL transmission and/or reception for a data channel (e.g., PDSCH and/or PUSCH), reception for a control channel (e.g., PDCCH monitoring), and/or measurement and reporting (e.g., CSI, RRM, RLM, etc.). In the case of a dormant BWP (e.g., a BWP with a dormant state), a WTRU 102 may be configured to perform a second set of procedures for UL and/or DL transmission and/or reception (e.g., CSI reporting, RRM and/or RLM measurement and reporting). In the case of an inactive BWP (e.g., a BWP with inactive state), a WTRU 102 may be configured to perform a third set of procedures for UL and/or DL transmission and/or reception. For example, the first set may include all procedures, the second set may be less than the first set, and the third set may include no procedures.

A BWP activation may refer to where an inactive BWP (or dormant BWP) is to be switched to an active BWP, such as by an indication and/or configuration. A BWP deactivation may refer to where an active BWP (or dormant BWP) is to be switched to an inactive BWP. A BWP switch may refer to where a BWP with a first state is switched to a BWP with a second state (e.g., inactive BWP switching to active BWP). Further, the WTRU 102 may be configured with one or more types of BWP switches which may be used, defined, or determined. In other words, the types of BWP switches may include one or more of a switch from an inactive BWP to an active BWP (e.g., BWP switch type-1), a switch from an active BWP to an inactive BWP (e.g., BWP switch type-2), a switch from an active BWP to a dormant BWP (e.g., BWP switch type-3), a switch from an inactive BWP to a dormant BWP (e.g., BWP switch type-4), and/or a switch from an dormant BWP to an active BWP (e.g., BWP switch type-5).

In certain representative embodiments, a WTRU 102 may be configured with one or more BWPs. A NAP (e.g., gNB 180) may configure plural BWPs based on one or more of RRC messages. Based on the plural configured BWPs, the WTRU 102 may receive an indication to activate, deactivate and/or switch one or more of the BWPs (e.g., via RRC, MAC CE, DCI and/or a timer. After a processing time 'X' (e.g., X slots, X symbols or X ms) from the indication, the WTRU 102 may be configured to activate, deactivate and/or switch one or more BWPs based on the indication. On condition that the WTRU 102 receives a BWP switch indication at a slot 'n', the WTRU 102 may be configured to activate the indicated one or more BWPs at a slot n+X. The WTRU 102 may determine the processing time X based at least in part on WTRU 102 capability and/or SCS.

A set of processing time values may be configured, used, determined, and/or defined and one of the processing time values from the set may be used, selected, determined, and/or indicated (e.g., processing time X) for a BWP switch. The processing time value for a BWP switch may be determined based on the BWP switch type. For example, a first processing time value may be used for a BWP type-1 and a second processing time value may be used for a BWP type-2, a third processing time value for another type, and so forth. For example, a first processing time value may be larger than a second processing time value. A first processing time value may be defined with a positive offset value from a second processing time value. The first processing time value may be defined with a positive offset value from the second processing time value. For example, a same processing time value may be used for one or more BWP switch types (e.g., a same processing time X for BWP switch types −2 and −3).

A WTRU 102 may be configured to receive an indication to activate a BWP, deactivate a BWP, and/or switch from a first BWP to a second BWP and to further determine a processing time value from among plural processing time values for BWP activation, deactivation and/or switching based at least in part on one or more of BWP bandwidth difference, BWP frequency distance, WTRU panels, transmission layers, TRPs, frequency range, SCS, PDCCH configuration, LBT property, link type, and/or power saving property. For example, the PDCCH configuration may indicate a number of CORESETs and/or search spaces, one or more locations of the CORESETs and/or search spaces, search space type, search space duration, data combining type and/or repetition type.

In the case of BWP bandwidth difference, a WTRU 102 may be configured to determine a first processing time value from among plural processing time values based at least in part on a bandwidth difference between a first BWP and a second BWP corresponding to a received indication being less than (or equal to) a threshold. Further, the WTRU 102 may be configured to determine a second processing time value from among plural processing time values based at least in part on the bandwidth difference between the first BWP and the second BWP being greater than the threshold.

In the case of frequency distance, a WTRU 102 may be configured to determine a first processing time value from among plural processing time values based at least in part on a frequency difference (e.g., 50 PRBs) between a first frequency of a first BWP and a second frequency of a second BWP corresponding to a received indication being less than (or equal to) a threshold. Further, the WTRU 102 may be configured to determine a second processing time value from among plural processing time values based at least in part on the frequency difference between the first BWP and the second BWP being greater than the threshold.

For example, a WTRU 102 may be configured to determine a first processing time value from among plural processing time values based at least in part on a frequency difference (e.g., 50 PRBs) between a frequency (e.g., low, center, high frequency) of a BWP corresponding to a received indication (e.g., to be activated) and a frequency (e.g., low, center, high frequency) of a cell which comprises the BWP being less than (or equal to) a threshold. Further, the WTRU 102 may be configured to determine a second processing time value from among plural processing time values based at least in part on the frequency difference between the BWP and the cell being greater than the threshold.

In the case of WTRU panels, a WTRU 102 may be configured to determine a first processing time value from among plural processing time values based at least in part on a number of configured and/or activated panels corresponding to a received indication being less than (or equal to) a threshold. Further, the WTRU 102 may be configured to determine a second processing time value from among plural processing time values based at least in part on the number of configured and/or activated panels being greater than the threshold.

In the case of transmission layers, a WTRU 102 may be configured to receive an indication to switch a (e.g., maximum) number of transmission layers from a first value to a second value for a BWP explicitly (e.g., DCI based explicit value indication) or implicitly (e.g., BWP switching which is configured with the second value). For example, the WTRU 102 may be configured to determine a first processing time value from among plural processing time values based at least in part on the first value (e.g., number of transmission layers) being less than (or equal to) a threshold. Further, the WTRU 102 may be configured to determine a second processing time value from among plural processing time values based at least in part on the first value being greater than the threshold.

For example, a WTRU 102 may be configured to determine a first processing time value from among plural processing time values based at least in part on the second value (e.g., number of transmission layers) being less than (or equal to) a threshold. Further, the WTRU 102 may be configured to determine a second processing time value from among plural processing time values based at least in part on the second value being greater than the threshold.

For example, a WTRU 102 may be configured to determine a first processing time value from among plural processing time values based at least in part on a difference between the first value and the second value (e.g., difference in layers) being less than (or equal to) a threshold. Further, the WTRU 102 may be configured to determine a second processing time value from among plural processing time values based at least in part on the difference being greater than the threshold.

In the case of TRPs, a WTRU 102 may be configured with plural TRPs in a BWP (e.g., a newly activated BWP, a deactivated BWP, or a switched BWP). Based on the configured TRPs, the WTRU 102 may receive one or more activation/deactivation messages for the BWP. Further, the WTRU 102 may be configured to determine a first processing time value from among plural processing time values based at least in part on a number of configured/activated TRPs in the BWP being less than (or equal to) a threshold. Further, the WTRU 102 may be configured to determine a second processing time value from among plural processing time values based at least in part on the number of configured/activated TRPs in the BWP being greater than the threshold.

In the case of frequency range, a WTRU 102 may be configured to determine a first processing time value from among plural processing time values based at least in part on a PDCCH which indicates BWP switching being received in a first frequency range (e.g., FR1 or FR2). Further, the WTRU 102 may be configured to determine a second processing time value from among plural processing time values based at least in part on the PDCCH which indicates BWP switching being received in a second frequency range (e.g., FR3 or FR4).

For example, a WTRU 102 may be configured to determine a first processing time value from among plural processing time values based at least in part on a cell which includes one or more indicated (e.g., activated and/or deactivated) BWPs being in a first frequency range (e.g., FR1 or FR2). Further, the WTRU 102 may be configured to determine a second processing time value from among plural processing time values based at least in part on the cell which includes the indicated BWPs being received in a second frequency range (e.g., FR3 or FR4).

In the case of SCS, a WTRU 102 may be configured to determine a first processing time value from among plural processing time values based at least in part on a SCS of a PDCCH which indicates one or more BWPs (e.g., for switching) being less than (or equal to) a threshold. Further, the WTRU 102 may be configured to determine a second processing time value from among plural processing time values based at least in part on the SCS of the PDCCH which indicates the one or more BWPs being greater than the threshold.

For example, a WTRU 102 may be configured to determine a first processing time value from among plural processing time values based at least in part on a SCS of at least one BWP which is deactivating (e.g., old BWP) being less than (or equal to) a threshold. Further, the WTRU 102 may be configured to determine a second processing time value from among plural processing time values based at least in part on the subcarrier spacing of at least one BWP which is deactivating (e.g., old BWP) being greater than the threshold.

For example, a WTRU 102 may be configured to determine a first processing time value from among plural processing time values based at least in part on a SCS of at least one BWP which is activating (e.g., new BWP) being less than (or equal to) a threshold. Further, the WTRU 102 may be configured to determine a second processing time value from among plural processing time values based at least in part on the SCS of the at least one BWP which is activating (e.g., new BWP) being greater than the threshold.

In the case of PDCCH configuration, as an example, plural CORESETs and/or search spaces may be used to schedule one or more of PDSCHs and/or PUSCHs and may provide better reliability of downlink control information (DCI). Hence, a WTRU 102 may be configured to determine a first processing time value from among plural processing time values based at least in part on a number of CORESETs and/or search spaces of one or more of scheduling PDCCHs being less than (or equal to) a threshold. Further, the WTRU 102 may be configured to determine a second processing time value from among plural processing time values based at least in part on the number of CORESETs and/or search spaces of the one or more of scheduling PDCCHs being greater than the threshold.

For example, after a NAP (e.g., gNB 180) schedules one or more PDSCHs and/or PUSCHs, a WTRU 102 may be configured to monitor plural CORESETs and/or search spaces. The WTRU 102 may be further configured to determine a first processing time value from among plural processing time values based at least in part on a number of monitored CORESETs and/or search spaces being less than (or equal to) a threshold. Further, the WTRU 102 may be configured to determine a second processing time value from among plural processing time values based at least in part on the number of monitored CORESETs and/or search spaces being greater than the threshold.

For example, a WTRU 102 may be configured to determine a processing time value from among plural processing time values based at least in part on one or more time and/or frequency locations of one or more CORESET and/or search spaces of a PDCCH which indicates BWP switching. In some instances, a symbol of a scheduling CORESET and/or search space may be used as one of the time locations. For example, a WTRU 102 may be configured to determine a first processing time value from among plural processing time values based at least in part on a starting symbol being less than (or equal to) a threshold. Further, the WTRU 102 may be configured to determine a second processing time value from among plural processing time values based at least in part on the starting symbol being greater than the threshold.

For example, a WTRU 102 may be configured to determine a first processing time value from among plural processing time values based at least in part on an ending symbol being less than (or equal to) a threshold. Further, the WTRU 102 may be configured to determine a second processing time value from among plural processing time values based at least in part on the ending symbol being greater than the threshold.

In some instances, a frequency distance between a center frequency (e.g., 50 PRBs) and the CORESET/search space of a scheduling CORESET and/or search space may be used as one of the frequency locations. Hence, a WTRU 102 may be configured to determine a first processing time value from among plural processing time values based at least in part on the frequency distance being less than (or equal to) a threshold. Further, the WTRU 102 may be configured to determine a second processing time value from among plural processing time values based at least in part on the frequency distance being greater than the threshold.

For example, a WTRU 102 may be configured to determine a processing time value from among plural processing time values based on a search space type configuration of a PDCCH which indicates BWP switching. For example, the WTRU 102 may be configured to determine a first processing time value from among plural processing time values based at least in part on the search space type being a first type (e.g., common). Further, the WTRU 102 may be configured to determine a second processing time value from among the plural processing time values based at least in part on the search space type being a second type (e.g., WTRU-specific). As above, the WTRU 102 may perform the determination based on the search space type according to configured DCI formats. For example, the WTRU 102 may be configured to determine the first processing time value on condition that DCI formats "0_0" and/or "1_0" are configured whereas the second processing time value may be determined on condition that any of DCI formats "0_1", "0_2", "1_1", "1_2", etc. are configured.

For example, a WTRU 102 may be configured to determine a first processing time value from among plural processing time values based at least in part on a duration (e.g., a number of consecutive slots) of a search space of a PDCCH which indicates BWP switching being less than (or equal to) a threshold. Further, the WTRU 102 may be configured to determine a second processing time value from among plural processing time values based at least in part on the duration being greater than the threshold.

For example, a WTRU 102 may be configured to determine a processing time value from among plural processing time values based on a data combining type and/or a repetition type of a PDCCH which indicates BWP switching. The WTRU 102 may be configured to support PDCCH repetition to provide added reliability for one or more of the CORESETs and/or search spaces. For example, the WTRU 102 may be configured to determine a first processing time value from among plural processing time values based at least in part on the WTRU 102 not supporting PDCCH repetition (and/or data combining) for the scheduling CORESET and/or search space. Further, the WTRU 102 may be configured to determine a second processing time value from among the plural processing time values based at least in part on the WTRU 102 supporting PDCCH repetition (and/or data combining) for the scheduling CORESET and/or search space.

In the case of a LBT property, the WTRU 102 may be configured to determine a processing time value based at least in part on one or more LBT types and/or one or more LBT categories. The LBT types and/or LBT categories may be supported by the WTRU 102 and/or the NAP for transmission and/or reception. For example, the WTRU 102 may determine a first processing time based on the WTRU 102 and/or the NAP (e.g., gNB 180) supporting (e.g., using) a first LBT type and/or a first LBT category for transmission and/or reception. The WTRU 102 may determine a second processing time based on the WTRU 102 and/or the NAP (e.g., gNB 180) supporting (e.g., using) a second LBT type and/or a second LBT category for transmission and/or reception. The WTRU 102 may receive one or more configurations and/or one or more indications which relate to or define the LBT types and/or the LBT categories. The one or more configurations and/or the one or more indications may be based on any of LBT type index, LBT category index, target channel type (e.g., shared channel, control channel, RS, etc.), target link type (e.g., uplink, downlink, sidelink, IAB, NTN, etc.), and/or target RS type (e.g., SSB, CSI-RS, SRS, DM-RS, PRS, PT-RS, etc.). In some representative embodiments, a target RS type may (e.g., only) be provided or otherwise indicated to the WTRU 102 on condition that a target channel type is or has been configured as an RS channel.

In the case of a link type, the WTRU 102 may be configured to determine a processing time value based at least in part on a link type used, determined, indicated, and/or configured for a channel and/or signal. The link type may include any of a non-terrestrial network (NTN), an Intelligent Reflecting Surface (IRS), a sidelink, an uplink and/or a downlink. For example, the WTRU 102 may determine a first processing time based on the WTRU 102 using a first link type for transmission and/or reception. The WTRU 102 may determine a second processing time based on the WTRU 102 using a second link type for transmission and/or reception.

In the case of a power saving property, the WTRU 102 may be configured to determine a processing time value based at least in part on one or more power saving related parameters. The power saving related parameters may be received by any of RRC, MAC CE and/or DCI, such as via DCI format 2_6 scrambled by PS-RNTI). The power saving related parameters may include any of block numbers (e.g., block number 1, block number 2, . . . , block number N), a (e.g., maximum) number of transmission layers, a wake up indication, a Scell dormancy indication, and/or a size of a DCI format (e.g., DCI format 2_6). For example, the WTRU 102 may determine a first processing time based on the WTRU 102 receiving a configuration and/or indication of one or more first power saving parameters. The WTRU 102 may determine a second processing time based on the WTRU 102 receiving a configuration and/or indication of one or more second power saving parameters.

CSI Processing Time—WTRU Determination

In certain representative embodiments, a WTRU 102 may be configured to determine a processing time value from among plural (e.g., a set of) processing time values (e.g., which may be available, used, determined, configured, and/or supported as a capability) for CSI activation. For example, the WTRU 102 may receive any of a configuration, activation and/or indication based on one or more first CSI parameters and the WTRU 102 may determine a first processing time (e.g., based on the first CSI parameters). The WTRU 102 may receive any of a configuration, activation and/or indication based on one or more second CSI parameters and the WTRU 102 may determine a second processing time (e.g., based on the second CSI parameters). One or more CSI parameters may be based on any of frequency range, SCS, CSI type (e.g., any of L1-RSRP, L1-SINR, and/or CQI of Type-1 CSI or Type-2 CSI), RS type (e.g., any of SSB, CSI-RS for tracking, CSI-RS for beam management, CSI-RS for CSI, CSI-RS for interference measurement, zero power CSI-RS, non-zero power CSI-RS, SRS for codebook based transmission, SRS for non-codebook based transmission, SRS for switching, SRS for positioning, positioning RS, etc.), number of (e.g., simultaneously) activated CSI, number of (e.g., simultaneously) processed CSI, number of (e.g., simultaneously) activated CSI-RS resources and/or resource sets and/or SRS resources and/or resource sets, number of configured, activated and/or indicated panels, beams and/or TRPs for RS transmission, LBT types and/or categories, link type, power saving property, and/or ACK/NACK reporting.

In the case of LBT type and/or category, the WTRU 102 may be configured to determine a processing time value based on LBT types and/or categories which the WTRU 102 and/or a gNB 180 may support (e.g., use) for transmission and/or reception. For example, the WTRU 102 and/or the gNB 180 may use a first LBT type and/or a first LBT category for transmission and/or reception, the WTRU 102 may determine a first processing time. The WTRU 102 and/or the gNB 180 may use a second LBT type and/or a second LBT category for transmission and/or reception, the WTRU 102 may determine a second processing time.

In the case of link type, the WTRU 102 may be configured to determine a processing time value based on the link type used, determined, indicated, and/or configured for a channel and/or a signal. For example, the WTRU 102 may determine a first processing time based on the WTRU 102 using a first link type for transmission and/or reception. The WTRU 102 may determine a second processing time based on the WTRU 102 using a second link type for transmission and/or reception.

In the case of power saving property, the WTRU 102 may be configured to determine a processing time value based on a configured and/or indicated one or more power saving related parameters. The one or more power saving related parameters may be received by RRC, MAC CE and/or DCI (e.g., via DCI format 2_6 scrambled by PS-RNTI). The power saving related parameters may include any of block numbers (e.g., block number 1, block number 2, . . . , block number N), a (e.g., maximum) number of transmission layers, a wake up indication, a Scell dormancy indication, and/or a size of a DCI format (e.g., DCI format 2_6). For example, the WTRU 102 may determine a first processing time based on the WTRU 102 receiving a configuration and/or indication of one or more first power saving related parameters. The WTRU 102 may determine a second processing time based on the WTRU 102 receiving a configuration and/or indication of one or more second power saving parameters.

In the case of ACK/NACK reporting, the WTRU 102 may be configured to determine a processing time value based on a type of ACK/NACK report. For example, a WTRU 102 may report a hypothetical ACK/NACK to a gNB 180. The hypothetical ACK/NACK may be based on (e.g., previously) receiving any of one or more (e.g., prior) PDSCHs and/or one or more (e.g., prior) RSs, such as SSBs and/or CSI-RSs. For example, the WTRU 102 may determine a first processing time based on the WTRU 102 reporting CSI other than a soft ACK/NACK. The WTRU 102 may determine a second processing time based on the WTRU 102 reporting a soft ACK/NACK.

RS Activation and Triggering—WTRU Determination

In certain representative embodiments, a WTRU 102 may be configured to determine a processing time value among multiple (e.g., a set of) processing time values (e.g., which may be available, used, determined, configured, and/or supported as a capability) for RS activation and/or triggering. For example, the WTRU 102 may determine a first processing time based on the WTRU 102 receiving any of a configuration, activation and/or indication based on one or more first RS parameters. The WTRU 102 may determine a second processing time based on the WTRU 102 receiving any of a configuration, activation and/or indication of one or more second RS parameters. The one or more RS parameters may be based on any of frequency range, SCS, RS configurations for measurement, number of antenna ports (e.g., number of antenna ports or maximum number of antenna ports of CSI-RS resources in a CSI-RS resource set for CSI reporting), number of RS resources and/or resource sets, RS type (e.g., SSB, CSI-RS for tracking, CSI-RS for beam management, CSI-RS for CSI, CSI-RS for interference measurement, zero power CSI-RS, non-zero power CSI-RS, SRS for codebook based transmission, SRS for non-codebook based transmission, SRS for switching, SRS for positioning, positioning RS, etc.), number of (e.g., simultaneously) activated CSI-RS resources and/or resource sets and/or SRS resources and/or resource sets, number of configured, activated and/or indicated panels, beams and/or TRPs for RS transmission, LBT types and/or categories, link type, and/or power saving property.

In the case of LBT type and/or category, the WTRU 102 may be configured to determine a processing time value based on LBT types and/or categories which the WTRU 102 and/or a gNB 180 may support (e.g., use) for transmission and/or reception. For example, the WTRU 102 and/or the gNB 180 may use a first LBT type and/or a first LBT category for transmission and/or reception, the WTRU 102 may determine a first processing time. The WTRU 102 and/or the gNB 180 may use a second LBT type and/or a second LBT category for transmission and/or reception, the WTRU 102 may determine a second processing time.

In the case of link type, the WTRU 102 may be configured to determine a processing time value based on the link type used, determined, indicated, and/or configured for a channel and/or a signal. For example, the WTRU 102 may determine a first processing time based on the WTRU 102 using a first link type for transmission and/or reception. The WTRU 102 may determine a second processing time based on the WTRU 102 using a second link type for transmission and/or reception.

In the case of power saving property, the WTRU 102 may be configured to determine a processing time value based on a configured and/or indicated one or more power saving related parameters. The one or more power saving related parameters may be received by RRC, MAC CE and/or DCI (e.g., via DCI format 2_6 scrambled by PS-RNTI). The power saving related parameters may include any of block numbers (e.g., block number 1, block number 2, . . . , block number N), a (e.g., maximum) number of transmission layers, a wake up indication, a Scell dormancy indication, and/or a size of a DCI format (e.g., DCI format 2_6). For example, the WTRU 102 may determine a first processing time based on the WTRU 102 receiving a configuration and/or indication of one or more first power saving related parameters. The WTRU 102 may determine a second processing time based on the WTRU 102 receiving a configuration and/or indication of one or more second power saving parameters.

CSI Reporting—WTRU Determination

In certain representative embodiments, a WTRU 102 may support CSI reporting according to one or more processing time values which are associated with processing one or more channels and/or signals (e.g., a CSI report may be associated with a respective processing time value). The WTRU 102 may be configured to determine and/or use one or more processing time values and/or one or more CSI reporting types (e.g., a CSI reporting type may be associated with a respective processing time value) based on any predefined processing time values, WTRU 102 capabilities, and/or a received configuration and/or indication (e.g., from a gNB 180).

For example, the WTRU 102 may be provided and/or configured with one or more predefined processing time values for CSI reporting. The WTRU 102 may be configured to determine one or more CSI parameters for CSI reporting based on the one or more predefined processing time values.

For example, the WTRU 102 may report one or more processing time values based on WTRU capabilities. The WTRU 102 may determine CSI parameters for CSI reporting based on the reported one or more processing time values.

For example, the WTRU 102 may be configured with one or more (e.g., a set of) processing time values and/or CSI types from a NAP (e.g., a gNB 180). The configuration may be based on any of one or more RRC messages and/or one or more MAC CEs. The WTRU 102 may determine CSI parameters for CSI reporting based on the configured one or more processing time values and/or CSI types.

In certain representative embodiments, a WTRU 102 may be configured to perform CSI reporting according to one or more processing time values for CSI reporting which are associated with processing one or more channels and/or signals (e.g., a CSI report may be associated with a respective processing time value). The WTRU 102 may be configured to determine and/or use one or more processing time values and/or one or more CSI reporting types (e.g., periodic, semi-persistent and/or aperiodic) and/or one or more CSI parameters based at least in part on predefined relationships and/or WTRU capabilities.

For example, a WTRU 102 may be provided with one or more predefined processing time values for CSI reporting. Based on the one or more predefined processing time values, the WTRU 102 may be further configured to determine the one or more CSI parameters and/or the one or more CSI reporting types.

For example, the WTRU 102 may be configured to report one or more processing time values for CSI reporting based on WTRU capabilities. Based on the reported one or more processing time values, the WTRU 102 may be further configured to determine the one or more CSI parameters and/or the one or more CSI reporting types.

By way of example only, a WTRU 102 may be configured with a set of one or more processing time values and/or one or more CSI types from a network entity (e.g., gNB 180). The configuration may be based on one or more of RRC messages and/or one or more MAC CEs. Based on the set of processing time values and/or CSI types, the WTRU 102 may be further configured to determine CSI parameters to be measured for CSI reporting In certain embodiments, a WTRU 102 may be provided and/or configured with one or more sets of plural processing time values for CSI reporting and which set of processing time values to use may be determined based on a mode of operation (e.g., WTRU operation mode). For example, a mode of operation may be determined based at least in part on one or more of a system parameter(s) (e.g., frequency range, bandwidth, SCS, cell identifier, etc.), WTRU-specific parameter(s) (e.g., scheduling parameter, CSI reporting configuration, WTRU identifier, BWP configuration, etc.) and/or a channel condition(s) (e.g., range of reported CQI, rank, L1-RSRP, L1-SINR, etc.). A set may include one or more processing time values. In some instances, the sets may share one or more processing time values. In other instances, the sets may not share any processing time values in common. A WTRU 102 may be configured with one or more modes of operation (e.g., operation modes) and a mode of operation may be associated with a set of processing time values.

In certain embodiments, a one-to-one mapping (or correspondence) may be provided between the one or more modes of operation and one or more sets of processing time values. For example, a first mode of operation may be associated with a first set of processing values and the first set may include one or more processing time values, and a second mode of operation may be associated with a second set of processing values and the second set may include one or more processing time values. In some instances, the first set may include a single processing time value while the second set includes plural processing time values.

In certain embodiments, a one-to-many mapping (or correspondence) may be provided between the one or more modes of operation and one or more sets of processing time values. For example, a mode of operation may be associated with one or more sets of processing values. One of the sets may be determined based on based at least in part on one or more of a system parameter(s), a WTRU-specific parameter(s) and/or a channel condition(s).

A WTRU 102 may be configured to determine a processing time value from among plural processing time values based on one or more modes of operation. A number of the (e.g., configured) processing time values may further be determined based on the mode of operation. For example, CSI reporting may be performed according to a first processing time value or a second processing time value determined from among plural processing time values. A WTRU 102 may be configured to determine one of the modes of operation based at least in part on one or more of processing time values, CSI reporting parameters, WTRU capability, DCI and/or WTRU preference.

In the case of one or more processing time values, a WTRU 102 may be configured to determine a mode of operation from among plural modes of operation based at least in part on a number of configured and/or indicated processing time values. For example, the WTRU 102 may be configured to determine to perform CSI reporting according to a default processing time value based at least in part on a network entity (e.g., a gNB 180) not having indicated and/or configured any processing time value(s) for the WTRU 102. For example, the WTRU 102 may be configured to determine to perform CSI reporting according to an indicated and/or configured processing time value based at least in part on the gNB 180, or other network entity, having indicated and/or configured a particular processing time value for the WTRU 102. When the gNB 180 or other network entity has indicated and/or configured plural processing time values, the WTRU 102 may be configured to report plural CSI reporting parameter sets based at least in part on the indicated and/or configured plural processing time values. The reported plural CSI reporting parameter sets may be respectively based on the respective indicated and/or configured plural processing time values. In certain embodiments, there may be a one-to-one correspondence between parameter sets and processing time values.

When the gNB 180 or other network entity has indicated and/or configured plural processing time values, the WTRU 102 may be configured to report one CSI reporting parameter set based at least in part on one processing time value among the indicated and/or configured plural processing time values. The WTRU 102 may be configured to determine the one CSI reporting parameter set to be reported based on WTRU preference and/or WTRU implementation. In certain embodiments, the WTRU 102 may be configured to report the one processing time value as a parameter of the one CSI reporting parameter set.

In the case of one or more CSI reporting parameters, a WTRU 102 may be configured to report plural CSI parameters for different processing time values. For example, the WTRU 102 may report a first CSI parameter for a first processing time value and may report a second CSI parameter for a second processing time value. The CSI reporting parameters may include one or more of a CSI-RS Resource Indicator (CRI), Rank Indicator (RI), Layer Indicator (LI), Precoding Matrix Indicator (PMI), Channel Quality Indicator (CQI), and/or Preferred SCS Index (PSI). For example, the WTRU 102 may report a PSI for PDSCH reception to a gNB 180 or other network entity (e.g., NAP). The WTRU 102 may be configured to determine the PSI from plural candidate SCS based at least in part on predefined values, a MAC CE indication and/or a RRC configuration. For instance, a WTRU 102 may be configured with plural subcarrier spacings (e.g., via one or more RRC messages) and the WTRU 102 may report one or more of subcarrier spacings (e.g., one or more PSIs via CSI reporting).

In the case of WTRU capability, a WTRU 102 may be configured to determine a mode of operation from among plural modes of operation based at least in part on WTRU capability. Further, the WTRU may be configured to determine a mode of operation based at least in part on the WTRU capability and a gNB configuration which is based on WTRU capability reporting. For example, the gNB configuration may be explicit (e.g., configuration of one or more processing time values) and/or implicit (e.g., configuration of one or more processing types which in turn determine one or more processing time values). In some instances, a WTRU 102 may be configured with a processing time value among plural processing time values and may be configured to perform a CSI reporting process according to the configured processing time value. In some instances, a WTRU 102 may be configured with a processing time type among plural processing time types and may be configured to perform a CSI reporting process according to a processing time value indicated by the configured processing time type.

For example, the gNB configuration may be based at least in part on one or more of a configuration in a CSI Resource Config, a configuration in a CSI Report Config, a configuration in a CSI-RS resource set, a configuration in a CSI aperiodic trigger state list, and/or a configuration in a CSI Associated Report Config information. For example, a WTRU 102 may be configured with plural processing time values, the plural processing time values respectively corresponding to plural trigger states for aperiodic CSI report. Based on the configuration, the WTRU 102 may be configured to process CSI reporting assuming the respective processing time values corresponding to triggered CSI report configs for aperiodic CSI reporting. For example, a WTRU 102 may be configured with plural processing time types, the plural processing time types respectively corresponding to plural trigger states for aperiodic CSI report. Based on the configuration, the WTRU 102 may be configured to process CSI reporting assuming a processing time value indicated by the respective processing time types for corresponding triggered CSI report configs for aperiodic CSI reporting.

In the case of DCI, a WTRU 102 may be configured to determine a mode of operation from among plural modes of operation based at least in part on a gNB indication in DCI. For example, a WTRU 102 may be configured to receive an indication with one or more DCI bits which may determine plural processing time types for corresponding trigger states for aperiodic CSI reporting. In other words, a first value in a DCI (e.g., a predetermined bitfield or flag) may indicate a first processing time type and a second value in the DCI may indicate a second processing time type. Based on the indication, the WTRU 102 may be configured to determine a respective processing time value from at least the first and second processing time types for reporting a corresponding triggered CSI report.

In the case of WTRU preference, a WTRU 102 may be configured to request a preferred mode of operation for processing time determination. For example, on condition that a WTRU 102 is capable of supporting plural modes of operation, the WTRU 102 may be configured to indicate a preferred mode of operation from among the plural modes of operation to a network entity (e.g., a gNB 180). The UE may be further configured to determine the preferred mode of operation from among the plural modes of operation based at least in part on one or more of a cell configuration and/or activation, and a panel configuration and/or activation.

Accordingly, a WTRU 102 may be configured to determine a processing time value from among plural processing time values, and to perform CSI processing based on the determined processing time value. The plural processing time values may be based at least in part on one or more of predefined values, RRC configured values, MAC CE indicated values, DCI indicated values, and/or WTRU measurement. For example, the WTRU 102 may be configured to have plural processing times of PDSCH decoding for CSI reporting. For example, the WTRU 102 may be configured to receive plural processing times based on one or more RRC messages. For example, the WTRU 102 may be configured to receive plural processing times based on one or more MAC CE messages. For example, the WTRU 102 may be configured to receive one or more DCI fields which indicate plural processing times to the WTRU 102.

In the case of WTRU measurement, the WTRU 102 may be configured to measure actual (e.g. performed) processing times at least for receiving and/or transmitting one or more signals and/or channels. The signals may include any of CSI-RS, DM-RS, PT-RS, TRS, and/or SRS. The channels may include any of PDCCH, PDSCH, PUCCH, PUSCH, and/or PRACH. For example, the WTRU 102 may be configured to measure actual (e.g. performed) processing times at least for activating, deactivating and/or switching any of TCI state, BWP, Scell, panel, and/or TRP.

As an example, measurement of processing time(s) may be based at least in part on one or more scheduled PDSCHs and/or PUSCHs by a gNB 180 or the like (e.g., NAP). For instance, a WTRU 102 may be configured to receive an indication, in a DCI, which enables WTRU measurement of processing time. The PDCCH may comprise PDSCH and/or PUSCH scheduling with corresponding information (e.g., time/frequency resources, redundancy version, MCS, etc.).

The WTRU 102 may be further configured to measure a processing time (e.g., of a process performed by the WTRU 102) and report the measured value to the gNB 180 based on the information in the PDSCH and/or PUSCH scheduling.

For example, measurement of processing time(s) may be based at least in part on one or more of a time and/or a frequency window. For example, a WTRU 102 may be configured to measure processing time in a time and/or frequency window on condition that a gNB 180 has configured and/or indicated processing time measurement. A time and/or frequency window may be based at least in part on one or more of RRC messages, MAC CE messages, and/or DCI. For instance, a WTRU 102 may be configured to receive a gNB configuration of a time and/or frequency window (e.g., ms, slots, symbols, resource blocks, subbands, BWPs, etc.) based on one or more RRC messages. Further, a WTRU 102 may be configured to receive a gNB indication of a time and/or frequency window (e.g., ms, slots, symbols, resource blocks, subbands, BWPs, etc.) based on one or more MAC CE messages. Further, a WTRU 102 may be configured to receive a gNB activation and/or deactivation of a time and/or frequency window. A time and/or frequency window may be activated after 'X' time (e.g., ms, slots, symbols) from reception of the activation. Further, a time and/or frequency window may be deactivated after 'Y' time (e.g., ms, slots, symbols) from reception of the deactivation. Still further, a WTRU 102 may be configured to receive a gNB configuration of a time and/or frequency window (e.g., ms, slots, symbols, resource blocks, subbands, BWPs, etc.) based on one or more DCIs.

In certain embodiments, a WTRU 102 may be configured to determine a processing time value from among plural processing time values for CSI reporting (e.g., a CSI report) that has been triggered and/or configured. The WTRU 102 may receive one or more of the plural processing time values based at least in part on one or more RRC messages, MAC CE indication and/or DCI indication (e.g., explicit and/or implicit indication). For example, the WTRU 102 may be configured to receive one or more processing time values of plural processing time values based on one or more RRC messages. The reception of such processing time values may be based at least in part on one or more of a configuration in a CSI Resource Config, a configuration in a CSI Report Config, a configuration in a CSI-RS resource set, a configuration in a CSI aperiodic trigger state list, and/or a configuration in a CSI Associated Report Config information. For example, a WTRU 102 may be configured with plural processing time types which correspond to plural trigger states for aperiodic CSI reporting Based on the configuration, the WTRU 102 may be configured to determine a processing time type among the plural processing time types for any triggered CSI report configuration (e.g., to perform aperiodic CSI reporting).

In certain embodiments, a WTRU 102 may be configured to determine one or more CSI parameters based at least in part on a processing time value among plural processing time values. Based on a mode of operation for CSI reporting with plural processing time values, the WTRU 102 may report any of CRI, RI, LI, PMI, CQI, and/or PSI. The CSI reporting may be based on one or more uplink signals and/or channels including PUCCH, PUSCH, PRACH and/or MAC CE.

Further, a WTRU 102 may be configured to determine a subset of CSI parameter from a set of CSI parameters that have been triggered or configured to be reported on condition that a CSI reporting timing is less than a processing time value (e.g., a determined processing time value) associated with the CSI reporting. For example, a WTRU 102 may be configured to be triggered to report a set of CSI parameters at timing corresponding to (e.g., at) a slot #n. The triggered reporting may have a reporting timing corresponding to (e.g., at) a slot #n+k1 and a processing time value (e.g., a determined processing time value) is k2. On condition that k2<k1, the WTRU 102 may be configured to report the set of CSI parameters which have been triggered. On the other hand, on condition that k2>k1, the WTRU 102 may be configured to report a subset of CSI parameters from among the set of CSI parameters.

the subset of CSI parameters may be determined according to a priority rule. For example, a wideband CSI parameter (e.g., wideband CQI, RI, LI, and/or CRI) may be a higher priority than a subband SI parameter (e.g., subband CQI). For example, a beam management related CSI parameter (e.g., CRI) may be a higher priority than a non-beam management related CSI parameter (e.g., PMI, CQI, RI).

Processing Time—WTRU Reporting

In certain embodiments, one or more of modes of operation (e.g., dynamic WTRU reporting of processing time value) may be based on a processing time determination. A WTRU 102 may be configured to determine a mode of operation based at least in part on one or more processing time values, measurement windows, time resources, frequency resources, WTRU capability and/or gNB configuration. Hence, a WTRU 102 may be configured to determine a mode of operation based at least on one or more processing time values (e.g., one or more of a PDSCH processing time, a PUSCH processing time, a TCI state activation/deactivation/switching time and a BWP activation/deactivation/switching time). The WTRU 102 may determine the mode of operation based on a number of configured/indicated processing time values. For example, on condition that the WTRU 102 is indicated and/or configured with no processing time value, the WTRU 102 may be configured to determine to use a semi-static processing time value and not generate and/or not transmit (e.g., report) the semi-static processing time value. On condition that the WTRU 102 is indicated and/or configured with a processing time value, the WTRU 102 may be configured to determine to use a semi-static processing time value and not report the semi-static processing time value. On condition that the WTRU 102 is indicated and/or configured with plural processing time values (or types), the WTRU 102 may be configured to determine to report determined processing time value(s) (e.g., dynamically determined processing time value(s)).

A WTRU 102 may be configured to determine a mode of operation based on one or more measurement windows. A WTRU 102 may be configured to determine a mode of operation based on one or more time resources and/or frequency resources for measurement. A WTRU 102 may be configured to determine a mode of operation based on a WTRU capability and gNB configuration based on the WTRU capability reporting (e.g., based on one or more RRC messages).

In certain embodiments, a WTRU 102 may be configured with one or more default processing time values. For example, a WTRU 102 may be configured with one or more default processing time values after receiving a RRC configuration (or reconfiguration). For example, a WTRU 102 may be configured with one or more default processing time values before WTRU 102 reporting of processing time values and application of the reported processing time values (e.g., to a next processing of a PDSCH, a PUSCH, a TCI state, etc.). For example, a WTRU 102 may be configured with one or more default processing time values after receiving an activation (or deactivation) message for one or more antennas, panels, TRPs and/or BWPs.

A WTRU 102 may be configured to determine one or more default processing time values based at least in part on one or more of predefined fixed values, WTRU capability, largest values among candidate processing values, and/or largest values among reported processing time values. For example, a WTRU 102 may be configured to determine one or more largest values among available processing time values. For example, a WTRU 102 may be configured to determine one or more largest values among the processing time values previously reported by the WTRU 102. Further, the determination may be performed per processing time type in some cases.

In certain embodiments, a WTRU 102 may be configured to report one or more processing time values to a NAP (e.g., gNB 180), such as by MAC CE, UCI via PUCCH and/or UCI via PUSCH. The one or more processing time values may include one or more WTRU preferred processing time values.

For example, a WTRU 102 may be configured to report one or more (e.g., preferred) processing time values based on one or more MAC CEs. A MAC CE may be identified by a MAC CE subheader and may include a Logical Channel Identifier (LCID).

For example, a WTRU 102 may be configured to report one or more (e.g., preferred) processing time values based on CSI reporting via PUCCH (e.g., periodic CSI reporting or semi-persistent CSI reporting with PUCCH). For example, a WTRU 102 may be configured to report one or more preferred processing time values based on HARQ-ACK reporting. The processing time values may be separately encoded or jointly encoded with HARQ-ACK information. On condition that a NAP (e.g., gNB 180) configures WTRU reporting with HARQ-ACK information, the WTRU 102 may be configured to determine a number of bits for HARQ-ACK reporting as a maximum size in consideration of the processing time value reporting. For instance, a WTRU 102 may be configured to transmit specific bits (e.g., "0"s and/or "1"s) when a NAP (e.g., gNB 180) does not trigger processing time value reporting. For example, a padding pattern and/or null pattern may be transmitted on condition that processing time value reporting is not triggered.

For example, a WTRU 102 may be configured to report one or more (e.g., preferred) processing time values based on CSI reporting via PUSCH (e.g., aperiodic CSI reporting or semi-persistent CSI reporting with PUSCH). For example, a WTRU 102 may be configured to report one or more preferred processing time values based on HARQ-ACK reporting. The processing time values may be separately encoded or jointly encoded with HARQ-ACK information. On condition that a gNB 180 configures WTRU reporting with HARQ-ACK information, the WTRU 102 may be configured to determine a number of bits for HARQ-ACK reporting as a maximum size in consideration of the processing time value reporting. For instance, a WTRU 102 may be configured to transmit specific bits (e.g., "0"s and/or "1"s) when a gNB 180 does not trigger processing time value reporting. For example, a padding pattern and/or null pattern may be transmitted on condition that processing time value reporting is not triggered.

In certain embodiments, WTRU reporting may include one or more of an identification of at least one target, at least one priority indication, at least one processing time type indication and/or one or more processing time values (e.g., determined and/or preferred processing time values or types). The identification of the target may include one or more Cell IDs, Cell group IDs, BWP IDs, BWP group IDs, Band IDs, Band combination IDs, RS resource IDs, RS set IDs and/or RS group IDs.

Further, WTRU reporting may include a priority indication (e.g., service type) of the identified target(s) (e.g., cell, cell group, BWP, BWP group, band combination, RS resource, RS set and/or RS group). For example, a WTRU report may have a first priority indication with a first processing time value, and the WTRU 102 may apply the first processing time value for channels and/or signals associated with the first priority. The WTRU report may also have a second priority indication with a second processing time value, and the WTRU 102 may apply the second processing time value for channels and/or signals associated with the second priority. Lower values of the priority indication may indicate lower priority (e.g., 0) and higher value of the priority indication may indicate higher priority (e.g., 1). In certain embodiments, a service type indication (e.g., any of eMBB, URLLC, and/or mMTC, etc.) may be used to indicate priority.

Further, WTRU reporting may include a processing time type indication. A WTRU 102 may be configured to report one or more of processing time types for one or more processing time values. For example, a WTRU report may have a first processing time type indication with a first processing time value, and the WTRU 102 may apply the first processing time value for channels and/or signals associated with the first processing time type. The WTRU report may also have a second processing time type indication with a second processing time value, and the WTRU 102 may apply the second processing time value for channels and/or signals associated with the second processing time type.

The processing time type indication may be an explicit indication and/or an implicit indication. For example, the WTRU 102 may be configured to indicate a value based on a predefined table (e.g., an explicit indication). For example, the WTRU 102 may be configured with one or more processing time types for dynamic reporting of processing time values (e.g., via one or more RRC messages). Based on the configuration, the WTRU 102 may indicate a processing time type of the one or more processing time types (e.g., an explicit indication). For example, the WTRU 102 may be configured to indicate one or more values based on Radio Network Temporary Identifiers (RNTIs) and/or LCID (e.g., implicit indication). Namely, a WTRU 102 may be configured to provide a WTRU report scrambled with a first RNTI to indicate a first processing time type whereas a WTRU report scrambled with a second RNTI may indicate a second processing time type. Furthermore, a WTRU 102 may be configured to provide a WTRU report with a first LCID to indicate a first processing time type whereas a WTRU report with a second LCID may indicate a second processing time type.

The one or more processing time types may include one or more of Scell activation, Scell group activation, TCI state activation, PDSCH processing time, PUSCH processing time, CSI processing time and/or pathloss RS processing time. In certain embodiments, a WTRU 102 may be configured to apply the reported one or more of processing time values for the target with the reported ID, the reported priority and the reported processing time Further, WTRU reporting may include one or more processing time values which may be based at least in part on one or more of an explicit value indication, an explicit difference between a default (or predetermined) value and a processing time value to be reported, and/or an implicit value indication. In the case of explicit value indication(s), a WTRU 102 may be configured to indicate a respective value based on a predefined table. For example, a WTRU 102 may be configured with one or more processing time types for dynamic reporting of processing time values (e.g., via one or more RRC messages). Based on the configuration, the WTRU 102 may indicate a processing time type of the one or more configured processing time types. The indicated processing time type may represent one or multiple processing time values.

In the case of explicit difference(s) between default (or predetermined) value(s) and processing time value(s) to be reported, a WTRU 102 may be configured to indicate a respective difference between a default processing time value and a processing time value to be reported. For example, the difference may be based on values in a predefined table and/or RRC configured values for WTRU reporting.

In the case of implicit value indication(s), a WTRU 102 may be configured to implicitly indicate a respective processing time value based on one or more of service type, processing time type, SCS, and/or frequency range. For example, where a WTRU reports a first service type (e.g., eMBB), a first set of processing time values may be associated with the WTRU reporting. Similarly, where the WTRU 102 reports a second service type (e.g., URLLC), a second set of processing time values may be associated with the WTRU reporting. For example, where a WTRU 102 reports a first processing time type (e.g., type 1), a first set of processing time values may be associated with the WTRU reporting. Similarly, where the WTRU 102 reports a second processing time type (e.g., type 2), a second set of processing time values may be associated with the WTRU reporting. For example, where a WTRU 102 reports a first subcarrier spacing which is lower than a threshold, a first set of processing time values may be associated with the WTRU reporting. Similarly, where the WTRU 102 reports a second subcarrier spacing which is lower than the threshold, a second set of processing time values may be associated with the WTRU reporting. For example, where a WTRU 102 reports using a first frequency range (e.g., FR1 or FR2), a first set of processing time values may be associated with the WTRU reporting. Similarly, where the WTRU 102 reports using a second frequency range (e.g., FR3 or FR4), a second set of processing time values may be associated with the WTRU reporting.

In certain embodiments, a WTRU 102 may be configured to receive one or more confirmation messages which may correspond to one or more WTRU reportings (e.g., reports) on processing time values. The one or more confirmation messages may be based at least in part on one or more of PDCCH reception via one or more dedicated CORESETs and/or search spaces, and/or PDCCH reception with a time window. For example, a WTRU 102 may be configured with one or more dedicated CORESETs and/or search spaces for confirmation messages. After transmitting WTRU reporting, the WTRU 102 may be configured to receive a confirmation (e.g., PDCCH) based on the dedicated CORESETs/search spaces. The dedicated CORESETs/search spaces may be provided per WTRU 102, per processing time type, per priority (or service type), and/or per cell, cell group, BWP, BWP group, RS resource, RS resource set and/or RS group. For example, after transmitting WTRU reporting (e.g., a WTRU report), the WTRU 102 may be configured to receive a confirmation via PDCCH reception within a time window. The time window may be based on a predefined value or may be a RRC configured value.

In certain embodiments, a WTRU 102 may be configured to apply one or more reported processing time values. The processing time values may be applied for one or more of a reported target, a reported priority (or service type) and/or a processing time type. For example, the WTRU 102 may apply one or more reported processing time values after a time 'X' (e.g., slot, symbol or ms) from a transmission time of the WTRU report. In other words, upon transmitting a WTRU report in a slot 'n', the WTRU 102 may be configured to apply the reported processing time values in a slot n+X. The WTRU 102 may be configured to determine X based on one or more of subcarrier spacing, frequency range, priority and/or service type.

For example, a WTRU 102 may be configured to apply one or more reported processing time values after a time X (e.g., slot, symbol or ms) from a reception time of a confirmation of the WTRU report. In other words, upon receiving a confirmation in a slot n, the WTRU 102 may be configured to apply the reported processing time values in a slot n+X. The WTRU 102 may be configured to determine X based on one or more of subcarrier spacing, frequency range, priority and/or service type.

Figure 18:
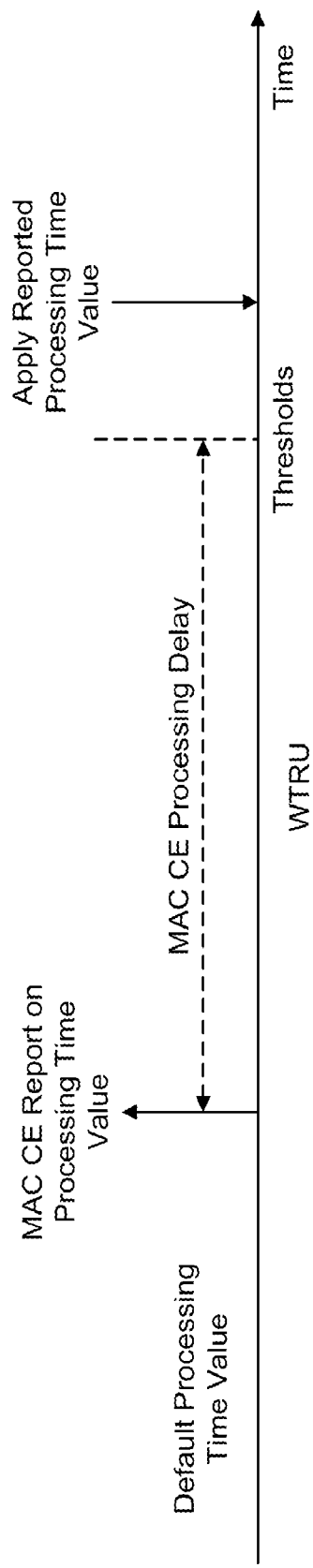
FIG. 18 is a diagram illustrating a representative UE determination of processing time and application of a determined processing time.

FIG. 18 is a diagram illustrating a representative WTRU determination of processing time and application of a determined processing time. As shown in FIG. 18, a WTRU 102 may be configured (e.g., initialized) with at least one default processing time value (e.g., a default processing delay and/or semi-static processing time for processing a corresponding one or more channels and/or signals) at 1802. After being configured with the at least one default processing time value, the WTRU 102 may be configured to report at least one determined (and/or preferred) processing time to a gNB 180 at 1804. The WTRU 102 report may be a MAC CE report which indicates, either explicitly or implicitly, the at least one determined (and/or preferred) processing time. The at least one determined (and/or preferred) processing time may be determined according one or more of the examples described above. The determined (and/or preferred) processing time value may be determined according to any one or more of the foregoing examples and/or conditions described herein. For example, the WTRU 102 may be configured to determine the at least one (and/or preferred) processing time from among plural processing times based on an (e.g., current) implementation, configuration and/or activation state. After a processing delay (e.g., a MAC CE processing delay) from the report transmission, the WTRU 102 may be configured to apply the at least one determined (and/or preferred) processing time indicated in the WTRU report for an operation 1806. For example, the operation may be transmission, reception, measurement and/or reporting of one or more channels and/or signals which are associated with the at least one determined (and/or preferred) processing time indicated in the WTRU report.

Figure 19:
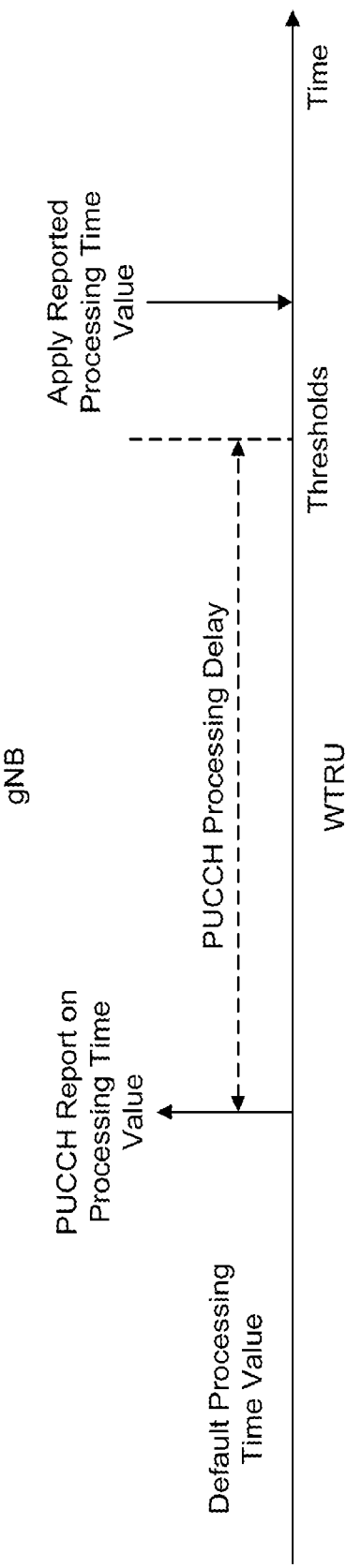
FIG. 19 is a diagram illustrating another representative UE determination of processing time and application of a determined processing time.

FIG. 19 is a diagram illustrating another representative WTRU 102 determination of processing time and application of a determined processing time. As shown in FIG. 19, a WTRU 102 may be configured (e.g., initialized) with at least one default processing time value (e.g., a default processing delay and/or semi-static processing time for processing a corresponding one or more channels and/or signals) at 1902. After being configured with the at least one default processing time value, the WTRU 102 may be configured to report at least one determined (and/or preferred) processing time to a gNB 180 at 1904. The determined (and/or preferred) processing time value may be determined according to any one or more of the foregoing examples and/or conditions described herein. The WTRU report may be a PUCCH report which indicates, either explicitly or implicitly, the at least one determined (and/or preferred) processing time. The at least one determined (and/or preferred) processing time may be determined according to one or more of the examples described above. For example, the WTRU 102 may be configured to determine the at least one (and/or preferred) processing time from among plural processing times based on an (e.g., current) implementation, configuration and/or activation state. After a processing delay (e.g., a PUCCH processing delay) from the WTRU reporting transmission, the WTRU 102 may be configured to apply the at least one determined (and/or preferred) processing time indicated in the WTRU report for an operation at 1906. For example, the operation may be transmission, reception, measurement and/or reporting of one or more channels and/or signals which are associated with the at least one determined (and/or preferred) processing time indicated in the WTRU report.

Figure 20:
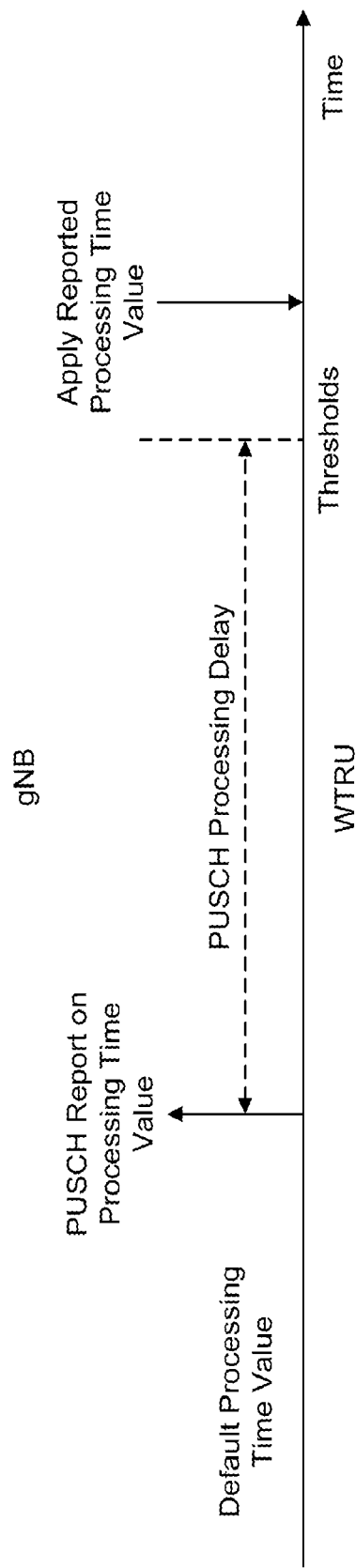
FIG. 20 is a diagram illustrating another representative UE determination of processing time and application of a determined processing.

FIG. 20 is a diagram illustrating yet another representative WTRU determination of a processing time and application of a determined processing time. As shown in FIG. 20, a WTRU 102 may be configured (e.g., initialized) with at least one default processing time value (e.g., a default processing delay and/or semi-static processing time for processing a corresponding one or more channels and/or signals) at 2002. After being configured with the at least one default processing time value, the WTRU 102 may be configured to report at least one determined (and/or preferred) processing time to a gNB 180 at 2004. The determined (and/or preferred) processing time value may be determined according to any one or more of the foregoing examples and/or conditions described herein. The WTRU report may be a PUSCH report which indicates, either explicitly or implicitly, the at least one determined (and/or preferred) processing time. The at least one determined (and/or preferred) processing time may be determined according one or more of the examples described above. For example, the WTRU may be configured to determine the at least one (and/or preferred) processing time from among plural processing times based on an (e.g., current) implementation, configuration and/or activation state. After a processing delay (e.g., a PUSCH processing delay) from the WTRU reporting transmission, the WTRU may be configured to apply the at least one determined (and/or preferred) processing time indicated in the WTRU report for an operation at 2006. For example, the operation may be transmission, reception, measurement and/or reporting of one or more channels and/or signals which are associated with the at least one determined (and/or preferred) processing time indicated in the WTRU report.

Figure 21:
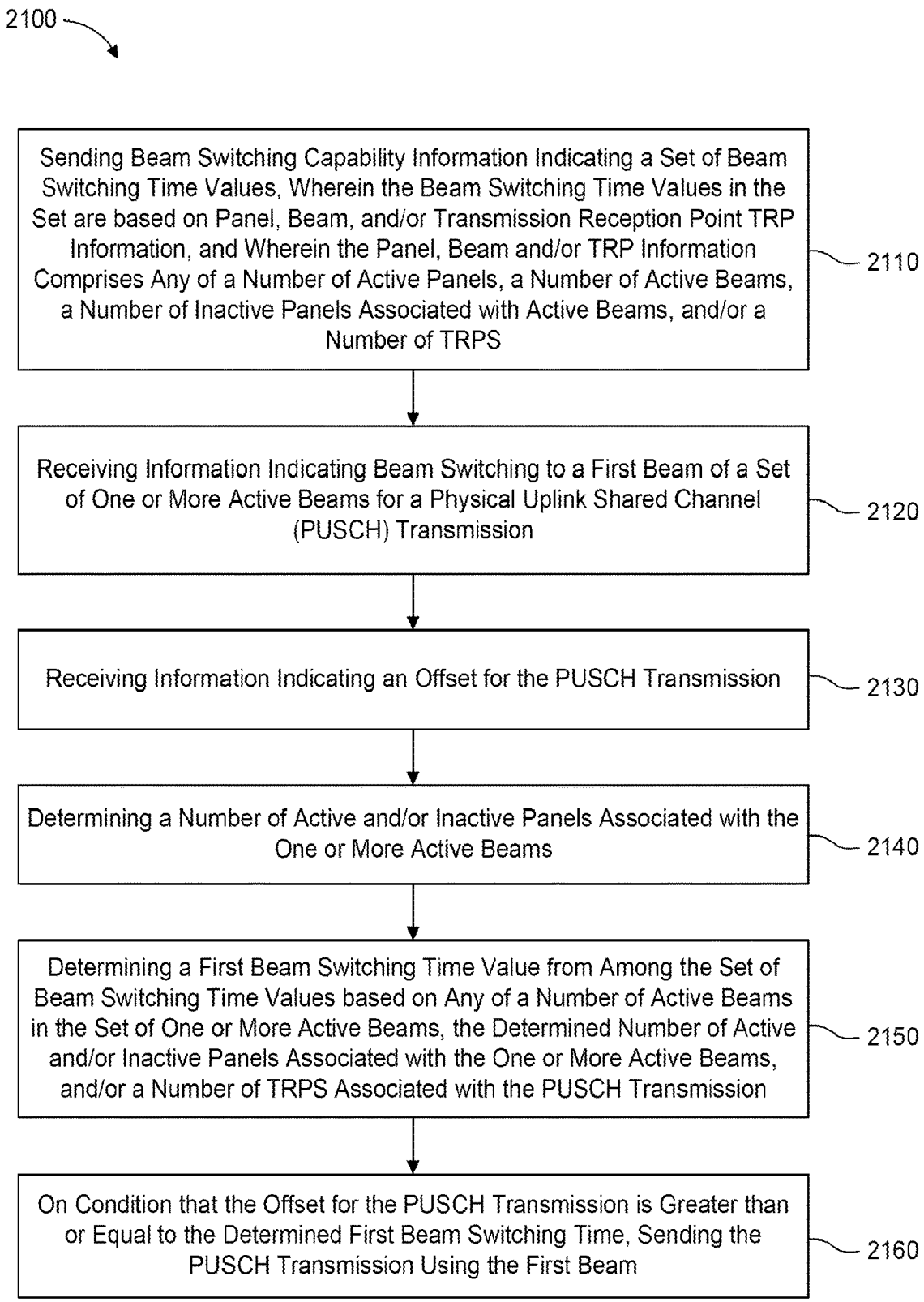
FIG. 21 is a diagram illustrating a representative procedure for beam switching for a PUSCH transmission.

FIG. 21 is a diagram illustrating a representative procedure 2100 for beam switching for a PUSCH transmission. The procedure 2100 may be implemented at a WTRU 102. As shown in FIG. 21, the procedure 2100 may include sending beam switching capability information indicating a set of beam switching time values at 2110. The beam switching time values in the set may be based on panel, beam, and/or transmission reception point TRP information. For example, the panel, beam and/or TRP information comprises any of a number of active panels, a number of active beams, a number of inactive panels associated with active beams, and/or a number of TRPs. At 2120, the WTRU 102 may perform receiving of information indicating beam switching to a first beam of a set of one or more active beams for a physical uplink shared channel (PUSCH) transmission. At 2130, the WTRU 102 may proceed to receive information indicating an offset for the PUSCH transmission. After 2130, the WTRU 102 may determine a number of active and/or inactive panels associated with the one or more active beams at 2140. After 2140, the WTRU 102 may proceed to determining a first beam switching time value from among the set of beam switching time values based on any of a number of active beams in the set of one or more active beams, the determined number of active and/or inactive panels associated with the one or more active beams, and/or a number of TRPs associated with the PUSCH transmission at 2150. At 2150, the WTRU 102 may, on condition that AN offset for the PUSCH transmission is greater than or equal to the determined first beam switching time, perform sending of the PUSCH transmission using the first beam at 2160. For example, the information indicating beam switching may be included and/or indicated in DCI, and the DCI may also include information indicating the offset for the PUSCH transmission.

Figure 22:
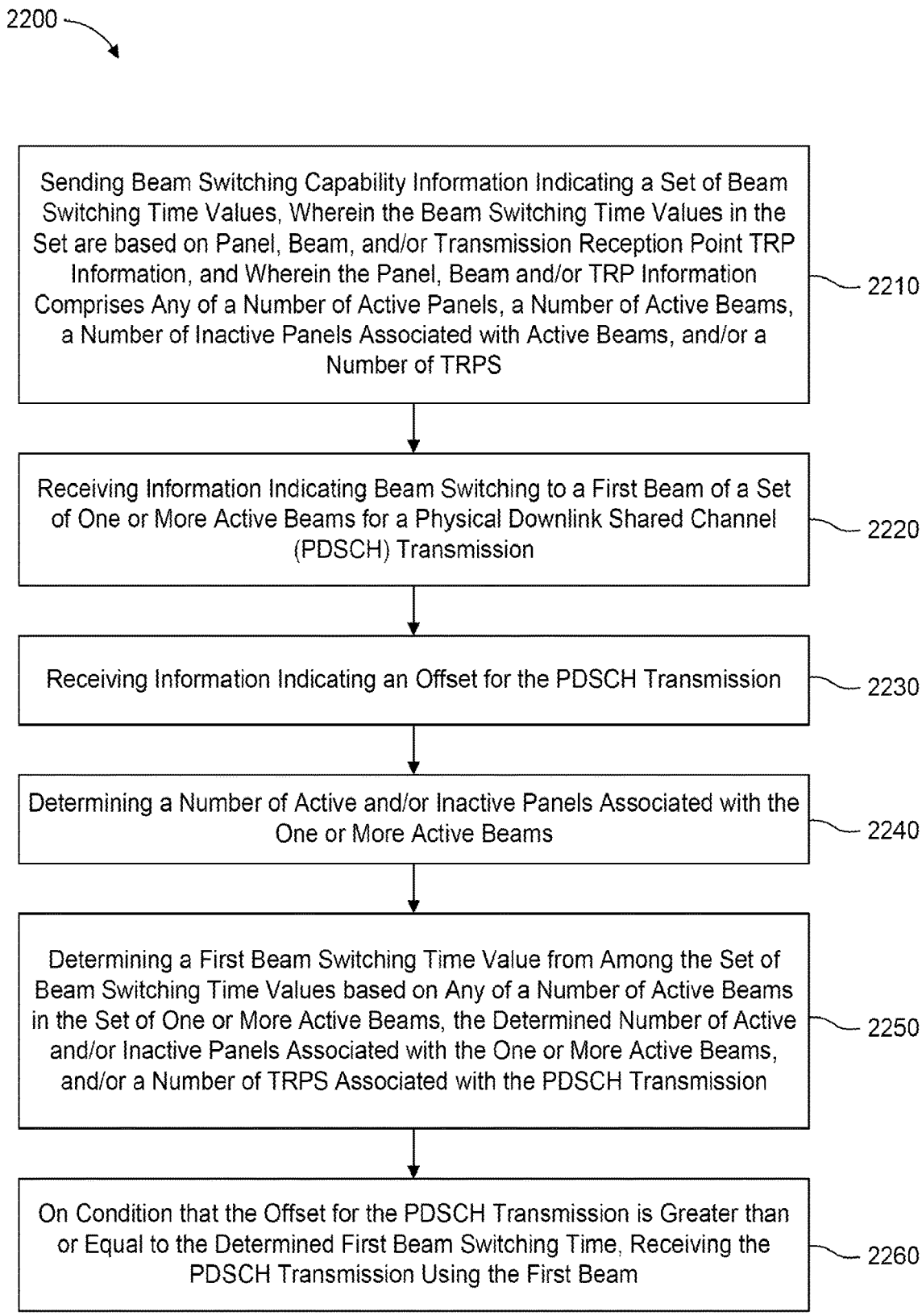
FIG. 22 is a diagram illustrating another representative procedure for beam switching for a PDSCH transmission.

FIG. 22 is a diagram illustrating another representative procedure 2200 for beam switching for a PDSCH transmission. The procedure 2200 may be implemented at a WTRU 102. As shown in FIG. 22, the procedure 2200 may include sending beam switching capability information indicating a set of beam switching time values at 2210. The beam switching time values in the set may be based on panel, beam, and/or transmission reception point TRP information, and wherein the panel, beam and/or TRP information comprises any of a number of active panels, a number of active beams, a number of inactive panels associated with active beams, and/or a number of TRPs. At 2220, the WTRU 102 may perform receiving information indicating beam switching to a first beam of a set of one or more active beams for a physical downlink shared channel (PDSCH) transmission. After 2220, the WTRU 102 may proceed with receiving information indicating an offset for the PDSCH transmission at 2230. At 2240, determining a number of active and/or inactive panels associated with the one or more active beams. At 2250, the WTRU 102 may proceed with determining a first beam switching time value from among the set of beam switching time values based on any of a number of active beams in the set of one or more active beams, the determined number of active and/or inactive panels associated with the one or more active beams, and/or a number of TRPs associated with the PDSCH transmission. At 2260, the WTRU 102 may, on condition that the offset for the PDSCH transmission is greater than or equal to the determined first beam switching time, may perform receiving of the PDSCH transmission using the first beam. For example, the information indicating beam switching may be included and/or indicated in DCI, and the DCI may also include information indicating the offset for the PDSCH transmission.

FIG. 23 is a diagram illustrating a representative procedure 2300 for beam switching for a physical control channel transmission. The procedure 2300 may be implemented at a WTRU 102. As shown in FIG. 23, the procedure 2300 may include sending beam switching capability information indicating a set of beam switching time values at 2310. the beam switching time values in the set are based on panel, beam, and/or transmission reception point TRP information. For example, the panel, beam and/or TRP information may include any of a number of active panels, a number of active beams, a number of inactive panels associated with active beams, and/or a number of TRPs. At 2320, the WTRU 102 may proceed to receiving information indicating beam switching to a first beam of a set of one or more active beams for a physical control channel transmission. After 2320, the WTRU 102 may proceed to determine an offset for the physical control channel transmission (e.g., PDCCH and/or PUCCH transmission) at 2330. For example, the offset may be determined by the WTRU 102. The offset may be determined based on information indicated by a MAC CE. After 2330, the WTRU 102 may proceed to determine a number of active and/or inactive panels associated with the one or more active beams at 2340. At 2350, the WTRU 102 may proceed to determine a first beam switching time value from among the set of beam switching time values based on any of a number of active beams in the set of one or more active beams, the determined number of active and/or inactive panels associated with the one or more active beams, and/or a number of TRPs associated with the physical control channel transmission. After 2350, the WTRU 102 may, on condition that the offset is greater than or equal to the determined first beam switching time, perform receiving of the physical control channel (e.g., PDCCH) transmission using the first beam at 2360. After 2350, the WTRU 102 may, on condition that the offset is greater than or equal to the determined first beam switching time, perform transmitting of the physical control channel (e.g., PUCCH) transmission using the first beam at 2360.

Figure 24:
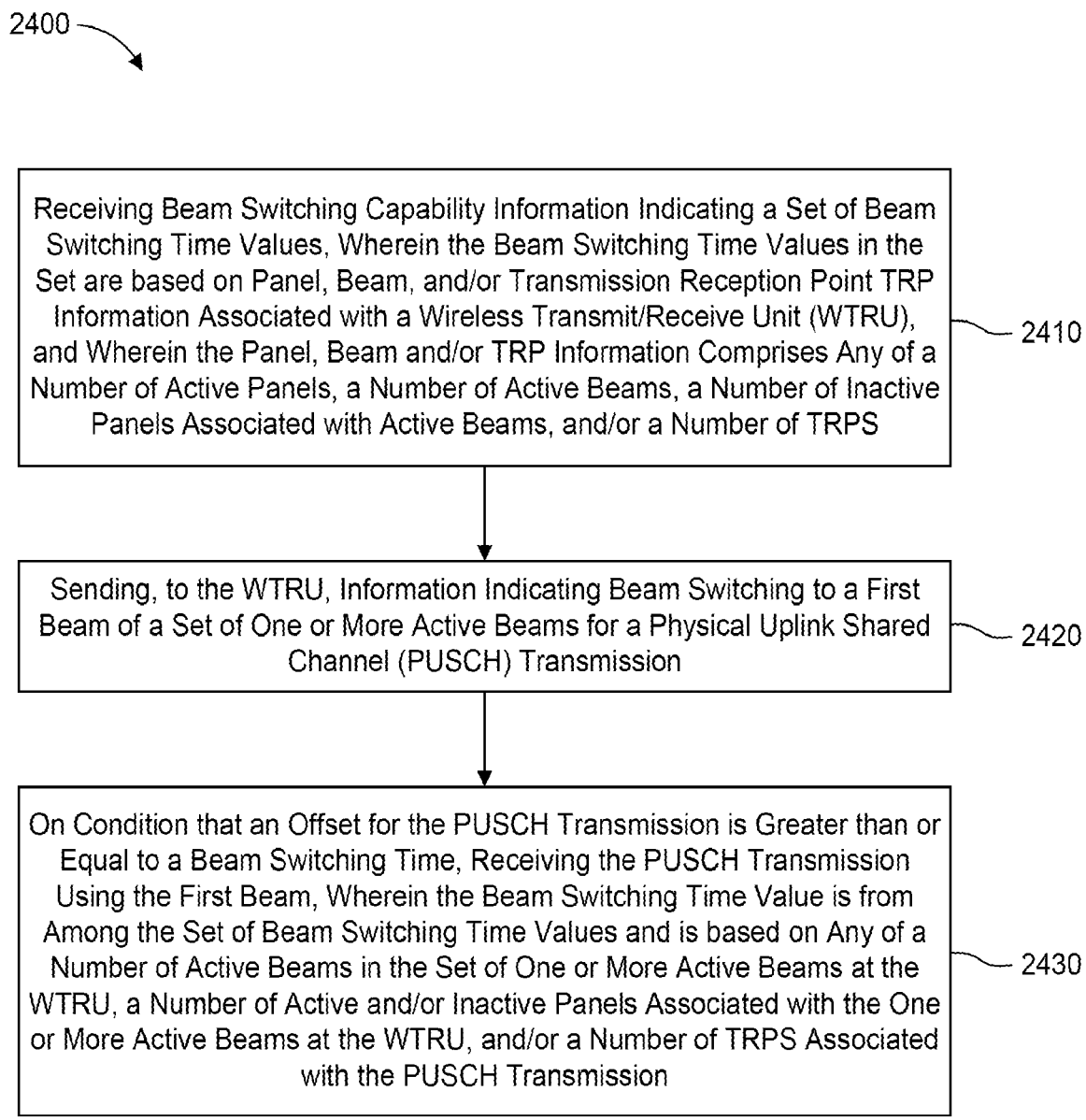
FIG. 24 is a diagram illustrating a representative procedure for beam switching for a PUSCH transmission which may be implemented at a base station.

FIG. 24 is a diagram illustrating a representative procedure 2400 for beam switching for a PUSCH transmission which may be implemented at a base station. The procedure 2400 may be implemented at a base station (e.g., a gNB 180). As shown in FIG. 24, the procedure 2400 may include receiving (e.g., from a WTRU 102) beam switching capability information indicating a set of beam switching time values at 2410. The beam switching time values in the set may be based on panel, beam, and/or transmission reception point TRP information associated with a WTRU 102. For example, the panel, beam and/or TRP information may include any of a number of active panels, a number of active beams, a number of inactive panels associated with active beams and/or a number of TRPs. At 2420, the base station may proceed with sending, to the WTRU 102, information indicating beam switching to a first beam of a set of one or more active beams for a PUSCH transmission. After 2420, the base station may, on condition that an offset for the PUSCH transmission is greater than or equal to a beam switching time, proceed with receiving the PUSCH transmission using the first beam at 2430. For example, the beam switching time value may be determined (e.g., by the WTRU 102) from among the set of beam switching time values and may be based on any of a number of active beams in the set of one or more active beams at the WTRU, a number of active and/or inactive panels associated with the one or more active beams at the WTRU, and/or a number of TRPs associated with the PUSCH transmission.

Figure 25:
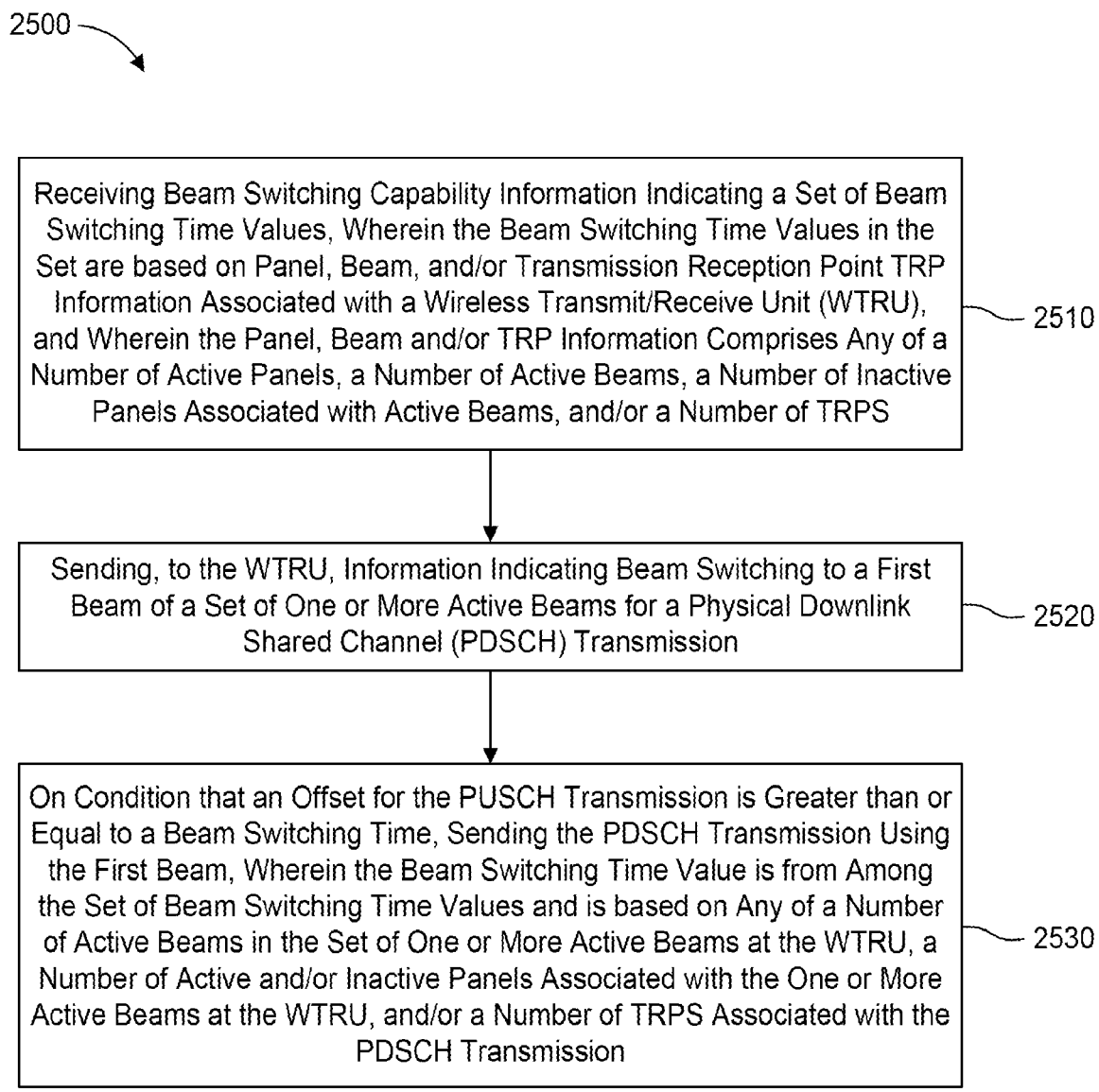
FIG. 25 is a diagram illustrating another representative procedure for beam switching for a PDSCH transmission which may be implemented at a base station.

FIG. 25 is a diagram illustrating another representative procedure 2500 for beam switching for a PDSCH transmission which may be implemented at a base station. The procedure 2500 may be implemented at a base station (e.g., a gNB 180). As shown in FIG. 25, the procedure 2500 may include receiving (e.g., from a WTRU 102) beam switching capability information indicating a set of beam switching time values at 2510. The beam switching time values in the set may be based on panel, beam, and/or transmission reception point TRP information associated with a WTRU 102. For example, the panel, beam and/or TRP information may include any of a number of active panels, a number of active beams, a number of inactive panels associated with active beams, and/or a number of TRPs. At 2420, the base station may proceed with sending, to the WTRU 102, information indicating beam switching to a first beam of a set of one or more active beams for a PDSCH transmission. After 2520, the base station may, on condition that an offset for the PDSCH transmission is greater than or equal to a beam switching time, proceed with sending the PDSCH transmission using the first beam at 2530. For example, the beam switching time value may be determined (e.g., by the WTRU 102) from among the set of beam switching time values and may be based on any of a number of active beams in the set of one or more active beams at the WTRU, a number of active and/or inactive panels associated with the one or more active beams at the WTRU, and/or a number of TRPs associated with the PDSCH transmission.

In certain representative embodiments, the determination of the number of active panels and/or inactive panels associated with the one or more active beams may be based on (e.g., at least in part on) a time since the active beams were last used (e.g., by the WTRU 102). For example, the base station may send information to the WTRU 102 to activate and/or deactivate the panels and/or beams.

In certain representative embodiments, the WTRU 102 may receive the information indicating beam switching to the first beam of the set of one or more active beams in a MAC-CE. In certain other representative embodiments, the information indicating beam switching to the first beam of the set of one or more active beams is received in DCI (e.g., a PDCCH transmission).

In certain representative embodiments, a TCI state may be associated with the activated panels at the WTRU 102 and/or gNB 180.

In certain representative embodiments, the respective offsets for the PDSCH transmission and/or the PUSCH transmission may be a time period such as time duration, slot, mini-slot, symbol, frame, sub-frame, and/or values/durations thereof. In some instances, the values thereof may refer to minimum values. In some instances, the values thereof may refer to maximum values.

In certain representative embodiments, the set of beam switching time values may include a first beam switching time value associated with a first number of active beams, active and/or inactive panels, and/or TRPs and a second beam switching time value associated with a second number of active beams, active and/or inactive panels, and/or TRPs. For example, the first beam switching time value may be less than the second beam switching time value, and the first number may be less than the second number.

In certain representative embodiments, the panel, beam and/or TRP information comprises any of the number of active panels, the number of active beams, the number of inactive panels associated with active beams and/or the number of TRPs which are associated with the transmission (e.g., PUSCH, PDSCH, SRS, PDCCH, PUCCH).

Figure 26:
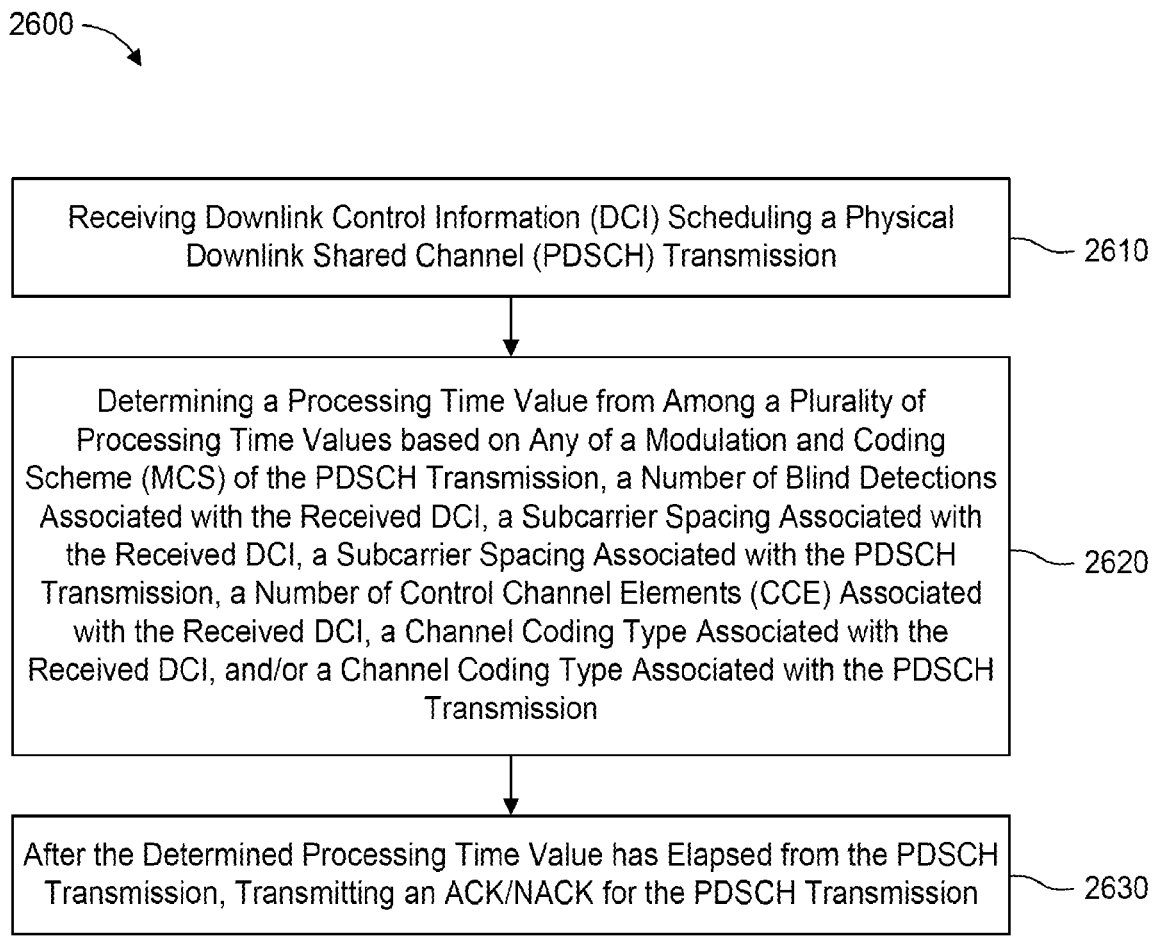
FIG. 26 is a diagram illustrating a representative procedure for determining processing time for a PDSCH transmission based on scheduled information.

FIG. 26 is a diagram illustrating a representative procedure 2600 for determining processing time for a PDSCH transmission based on scheduled information. The procedure 2600 may be implemented at a WTRU 102. As shown in FIG. 26, the procedure 2600 may include receiving downlink control information (DCI) scheduling a physical downlink shared channel (PDSCH) transmission at 2610. After 2610, the WTRU 102 may proceed to determining a processing time value from among a plurality of processing time values based on, for example, any of a modulation and coding scheme (MCS) of the PDSCH transmission, a number of blind detections associated with the received DCI, a subcarrier spacing associated with the received DCI, a subcarrier spacing associated with the PDSCH transmission, a number of control channel elements (CCE) associated with the received DCI, a channel coding type associated with the received DCI, and/or a channel coding type associated with the PDSCH transmission at 2620. At 2630, the WTRU 102 may, after the determined processing time value has elapsed from the PDSCH transmission, transmit an acknowledgement (or Negative acknowledgement) for the PDSCH transmission.

Figure 27:
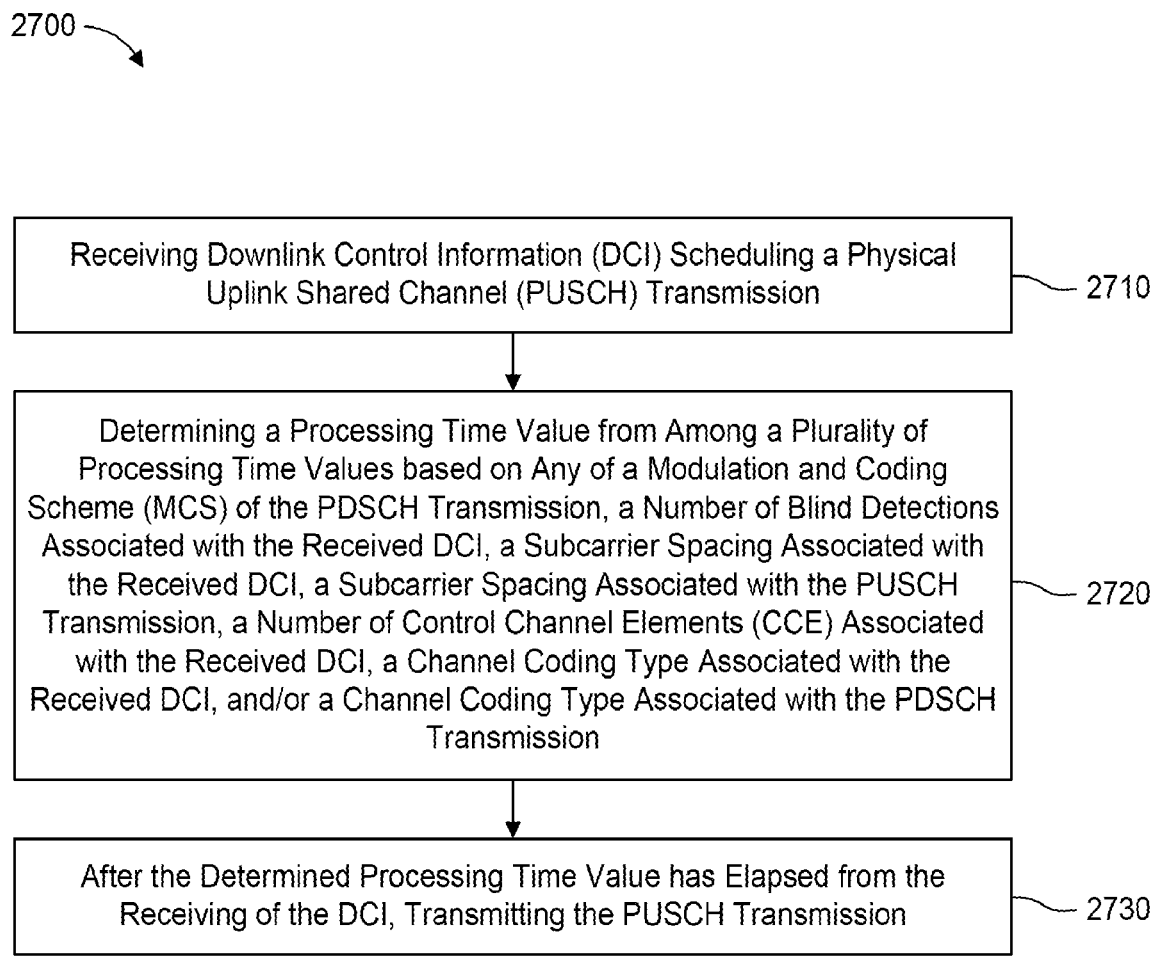
FIG. 27 is a diagram illustrating a representative procedure for determining processing time for a PUSCH transmission based on scheduled information.

FIG. 27 is a diagram illustrating a representative procedure 2700 for determining processing time for a PUSCH transmission based on scheduled information. The procedure 2700 may be implemented at a WTRU 102. As shown in FIG. 27, the procedure 2700 may include receiving downlink control information (DCI) scheduling a PUSCH transmission at 2710. After 2710, the WTRU 102 may proceed to determining a processing time value from among a plurality of processing time values based on, for example, any of a modulation and coding scheme (MCS) of the PUSCH transmission, a number of blind detections associated with the received DCI, a subcarrier spacing associated with the received DCI, a subcarrier spacing associated with the PUSCH transmission, a number of control channel elements (CCE) associated with the received DCI, a channel coding type associated with the received DCI, and/or a channel coding type associated with the PUSCH transmission at 2720. At 2630, the WTRU 102 may, after the determined processing time value has elapsed from the receiving of the DCI, transmit the PUSCH transmission.

Figure 28:
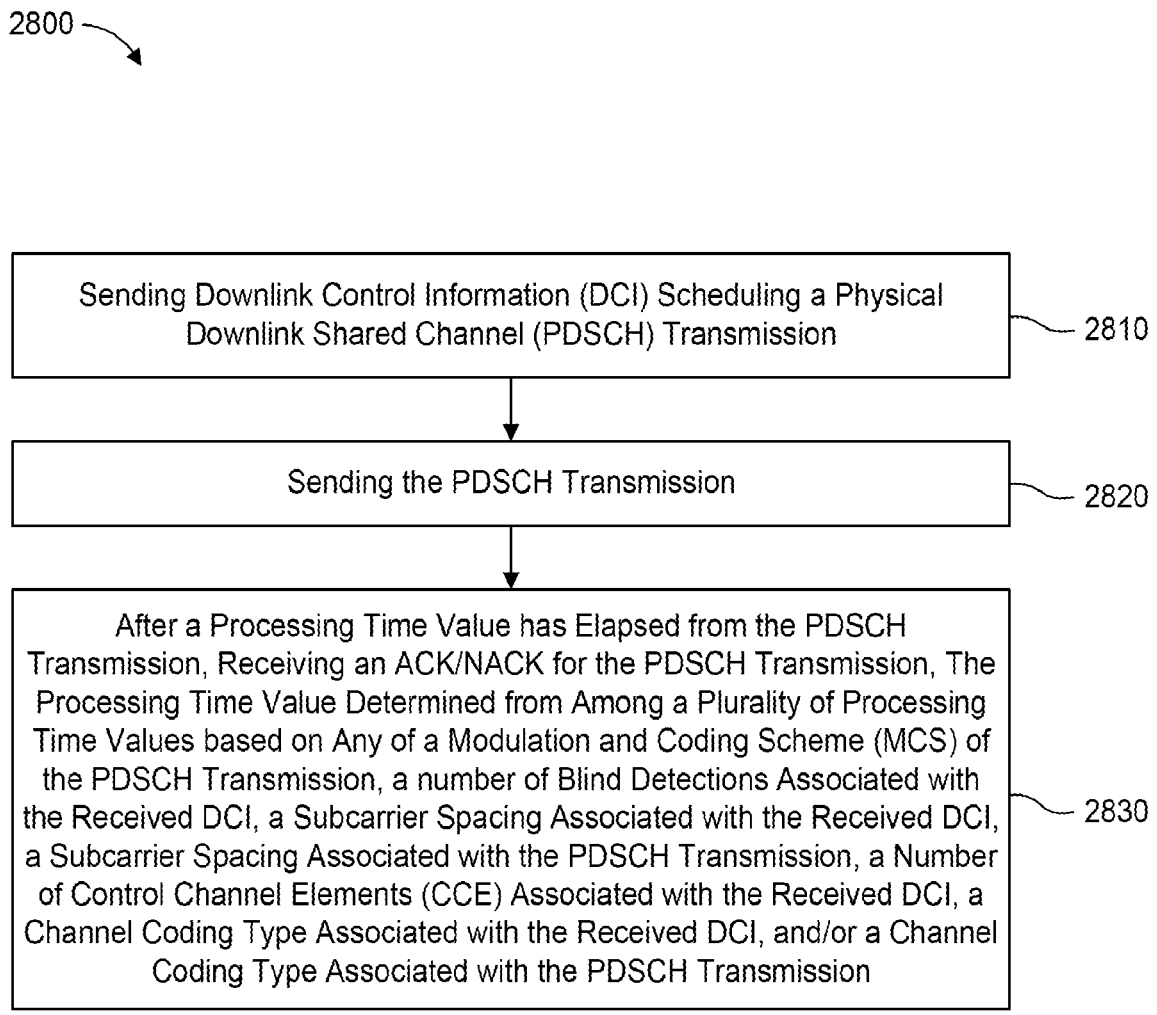
FIG. 28 is a diagram illustrating a representative procedure for a PDSCH transmission based on scheduled information which may be implemented at a base station.

FIG. 28 is a diagram illustrating a representative procedure 2800 for a PDSCH transmission based on scheduled information which may be implemented at a base station. The procedure 2800 may be implemented at a base station (e.g., a gNB 180). As shown in FIG. 28, the procedure 2800 may include sending downlink control information (DCI) scheduling a physical downlink shared channel (PDSCH) transmission at 2810. After, at 2820, the base station may proceed to sending the PDSCH transmission. After a processing time value has elapsed from the PDSCH transmission, the base station may receive an ACK/NACK for the PDSCH transmission at 2830. For example, the processing time value may be determined from among a plurality of processing time values based on any of a modulation and coding scheme (MCS) of the PDSCH transmission, a number of blind detections associated with the received DCI, a subcarrier spacing associated with the received DCI, a subcarrier spacing associated with the PDSCH transmission, a number of control channel elements (CCE) associated with the received DCI, a channel coding type associated with the received DCI, and/or a channel coding type associated with the PDSCH transmission.

Figure 29:
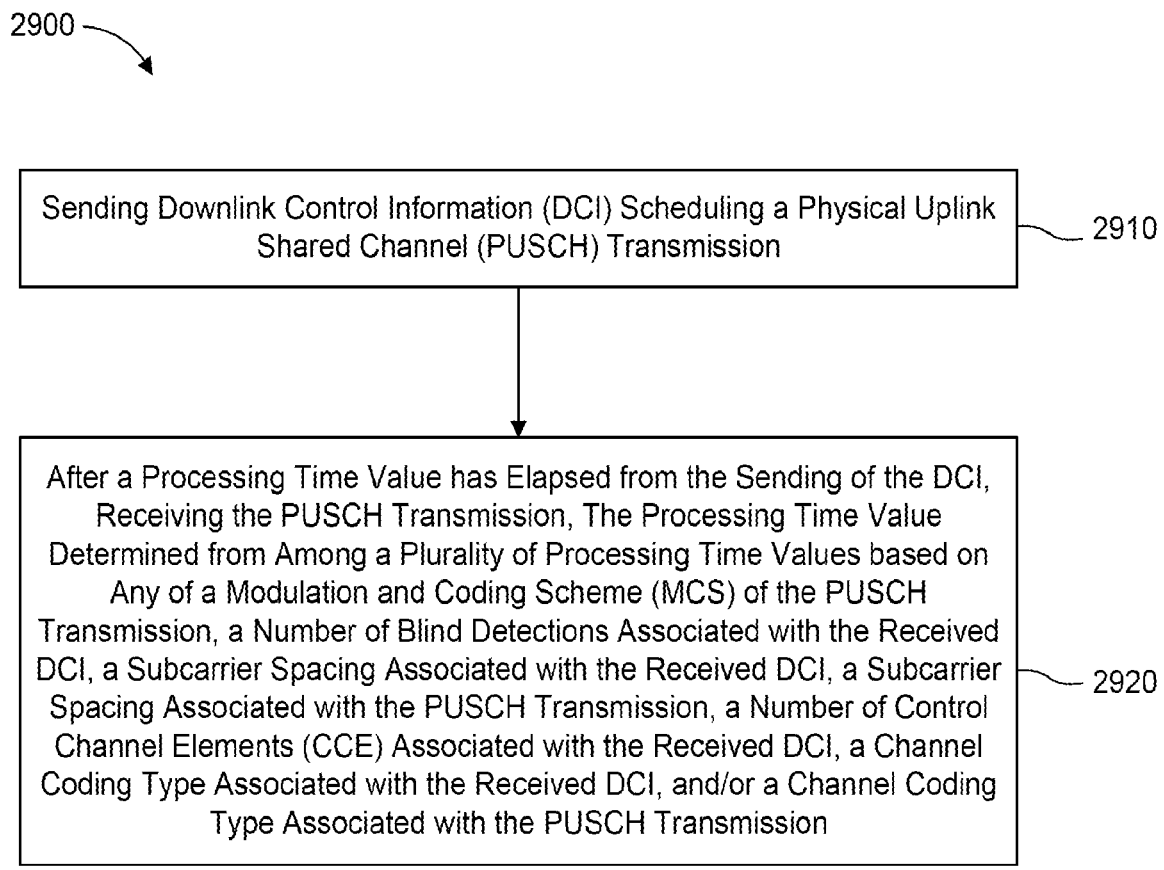
FIG. 29 is a diagram illustrating a representative procedure for a PUSCH transmission based on scheduled information which may be implemented at a base station.

FIG. 29 is a diagram illustrating a representative procedure 2900 for a PUSCH transmission based on scheduled information which may be implemented at a base station. The procedure 2900 may be implemented at a base station (e.g., a gNB 180). As shown in FIG. 29, the procedure 2900 may include SENDING downlink control information (DCI) scheduling a physical uplink shared channel (PUSCH) transmission at 2910. after A processing time value has elapsed from the sending of the DCI, the base station may receive the PUSCH transmission. For example, the processing time value determined from among a plurality of processing time values based on any of a modulation and coding scheme (MCS) of the PUSCH transmission, a number of blind detections associated with the received DCI, a subcarrier spacing associated with the received DCI, a subcarrier spacing associated with the PUSCH transmission, a number of control channel elements (CCE) associated with the received DCI, a channel coding type associated with the received DCI, and/or a channel coding type associated with the PUSCH transmission.

In certain representative embodiments, the determination of the processing time value (e.g., by the WTRU 102) may be based on the respective modulation and coding scheme being less than or equal to a threshold value.

In certain representative embodiments, the determination of the processing time value (e.g., by the WTRU 102) may be based on the number of blind detections associated with a search space where the DCI (e.g., PDCCH transmission) is received.

In certain representative embodiments, the determination of the processing time value (e.g., by the WTRU 102) may be based on the subcarrier spacing associated with the received DCI, which is a subcarrier spacing of the PDCCH transmission in which the received DCI is transmitted, being less than or equal to a threshold.

In certain representative embodiments, the determination of the processing time value (e.g., by the WTRU 102) may be based on the number of CCEs associated with the received DCI (e.g., PDCCH transmission) being less than or equal to a threshold.

In certain representative embodiments, the channel coding type associated with the transmission may be any of a Repetition code, Simplex code, Polar code, Low-density parity-check code, Reed Muller code, Turbo code and/or Convolutional code.

Figure 30:
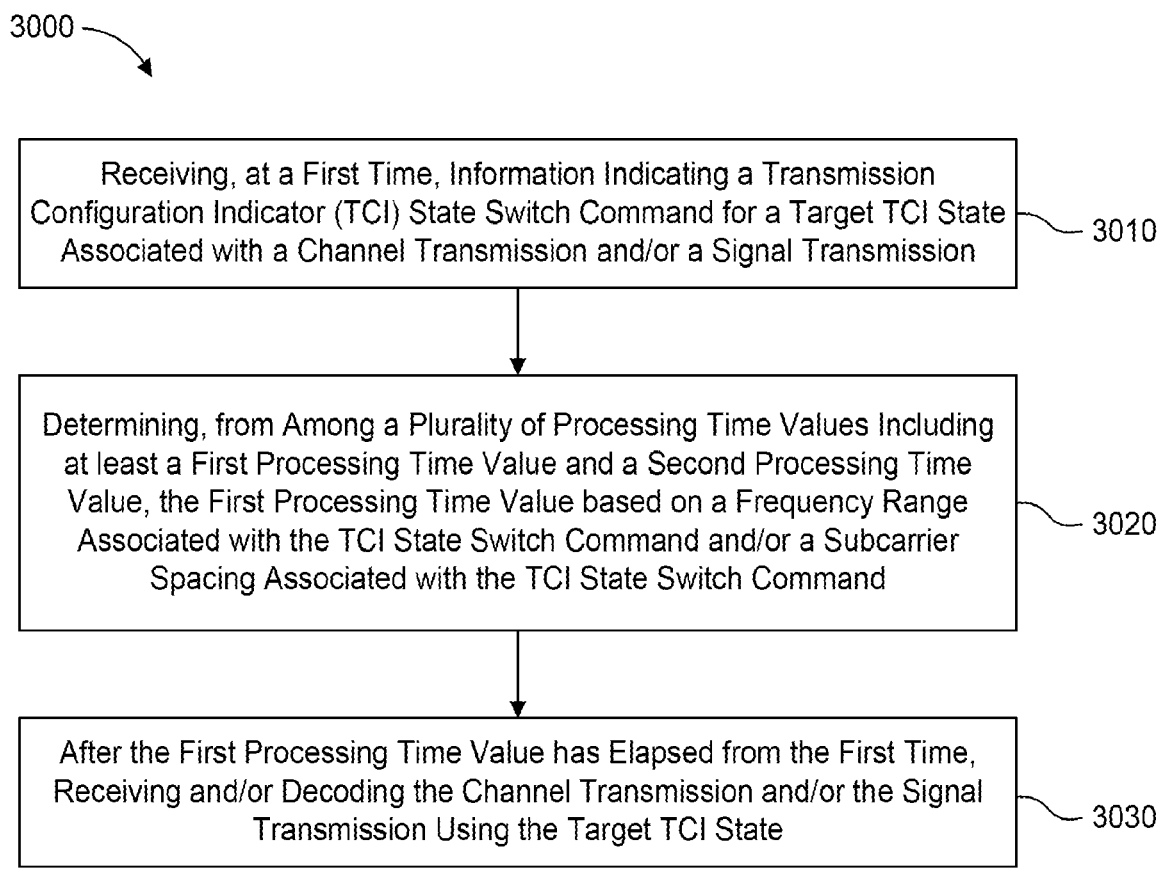
FIG. 30 is a diagram illustrating a representative procedure for determining a processing time for a transmission configuration indicator (TCI) state switch.

FIG. 30 is a diagram illustrating a representative procedure 3000 for determining a processing time for a transmission configuration indicator (TCI) state switch. The procedure 3000 may be implemented at a WTRU 102. As shown in FIG. 23, the procedure 3000 may include receiving, at a first time, information indicating a transmission configuration indicator (TCI) state switch command for a target TCI state associated with a channel transmission and/or a signal transmission at 3010. After 3010, the WTRU may proceed to determining, from among a plurality of processing time values including at least a first processing time value and a second processing time value. For example, the first processing time value may be based on a frequency range associated with the TCI state switch command and/or a subcarrier spacing associated with the TCI state switch command at 3020. After the first processing time value has elapsed from the first time, the WTRU 102 may receive and/or decode the channel transmission and/or the signal transmission using the target TCI state at 3030.

Figure 31:
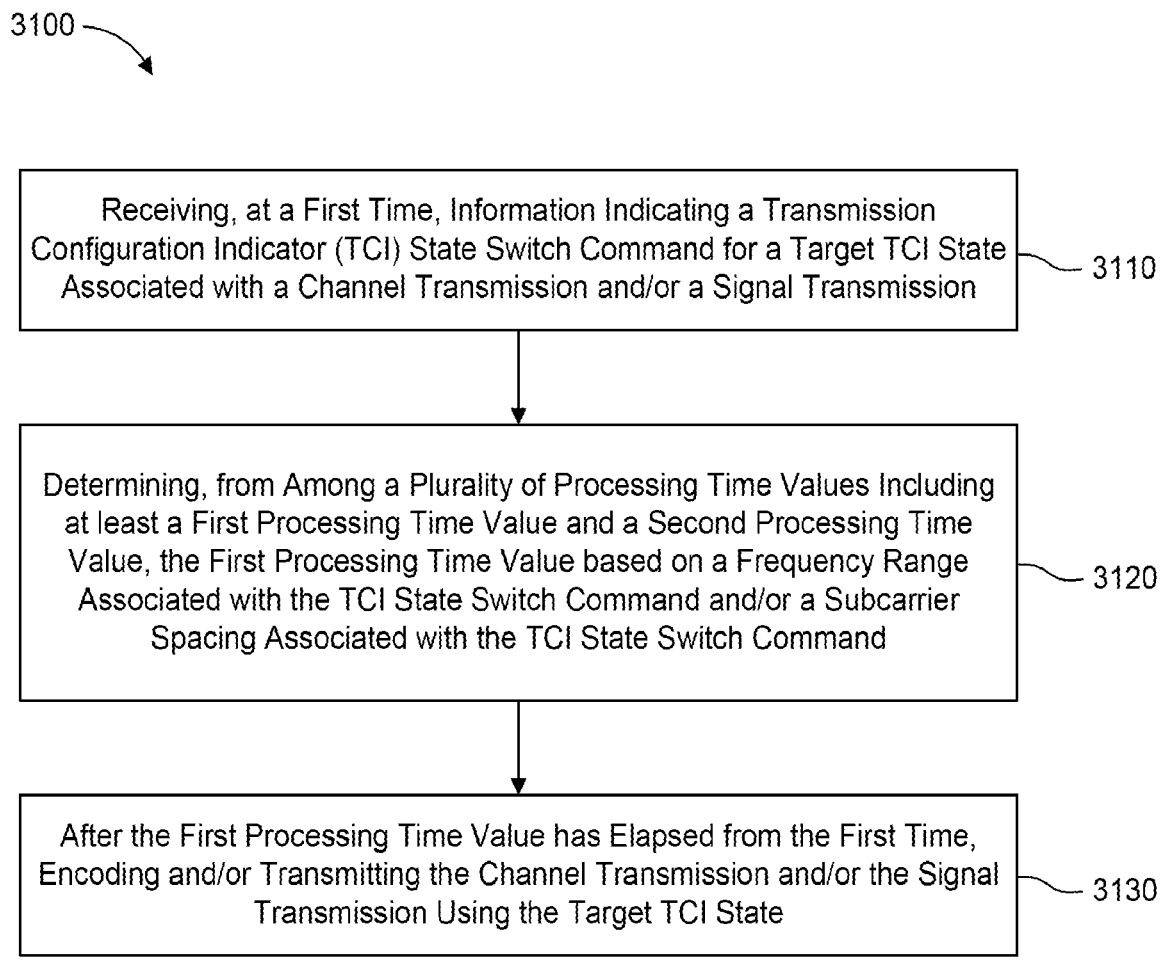
FIG. 31 is a diagram illustrating another representative procedure for determining a processing time for a transmission configuration indicator (TCI) state switch.

FIG. 31 is a diagram illustrating another representative procedure 3100 for determining a processing time for a transmission configuration indicator (TCI) state switch. The procedure 3100 may be implemented at a WTRU 102. As shown in FIG. 31, the procedure 3100 may include receiving, at a first time, information indicating a transmission configuration indicator (TCI) state switch command for a target TCI state associated with a channel transmission and/or a signal transmission at 3110. After 3110, the WTRU 102 may proceed with determining, from among a plurality of processing time values including at least a first processing time value and a second processing time value at 3120. For example, the first processing time value may be based on a frequency range associated with the TCI state switch command and/or a subcarrier spacing associated with the TCI state switch command. After the first processing time value has elapsed from the first time, the WTRU 102 may encode and/or transmit the channel transmission and/or the signal transmission using the target TCI state at 3130.

Figure 32:
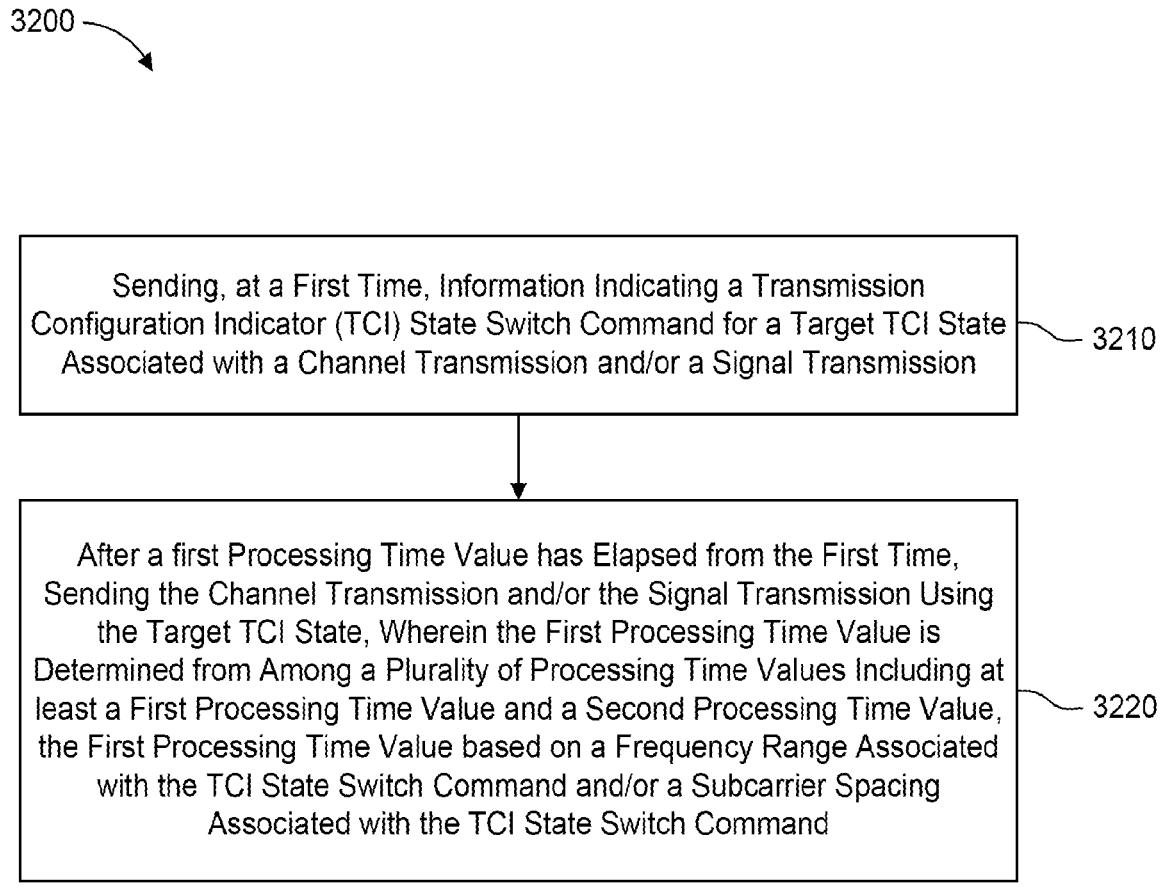
FIG. 32 is a diagram illustrating a representative procedure for a processing time for a transmission configuration indicator (TCI) state switch which may be implemented at a base station.

FIG. 32 is a diagram illustrating a representative procedure 3200 for a processing time for a transmission configuration indicator (TCI) state switch which may be implemented at a base station. The procedure 3200 may be implemented at a base station (e.g., a gNB 180). As shown in FIG. 32, the procedure 3200 may include sending, at a first time, information indicating a transmission configuration indicator (TCI) state switch command for a target TCI state associated with a channel transmission and/or a signal transmission at 3210. After a first processing time value has elapsed from the first time, the base station may proceed to send the channel transmission and/or the signal transmission using the target TCI state at 3220. For example, the first processing time value may be determined (e.g., by a receiving WTRU 102) from among a plurality of processing time values including at least a first processing time value and a second processing time value. The first processing time value may be based on (e.g., correspond to) a frequency range associated with the TCI state switch command and/or a subcarrier spacing associated with the TCI state switch command. The second processing time value may be based on (e.g., correspond to) a frequency range not associated with the TCI state switch command and/or a subcarrier spacing not associated with the TCI state switch command.

Figure 33:
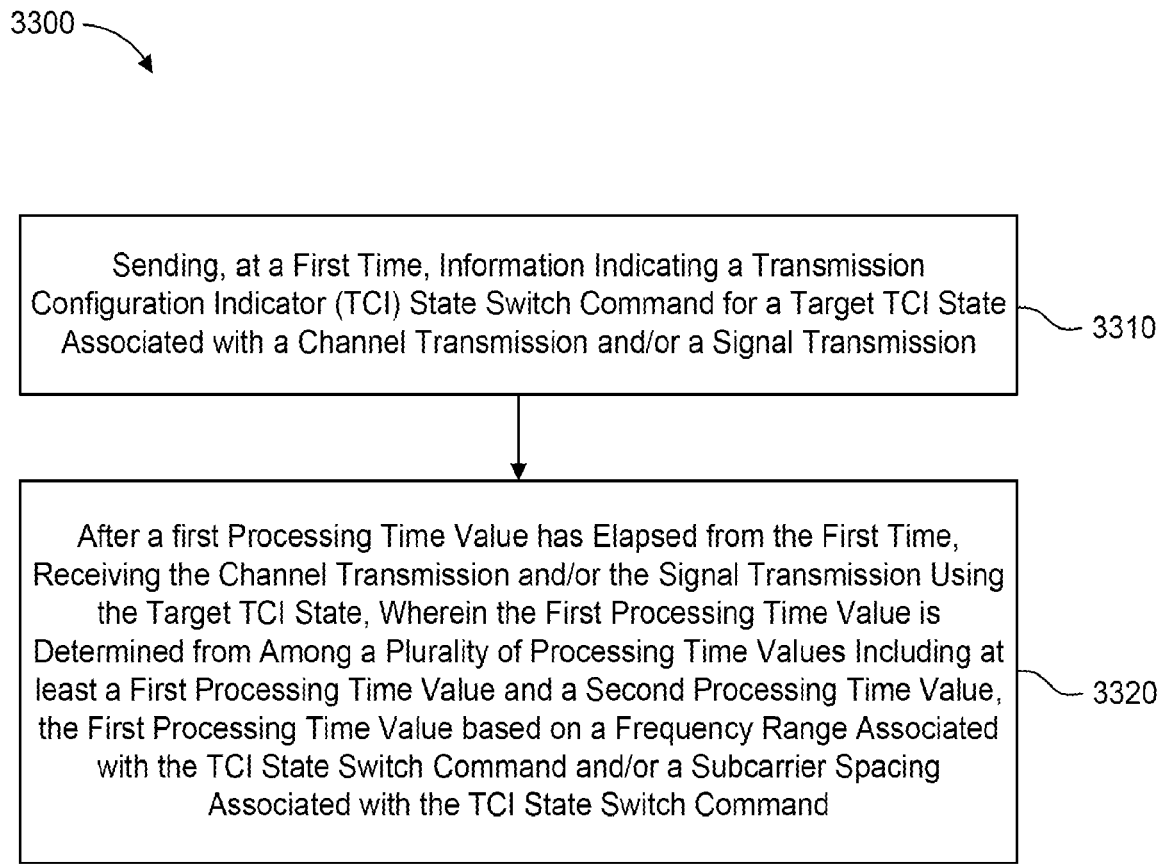
FIG. 33 is a diagram illustrating another representative procedure for a processing time for a transmission configuration indicator (TCI) state switch which may be implemented at a base station.

FIG. 33 is a diagram illustrating another representative procedure 3300 for a processing time for a transmission configuration indicator (TCI) state switch which may be implemented at a base station. The procedure 3300 may be implemented at a base station (e.g., a gNB 180). As shown in FIG. 33, the procedure 3300 may include sending, at a first time, information indicating a transmission configuration indicator (TCI) state switch command for a target TCI state associated with a channel transmission and/or a signal transmission at 3310. After a first processing time value has elapsed from the first time, the base station may receive the channel transmission and/or the signal transmission using the target TCI state at 3320. For example, the first processing time value may be determined (e.g., by a receiving WTRU 102) from among a plurality of processing time values including at least a first processing time value and a second processing time value. The first processing time value may be based on (e.g., correspond to) a frequency range associated with the TCI state switch command and/or a subcarrier spacing associated with the TCI state switch command. The second processing time value may be based on (e.g., correspond to) a frequency range not associated with the TCI state switch command and/or a subcarrier spacing not associated with the TCI state switch command.

In certain representative embodiments, the set of processing time values may each be a respective time period. For example, a first (or second) processing time value in the set may be a time duration, slot, mini-slot, symbol, frame, sub-frame, and/or values/durations thereof. In some instances, the values thereof may refer to minimum values. In some instances, the values thereof may refer to maximum values.

In certain representative embodiments, the first processing time value and the second processing time value may be different. For example, the first processing time value may be less than (or greater than) the second processing time value.

In certain representative embodiments, the WTRU may be capable of or otherwise configured to operate in at least a first frequency range and a second frequency range which is greater than the first frequency range. The first processing time value may be selected (e.g., by the WTRU 102) based on which of the frequency ranges the TCI state switch command is associated with. For example, the frequency range associated with the state switch command may be a frequency range of the transmission of the information indicating the TCI state switch. As another example, the frequency range associated with the state switch command is a frequency range of a channel (or signal) transmission using the target TCI state.

In certain representative embodiments, the WTRU may be capable of or otherwise configured to operate using at least a first subcarrier spacing and a second subcarrier spacing which is greater than the first subcarrier spacing. The first processing time value may be selected (e.g., by the WTRU 102) based on which of the subcarrier spacings the TCI state switch command is associated with. For example, the frequency range associated with the state switch command may be a subcarrier spacing of the transmission of the information indicating the TCI state switch. As another example, the subcarrier spacing associated with the state switch command is a subcarrier spacing of a channel (or signal) transmission using the target TCI state.

In certain representative embodiments, the target TCI state may be associated with a signal quality above a threshold value. For example, the signal quality may be any of SNR, RSRP and/or SINR.

In certain representative embodiments, the determining of the first processing time value may be based on the frequency range associated with the TCI state switch command being less than or equal to a respective threshold, and/or the subcarrier spacing associated with the TCI state switch command being less than or equal to a respective threshold.

In certain representative embodiments, the WTRU 102 may be configured to communicate using a set of subcarrier spacings (e.g., at least a first subcarrier spacing and a second subcarrier spacing which is greater than the first subcarrier spacing). The subcarrier spacing associated with the TCI state switch command may be a larger (e.g., second) frequency range and may be a frequency range of the channel transmission (e.g., using and/or applying the target TCI state).

Figure 34A:
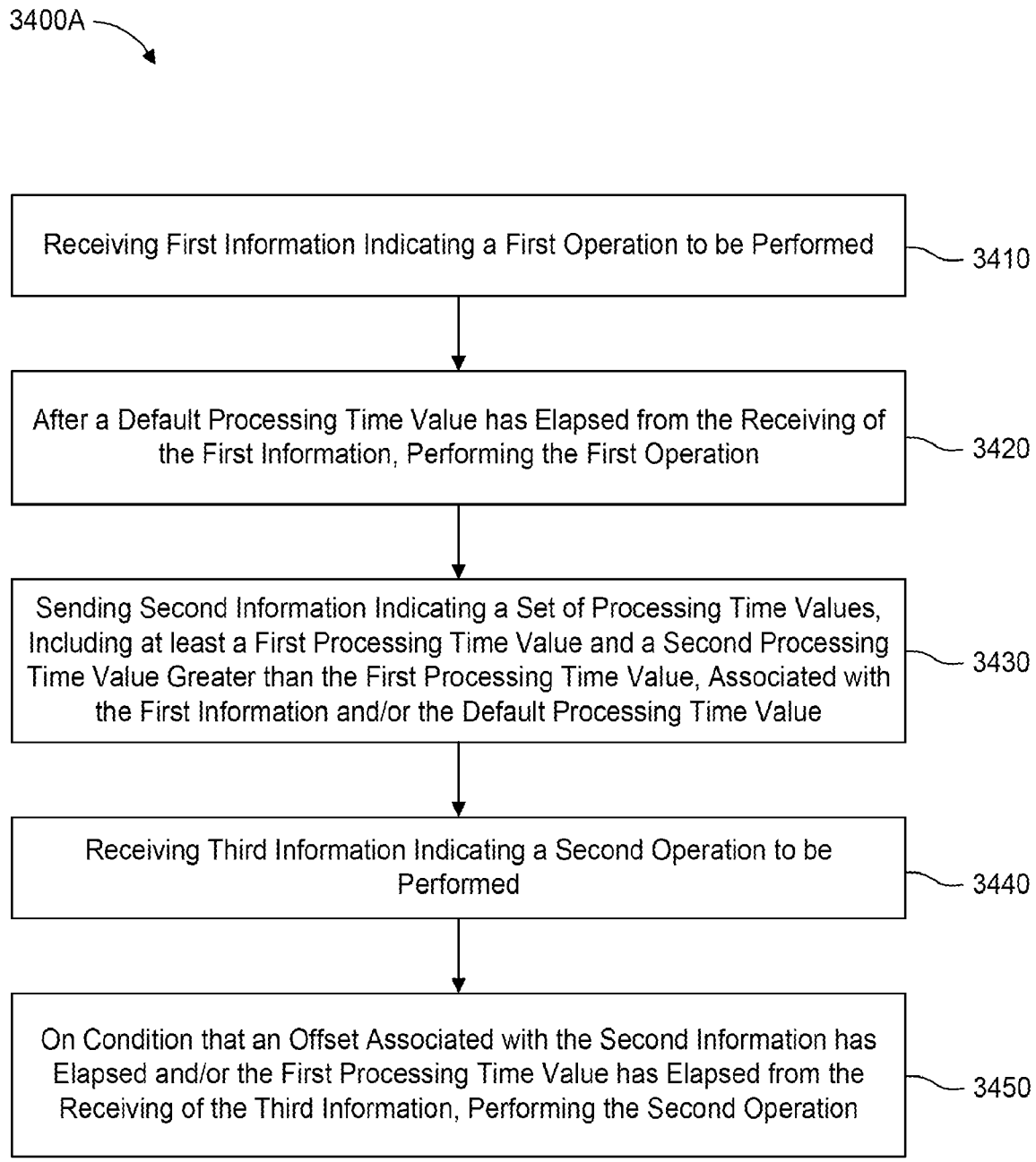
FIG. 34A is a diagram illustrating a representative procedure using a default processing time and a set of processing time values.

FIG. 34A is a diagram illustrating a representative procedure 3400A using a default processing time and a set of processing time values. The procedure 3400A may be implemented at a WTRU 102. As shown in FIG. 34A, the procedure 3400A may include receiving first information indicating a first operation to be performed at 3410. For example, the first operation may be any of a first beam switching, a first transmission configuration indication (TCI) state switching, a first channel transmission and/or a first signal transmission, or another operation as described herein. After a default processing time value has elapsed from the receiving of the first information, the WTRU 102 may perform the first operation at 3420. After 3420, the WTRU 102 may send second information indicating a set of processing time values, including at least a first processing time value and a second processing time value greater than the first processing time value, associated with the first information and/or the default processing time value at 3430. At 3440, the WTRU 102 may receive third information indicating a second operation to be performed. For example, the second operation may be any of a second beam switching, a second transmission configuration indication (TCI) state switching, a second channel transmission and/or a second signal transmission, or another operation as described herein. In certain representative embodiments, the first operation and the second operation may be a same type. For example, the first operation may be a TCI state switch to another TCI state and the second operation may be a TCI state switch to the yet another TCI state. After 3440, on condition that an offset associated with the second information has elapsed and/or the first processing time value has elapsed from the receiving of the third information, the WTRU 102 may perform the second operation at 3450.

Figure 34B:
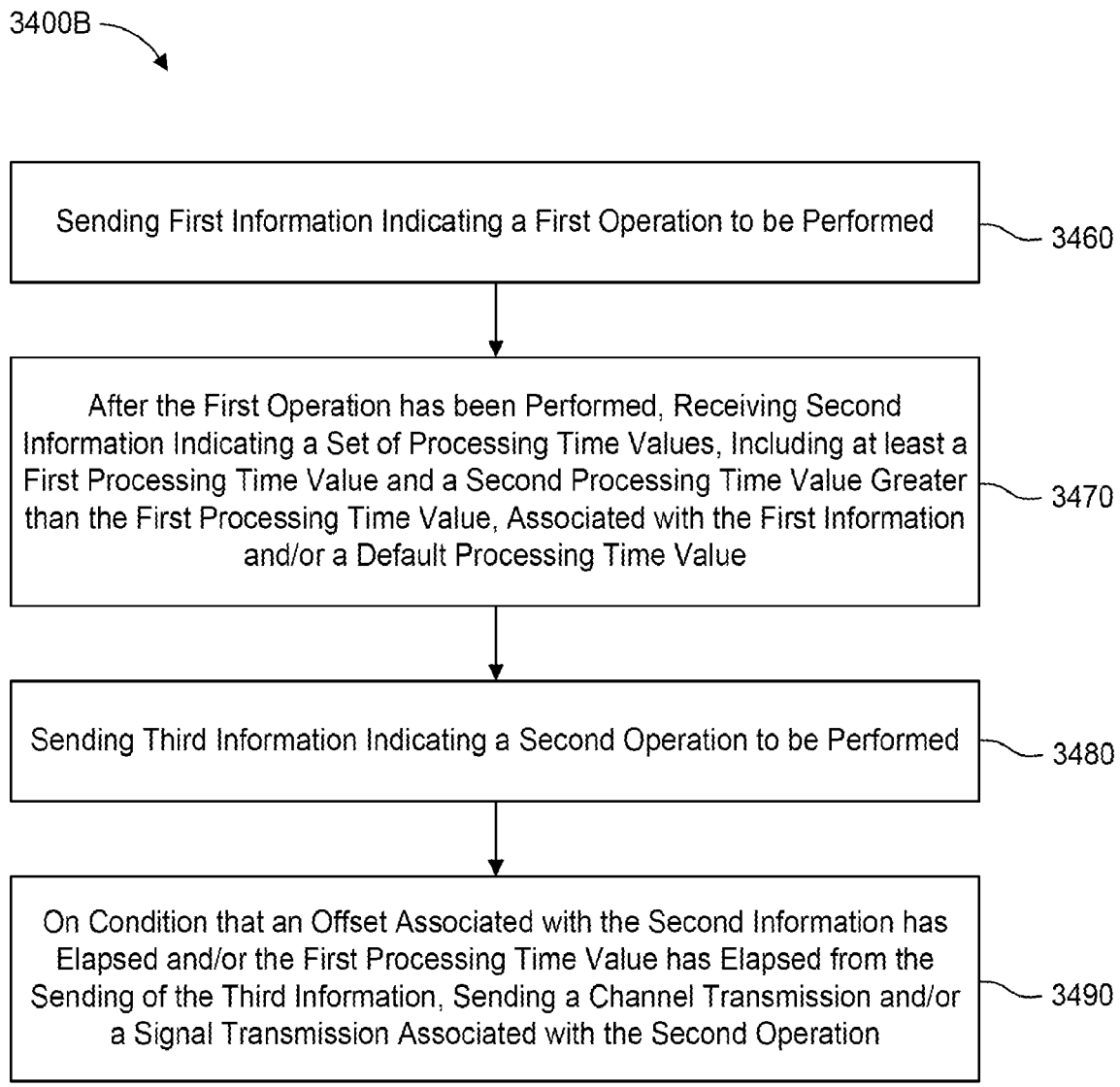
FIG. 34B is a diagram illustrating a representative procedure using a default processing time and a set of processing time values which may be implemented at a base station.

FIG. 34B is a diagram illustrating a representative procedure 3400B using a default processing time and a set of processing time values which may be implemented at a base station. The procedure 3400B may be implemented at a base station (e.g., a gNB 180). As shown in FIG. 34B, the procedure 3400B may include sending first information indicating a first operation to be performed 3460. For example, the first operation may be any of a first beam switching, a first transmission configuration indication (TCI) state switching, a first channel transmission and/or a first signal transmission, or another operation as described herein. After the first operation has been performed, the base station may receive second information indicating a set of processing time values, including at least a first processing time value and a second processing time value greater than the first processing time value, associated with the first information and/or a default processing time value at 3470. At 3480, the base station may send third information indicating a second operation to be performed. For example, the second operation may be any of a second beam switching, a second transmission configuration indication (TCI) state switching, a second channel transmission and/or a second signal transmission, or another operation as described herein. In certain representative embodiments, the first operation and the second operation may be a same type. For example, the first operation may be a TCI state switch to another TCI state and the second operation may be a TCI state switch to the yet another TCI state. After 3480, on condition that an offset associated with the second information has elapsed and/or the first processing time value has elapsed from the sending of the third information, the base station may proceed to send a channel transmission and/or a signal transmission associated with the second operation at 3480.

In certain representative embodiments, the WTRU 102, before receiving the first information, may receive a RRC configuration or re-configuration message. In certain representative embodiments, the WTRU 102, before receiving the first information, may receive information indicating to activate and/or deactivate any of (1) one or more antennas, (2) one or more antenna panels, (3) one or more transmission reception points (TRPs), and/or (4) one or more bandwidth parts (BWPs).

In certain representative embodiments, the offset may be a time period such as time duration, slot, mini-slot, symbol, frame, sub-frame, and/or values/durations thereof. In some instances, the values thereof may refer to minimum values. In some instances, the values thereof may refer to maximum values. For example, the offset may be based on any of a respective subcarrier spacing, a respective frequency range, and/or a respective service type associated with at least a portion of the plurality of processing time values.

In certain representative embodiments, information may be transmitted which indicates and/or confirms that the second information was received (e.g., successfully). For example, the offset (e.g., associated with the third information) may be determined to have elapsed from the receiving of the information indicating/confirming that the second information was received. In some representative embodiments, the confirmation may include information indicating to apply the first processing time value.

In certain representative embodiments, the second information indicating the plurality of processing time values may be a report of any of a service type, a processing time type, a subcarrier spacing and/or a frequency range. The processing time values may be associated (e.g., at the WTRU 102 and/or the base station) with the service type, processing time type, subcarrier spacing and/or frequency range. For example, the processing time type may be indicated by scrambling using a radio network temporary identifier (RNTI) or a logical channel identifier (LCID).

In certain representative embodiments, the information indicating the plurality of processing time values may be differential values relative to the default processing time value.

In certain representative embodiments, the plurality of processing time values may be predefined values and/or configured values.

Figure 35:
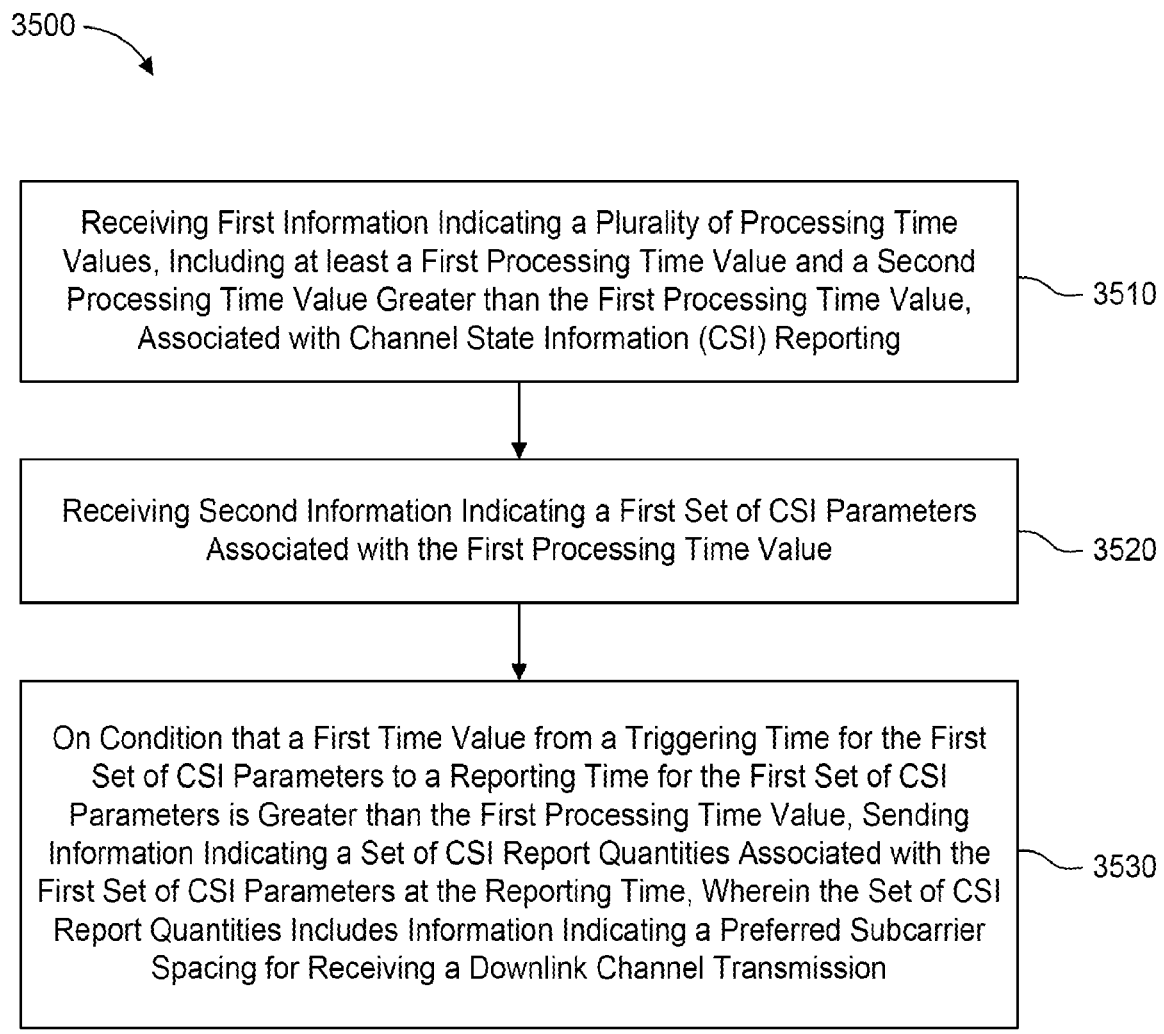
FIG. 35 is a diagram illustrating a representative procedure for channel state information (CSI) reporting with multiple processing times.

FIG. 35 is a diagram illustrating a representative procedure for channel state information (CSI) reporting with multiple processing times. The procedure 3500 may be implemented at a WTRU 102. As shown in FIG. 35, the procedure 3500 may include receiving first information indicating a plurality of processing time values, including at least a first processing time value and a second processing time value greater than the first processing time value, associated with channel state information (CSI) reporting at 3510. At 3520, the WTRU 102 may proceed to receive second information indicating a first set of CSI parameters associated with the first processing time value. At 3530, on condition that a first time value from a triggering time for the first set of CSI parameters to a reporting time for the first set of CSI parameters is greater than the first processing time value, the WTRU 102 may send information indicating a set of CSI report quantities associated with the first set of CSI parameters at the reporting time. For example, the set of CSI report quantities includes information indicating a preferred subcarrier spacing for receiving a downlink channel transmission.

Figure 36:
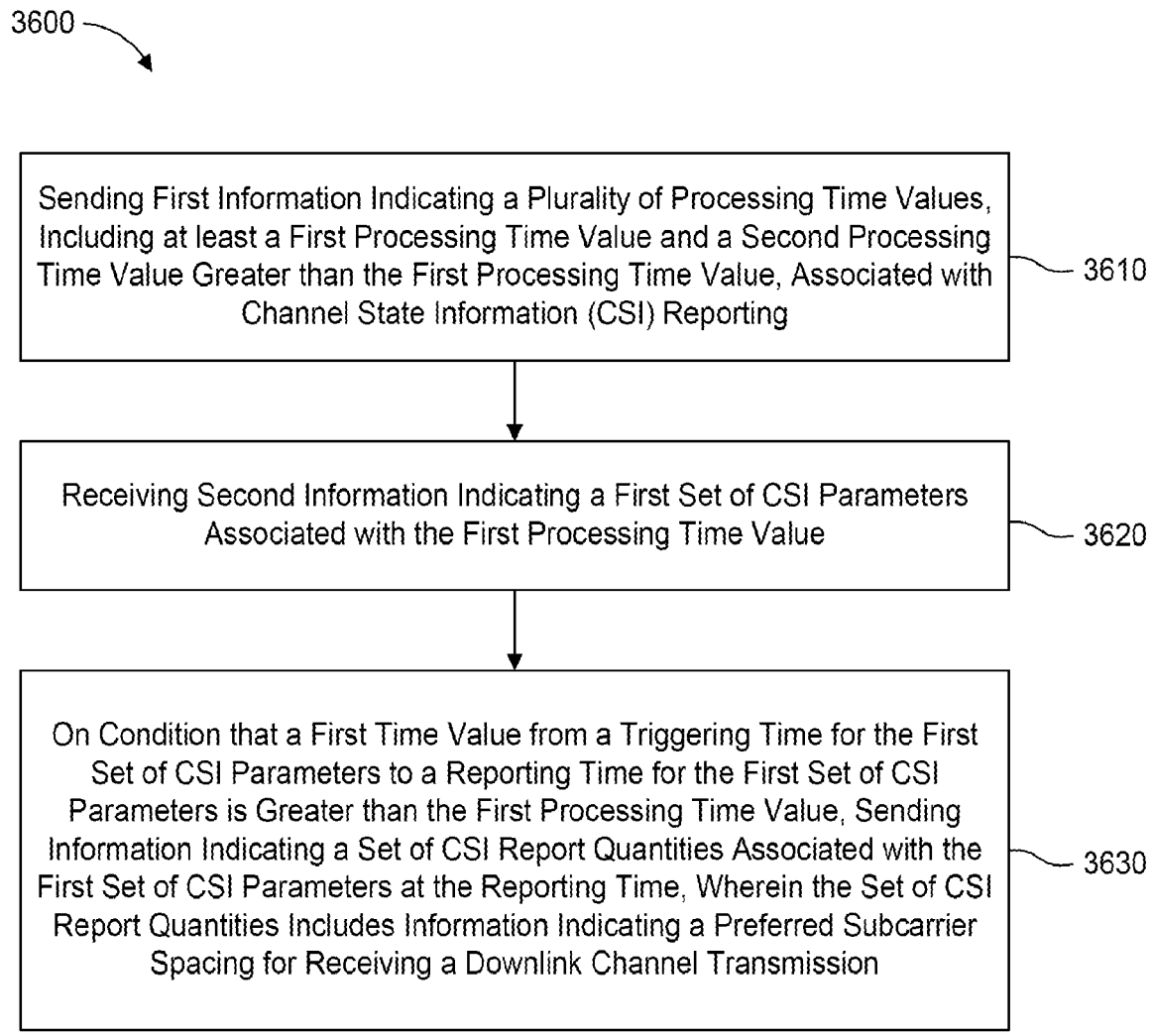
FIG. 36 is a diagram illustrating another representative procedure for channel state information (CSI) reporting with multiple processing times.

FIG. 36 is a diagram illustrating another representative procedure 3600 for channel state information (CSI) reporting with multiple processing times. The procedure 3600 may be implemented at a WTRU 102. As shown in FIG. 36, the procedure 3600 may include sending first information indicating a plurality of processing time values, including at least a first processing time value and a second processing time value greater than the first processing time value, associated with channel state information (CSI) reporting at 3610. After 3610, the WTRU 102 may proceed to receive second information indicating a first set of CSI parameters associated with the first processing time value at 3620. At 3630, on condition that a first time value (e.g., amount of time) from a triggering time for the first set of CSI parameters to a reporting time for the first set of CSI parameters is greater than the first processing time value, the WTRU 102 may send information indicating a set of CSI report quantities associated with the first set of CSI parameters at the reporting time. For example, the set of CSI report quantities may include information indicating a preferred subcarrier spacing for receiving a downlink channel transmission.

Figure 37:
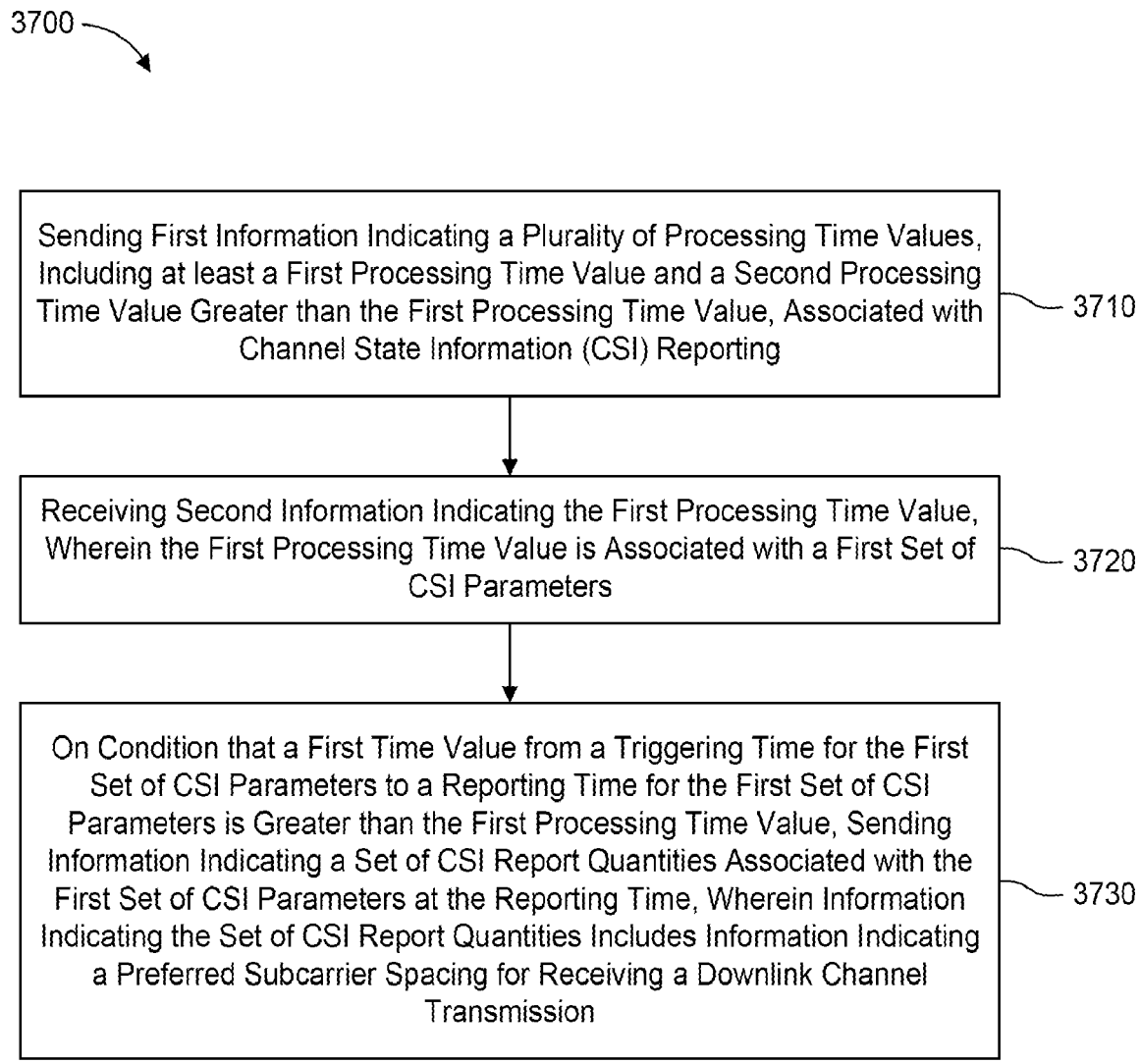
FIG. 37 is a diagram illustrating another representative procedure for channel state information (CSI) reporting with multiple processing times.

FIG. 37 is a diagram illustrating another representative procedure 3700 for channel state information (CSI) reporting with multiple processing times. The procedure 3700 may be implemented at a WTRU 102. As shown in FIG. 37, the procedure 3700 may include sending first information indicating a plurality of processing time values, including at least a first processing time value and a second processing time value greater than the first processing time value, associated with channel state information (CSI) reporting at 3710. after 3710, the WTRU 102 may proceed to receive second information indicating the first processing time value, wherein the first processing time value is associated with a first set of CSI parameters at 3720. after 3720, on condition that a first time value (e.g., amount of time) from a triggering time for the first set of CSI parameters to a reporting time for the first set of CSI parameters is greater than the first processing time value, the WTRU 102 may send information indicating a set of CSI report quantities associated with the first set of CSI parameters at the reporting time. For example, the information indicating the set of CSI report quantities includes information indicating a preferred subcarrier spacing for receiving a downlink channel transmission.

Figure 38:
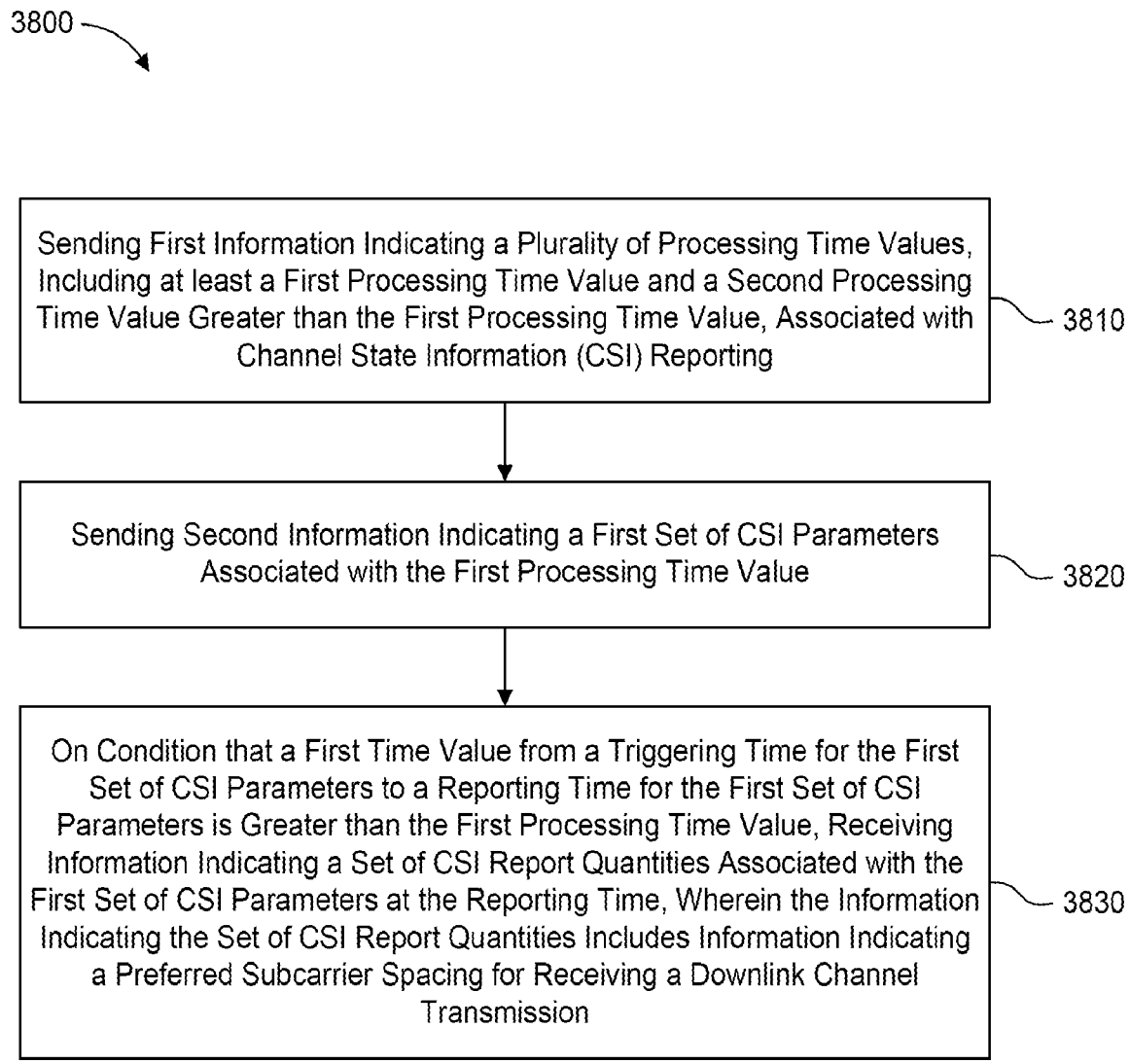
FIG. 38 is a diagram illustrating a representative procedure for channel state information (CSI) reporting with multiple processing times which may be implemented at a base station.

FIG. 38 is a diagram illustrating a representative procedure 3800 for channel state information (CSI) reporting with multiple processing times which may be implemented at a base station. The procedure 3800 may be implemented at a base station (e.g., a gNB 180). As shown in FIG. 38, the procedure 3800 may include sending first information indicating a plurality of processing time values, including at least a first processing time value and a second processing time value greater than the first processing time value, associated with channel state information (CSI) reporting at 3810. After 3810, the base station may proceed to send second information indicating a first set of CSI parameters associated with the first processing time value at 3820. At 3830, on condition that a first time value from a triggering time for the first set of CSI parameters to a reporting time for the first set of CSI parameters is greater than the first processing time value, the base station may receive information indicating a set of CSI report quantities associated with the first set of CSI parameters at the reporting time. For example, the information indicating the set of CSI report quantities may include information indicating a preferred subcarrier spacing for receiving a downlink channel transmission.

Figure 39:
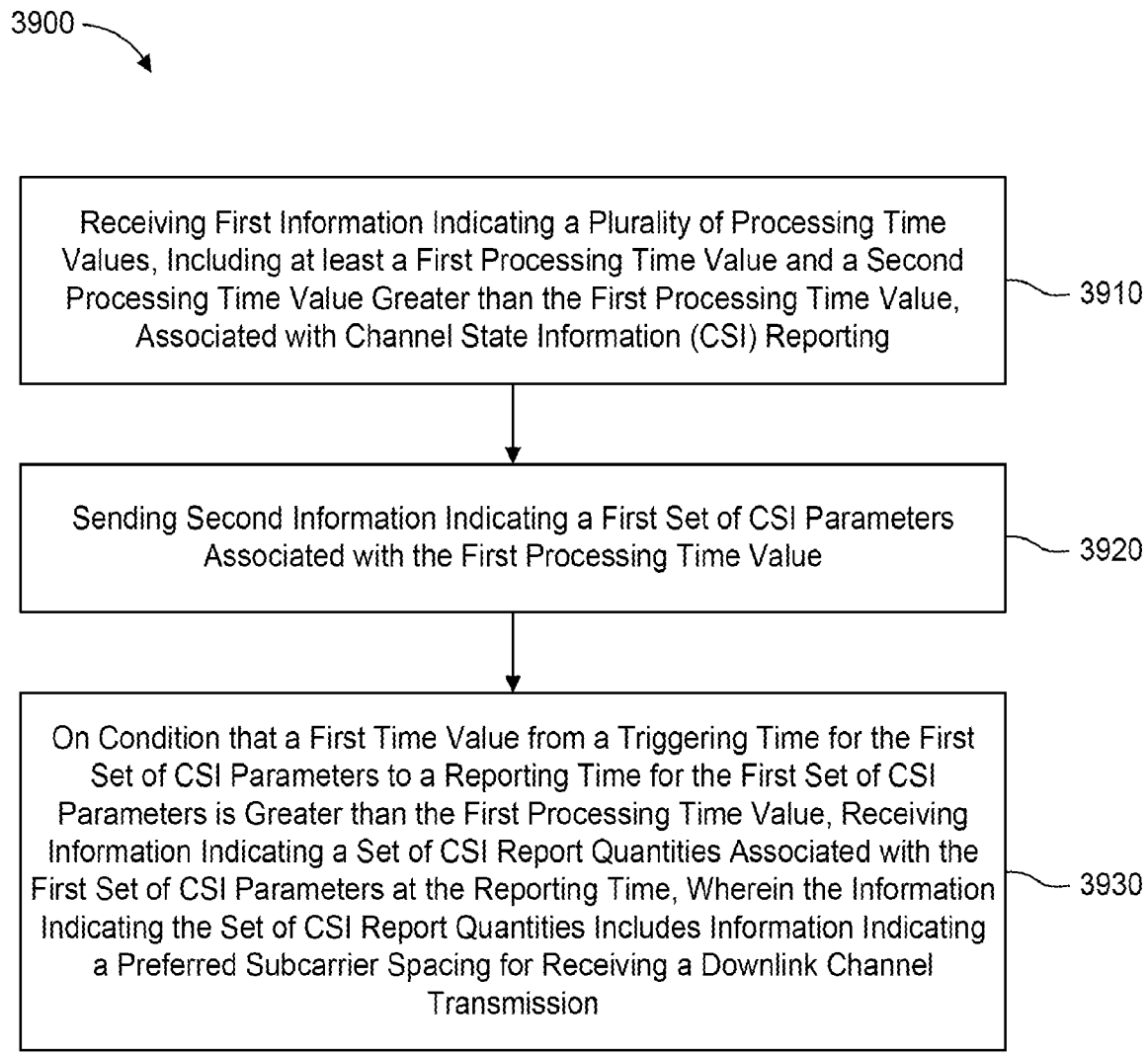
FIG. 39 is a diagram illustrating another representative procedure for channel state information (CSI) reporting with multiple processing times which may be implemented at a base station.

FIG. 39 is a diagram illustrating another representative procedure for channel state information (CSI) reporting with multiple processing times which may be implemented at a base station. The procedure 3900 may be implemented at a base station (e.g., a gNB 180). As shown in FIG. 39, the procedure 3900 may include receiving first information indicating a plurality of processing time values, including at least a first processing time value and a second processing time value greater than the first processing time value, associated with channel state information (CSI) reporting. after 3910, the base station may proceed to send second information indicating a first set of CSI parameters associated with the first processing time value at 3920. on condition that a first time value from a triggering time for the first set of CSI parameters to a reporting time for the first set of CSI parameters is greater than the first processing time value, the base station may proceed to receive information indicating a set of CSI report quantities associated with the first set of CSI parameters at the reporting time at 3930. for example, the information indicating the set of CSI report quantities includes information indicating a preferred subcarrier spacing for receiving a downlink channel transmission.

Figure 40:
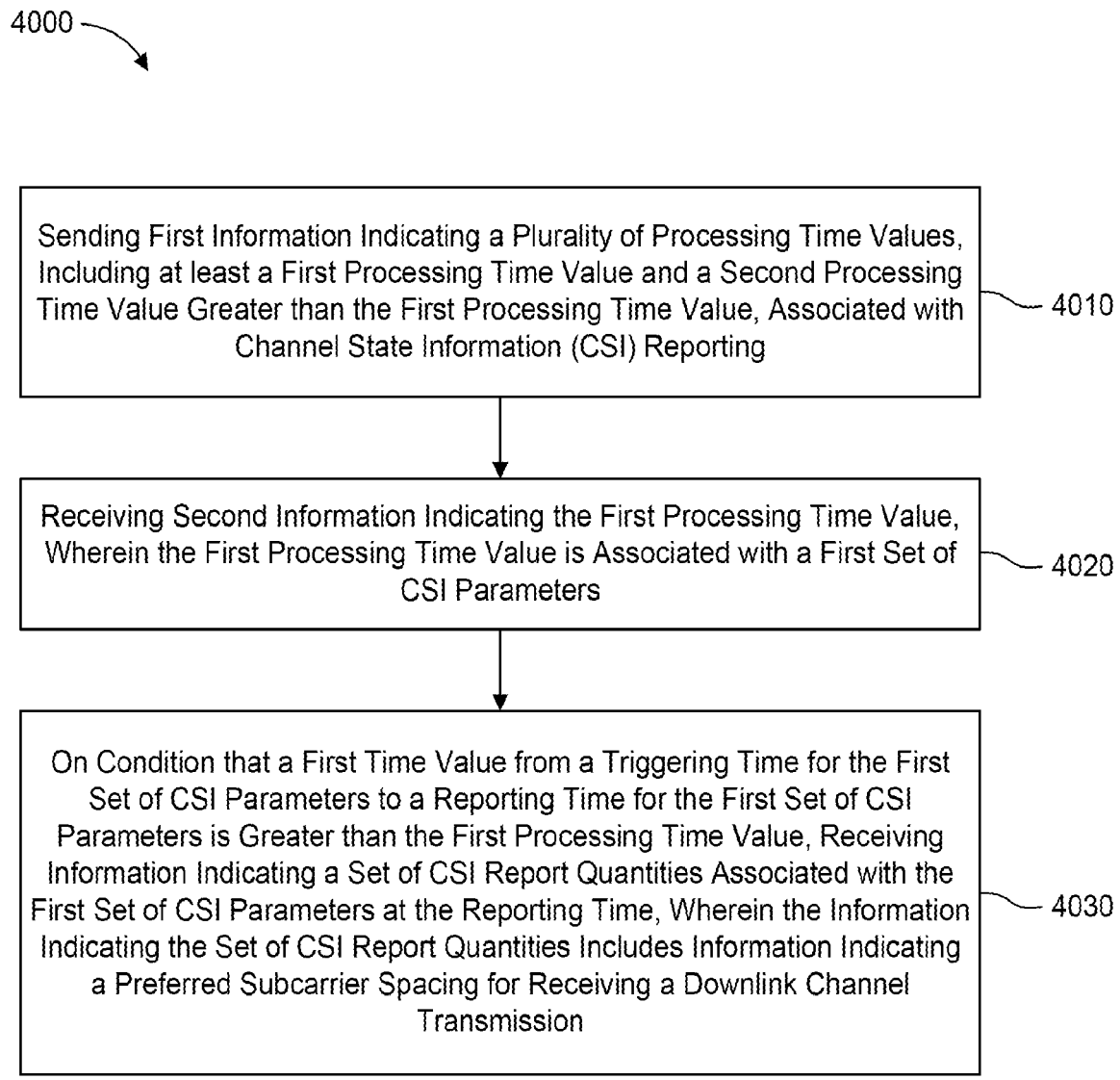
FIG. 40 is a diagram illustrating another representative procedure for channel state information (CSI) reporting with multiple processing times which may be implemented at a base station.

FIG. 40 is a diagram illustrating another representative procedure for channel state information (CSI) reporting with multiple processing times which may be implemented at a base station. The procedure 4000 may be implemented at a base station (e.g., a gNB 180). As shown in FIG. 40, the procedure 4000 may include sending first information indicating a plurality of processing time values, including at least a first processing time value and a second processing time value greater than the first processing time value, associated with channel state information (CSI) reporting at 4010. After 4010, the base station may proceed to receive second information indicating the first processing time value, wherein the first processing time value is associated with a first set of CSI parameters at 4020. After, on condition that a first time value from a triggering time for the first set of CSI parameters to a reporting time for the first set of CSI parameters is greater than the first processing time value, the base station may receive information indicating a set of CSI report quantities associated with the first set of CSI parameters at the reporting time at 4030. For example, the information indicating the set of CSI report quantities includes information indicating a preferred subcarrier spacing for receiving a downlink channel transmission.

In certain representative embodiments, the plurality of processing time values are associated with WTRU capabilities as described herein. In certain representative embodiments, the plurality of processing time values are predefined time values. For example, the time values may be any of a time duration, slot, mini-slot, symbol, frame, sub-frame, and/or values/durations thereof. In some instances, the values thereof may refer to minimum values. In some instances, the values thereof may refer to maximum values.

In certain representative embodiments, the WTRU 102 may receive information indicating one or more system parameters and/or measure one or more channel conditions. The plurality of processing time values may be associated with (e.g., a the WTRU 102 and/or the gNB 180) one or more of the system parameters and/or one or more of the channel conditions. For example, the system parameters may include any of a frequency range, bandwidth, subcarrier spacing, cell identifier, WTRU scheduling parameter, CSI reporting configuration, WTRU identifier, and/or BWP configuration. For example, the channel conditions may include any of range of reported CQI, rank, L1-RSRP, and/or L1-SINR.

In certain representative embodiments, the WTRU 102 may receive (e.g., prior to sending the preferred subcarrier spacing) third information indicating a set of candidate subcarrier spacings, the set of subcarrier spacings including the preferred subcarrier spacing. For example, the second information and/or the third information may be transmitted in any of one or more MAC CEs and/or one or more RRC configurations.

In certain representative embodiments, the second information may be included in any of a CSI resource configuration, a CSI report configuration, a CSI-RS resource set, a CSI aperiodic trigger state list, and/or a CSI associated report configuration.

In certain representative embodiments, the information indicating the preferred subcarrier spacing may be a preferred subcarrier spacing index (PSI).

In certain representative embodiments, any of the processing time values may be a time duration, slot, mini-slot, symbol, frame, sub-frame, and/or values/durations thereof. In some instances, the values thereof may refer to minimum values. In some instances, the values thereof may refer to maximum values.

Figure 41:
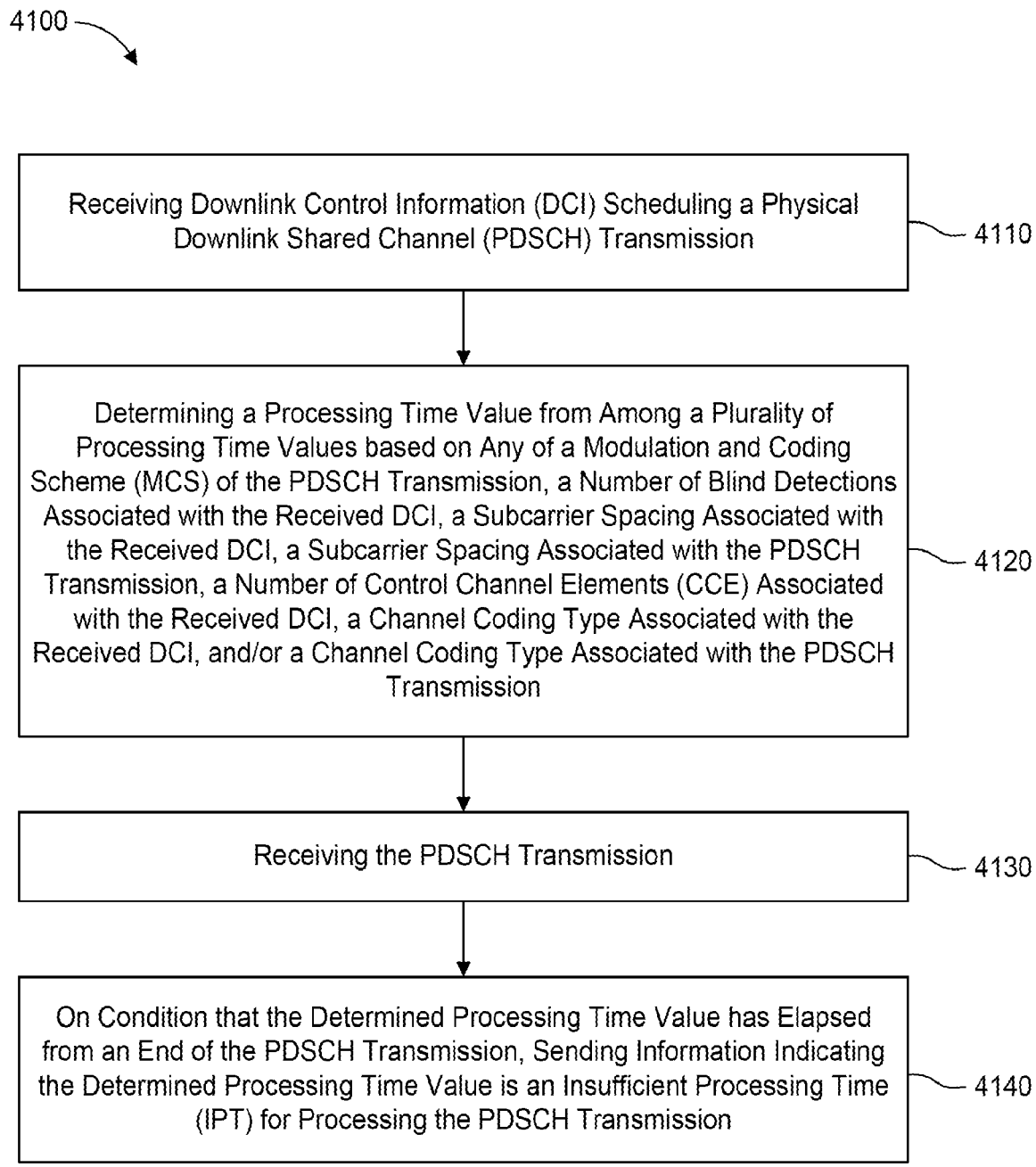
FIG. 41 is a diagram illustrating a representative procedure for reporting insufficient processing time.

FIG. 41 is a diagram illustrating a representative procedure 4100 for reporting insufficient processing time. The procedure 4100 may be implemented at a WTRU 102. As shown in FIG. 41, the procedure 4100 may include receiving downlink control information (DCI) scheduling a physical downlink shared channel (PDSCH) transmission at 4110. After 4110, the WTRU 102 may proceed with determining a processing time value from among a plurality of processing time values based on any of a modulation and coding scheme (MCS) of the PDSCH transmission, a number of blind detections associated with the received DCI, a subcarrier spacing associated with the received DCI, a subcarrier spacing associated with the PDSCH transmission, a number of control channel elements (CCE) associated with the received DCI, a channel coding type associated with the received DCI, and/or a channel coding type associated with the PDSCH transmission at 4120. After 4120, the WTRU 102 may receive the PDSCH transmission at 4130. At 4140, on condition that the determined processing time value has elapsed from an end of the PDSCH transmission, the WTRU 102 information indicating the determined processing time value is an insufficient processing time (IPT) for processing the PDSCH transmission.

Figure 42:
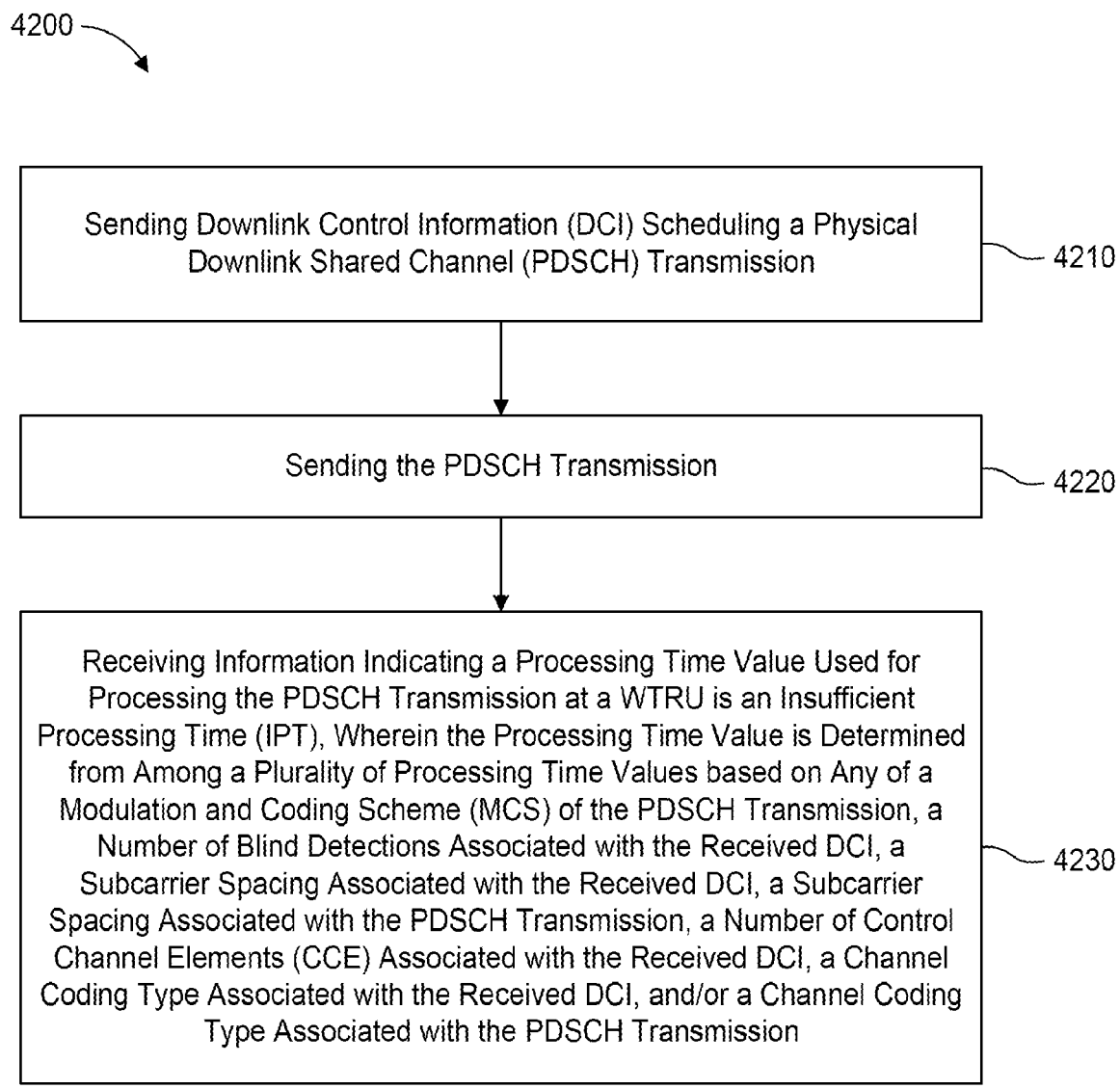
FIG. 42 is a diagram illustrating a representative procedure for reporting insufficient processing time which may be implemented at a base station.

FIG. 42 is a diagram illustrating a representative procedure 4200 for reporting insufficient processing time which may be implemented at a base station. The procedure 4200 may be implemented at a base station (e.g., a gNB 180). As shown in FIG. 42, the procedure 4200 may include sending downlink control information (DCI) scheduling a physical downlink shared channel (PDSCH) transmission (e.g., to a WTRU 102) at 4210. After 4210, the base station may proceed to send the PDSCH transmission at 4230. At 4230, the base station may receive information indicating a processing time value used for processing the PDSCH transmission at a WTRU is an insufficient processing time (IPT). For example, the processing time value may be determined (e.g., by the WTRU 102) from among a plurality of processing time values based on any of a modulation and coding scheme (MCS) of the PDSCH transmission, a number of blind detections associated with the received DCI, a subcarrier spacing associated with the received DCI, a subcarrier spacing associated with the PDSCH transmission, a number of control channel elements (CCE) associated with the received DCI, a channel coding type associated with the received DCI, and/or a channel coding type associated with the PDSCH transmission.

In certain representative embodiments, the information indicating the determined processing time value is IPT for the PDSCH transmission may be a negative acknowledgment (NACK) for the received PDSCH transmission. In certain representative embodiments, the IPT may be included in any of a MAC CE and/or UCI (e.g., a PUCCH and/or PUSCH transmission).

In certain representative embodiments, a method may be implemented in a wireless transmit/receive unit (WTRU) which includes receiving a first transmission from a network entity, determining a processing time value from among a plurality of processing time values based on one or more parameters or characteristics associated with the first transmission, and processing a response to the first transmission no earlier than a time derived from or associated with the determined processing time value or no later than a time derived from or associated with the determined processing time value.

For example, the first transmission may be a downlink shared channel transmission, and the response may be an uplink control channel transmission.

For example, the one or more parameters include any of: a reception time, a subcarrier spacing, a frequency range, a TCI state, a number of beams, a number of antenna panels, a number of transmission reception points (TRPs), a channel configuration, a channel parameter, a reference signal, a search space parameter, a type or category of a listen-before-talk (LBT) operation, a scheduled parameter of the first transmission, a scheduled parameter of the response to the first transmission, a link type of the first transmission, a link type of the response to the first transmission, a WTRU capability, and/or a power parameter.

For example, the determining of the processing time value from among the plurality of processing time values may be based on any of a parameter associated with the first transmission, a parameter associated with the response to the first transmission and/or based on a WTRU state. The WTRU state may be an activated TCI state or deactivated TCI state.

In certain representative embodiments, a method may be implemented in a wireless transmit/receive unit (WTRU) which includes receiving a first transmission on a first channel from a network entity, determining a processing time value from among a plurality of processing time values based on one or more parameters, and configuring the WTRU to monitor for a second transmission on a second channel no earlier than the determined processing time value. The one or more parameters are associated with the first transmission and/or the second transmission.

For example, the first channel is a downlink control channel transmission which schedules the second channel, the second channel is a downlink shared channel, and the one or more parameters include any of a relative size of the first channel and the second channel, a reception time, a subcarrier spacing, a frequency range, a TCI state, a number of beams, a number of antenna panels, a number of transmission reception points (TRPs), a channel configuration, a channel parameter, a reference signal, a search space parameter, a type or category of a listen-before-talk (LBT) operation, a scheduled parameter of the first transmission, a scheduled parameter of the response to the first transmission, a link type of the first transmission, a link type of the response to the first transmission, a WTRU capability, and/or a power parameter.

For example, the one or more parameters include a relative subcarrier spacing of the first channel and the second channel.

For example, the method may also include receiving a start of the second transmission no earlier than the determined processing time value from an end of the first transmission or receiving an end of the second transmission no later than the determined processing time value from a start of the first transmission.

In certain representative embodiments, a method may be implemented in a wireless transmit/receive unit (WTRU) which includes receiving a first transmission on a first channel from a network entity, determining a processing time value from among a plurality of processing time values based on one or more parameters and based on a bandwidth part operation, and processing a response to the first transmission no earlier than the determined processing time value on a second channel. The one or more parameters are associated with the first transmission and/or the response to the first transmission.

For example, the first channel may be a downlink control channel transmission which schedules the second channel, the second channel may be an uplink shared channel, and the one or more parameters may include any of: a reception time, a subcarrier spacing, a frequency range, a TCI state, a number of beams, a number of antenna panels, a number of transmission reception points (TRPs), a channel configuration, a channel parameter, a reference signal, a search space parameter, a type or category of a listen-before-talk (LBT) operation, a scheduled parameter of the first transmission, a scheduled parameter of the response to the first transmission, a link type of the first transmission, a link type of the response to the first transmission, a WTRU capability and/or a power parameter.

For example, the bandwidth part operation may include a bandwidth part switch between a first bandwidth part and a second bandwidth part, and the one or more parameters include a frequency difference between the first and second bandwidth parts.

For example, the processing of the response to the first transmission may include starting the transmission of a first prefix of the response no earlier than the determined processing time value after an end symbol of the first transmission or includes starting the transmission of a last symbol of the response no later than the determined processing time value after an end symbol of the first transmission.

For example, the second channel may be an uplink shared channel.

In certain representative embodiments, a method may be implemented in a wireless transmit/receive unit (WTRU) which includes receiving an indication to perform a bandwidth part switch, determining a processing time value from among a plurality of processing time values based on a WTRU capability and based on a frequency parameter associated with the bandwidth part switch, and activating a bandwidth part for the bandwidth part switch no earlier than the determined processing time value or deactivating another bandwidth part for the bandwidth part switch no later than the determined processing time value.

For example, the WTRU capability may be a time value, and the frequency parameter may be a subcarrier spacing of the activated bandwidth part and/or an activated bandwidth part.

For example, the determining of the processing time value from among the plurality of processing time values may be further based on one or more parameters including any of: a reception time, a frequency range, a TCI state, a number of beams, a number of antenna panels, a number of transmission reception points (TRPs), a channel configuration, a channel parameter, a reference signal, a search space parameter, a type or category of a listen-before-talk (LBT) operation, a scheduled parameter of a transmission using the activated and/or deactivated bandwidth part, a link type of the first transmission, a link type of a transmission using the activated and/or deactivated bandwidth part, a WTRU capability, and/or a power parameter.

For example, the bandwidth part operation is a bandwidth part switch.

For example, the indication may be an expiration of a timer configured at the WTRU, and the activating of the bandwidth part may be performed no earlier than the determined processing time value from the indication.

For example, the indication may be the reception of a bandwidth part switch request, and the activating of the bandwidth part may be performed no earlier than the determined processing time value from the reception of the indication.

In certain representative embodiments, a method may be implemented in a wireless transmit/receive unit (WTRU) which includes receiving a control command to perform a bandwidth part switch, determining a processing time value from among a plurality of processing time values based on one or more processing delays associated with the control command and based on a timing of reception of the control command, and activating a bandwidth part for the bandwidth part switch no earlier than the determined processing time value.

For example, the one or more processing delays associated with the control command may include a switch delay and a WTRU processing delay.

For example, the timing may be based on a slot, mini-slot, or sub-frame including an end of the control command.

For example, the determining of the processing time value from among the plurality of processing time values may be based on the one or more processing delays associated with the control command, based on the timing of reception of the control command, and based on a length of a slot, mini-slot, or sub-frame including at least part of the control command.

For example, the control command may be a radio resource control command.

In certain representative embodiments, a method may be implemented in a wireless transmit/receive unit (WTRU) which includes receiving a control command to perform a bandwidth part switch, determining a processing time value from among a plurality of processing time values based on a parameter associated with reception of the control command and based on a parameter for performing the bandwidth part switch, and activating a bandwidth part for the bandwidth part switch no earlier than the determined processing time value.

For example, the activating of the bandwidth part for the bandwidth part switch may be performed no earlier than the determined processing time value from a time at which the control command is received.

For example, the time at which the control command is received may be based on a slot, mini-slot, or sub-frame including an end of the control command.

For example, the processing time value may include a number of symbols to perform processing of a first downlink channel.

For example, the first downlink channel may be a control channel and the bandwidth part may be activated with respect to a shared channel.

For example, the symbols are orthogonal frequency division multiplexing symbols.

For example, the control command may be a downlink control information command.

For example, the method may also include receiving a transmission using the activated bandwidth part no earlier than a time derived from or associated with the determined processing time value. The determining of the processing time of the processing time value from among the plurality of processing time values may be further based on one or more parameters including any of: a reception time, a frequency range, a TCI state, a number of beams, a number of antenna panels, a number of transmission reception points (TRPs), a channel configuration, a channel parameter, a reference signal, a search space parameter, a type or category of a listen-before-talk (LBT) operation, a scheduled parameter of the transmission using the activated bandwidth part, a link type of the transmission, a WTRU capability, and/or a power parameter.

In certain representative embodiments, a method may be implemented in a wireless transmit/receive unit (WTRU) which includes receiving a control command to perform a transmission configuration index (TCI) state switch, determining a processing time value from among a plurality of processing time values based on the TCI state switch and activating a bandwidth part for a target TCI state of the TCI state switch no earlier than a time derived from or associated with the determined processing time value.

For example, the activating of a bandwidth part for the TCI state switch may be performed no earlier than the determined processing time value from a time at which the control command is received.

For example, a time at which the control command is received may be based on a slot, mini-slot, or sub-frame including an end of the control command.

For example, the determining the processing time value from among the plurality of processing time values may be based on an acknowledgment time of the control command, the target TCI state, a synchronization signal transmission time, a synchronization signal processing time, and/or a slot length.

For example, the determining the processing time value from among the plurality of processing time values may be based on a HARQ-ACK time of the control command, whether the target TCI state is an active state or not, a synchronization signal block transmission time, a synchronization signal block processing time, and/or a slot length.

For example, the control command may be a media access control (MAC) control element (CE) command.

For example, the control command may be a radio resource control command.

For example, the method may also include monitoring for a transmission using the activated bandwidth part no earlier than the determined processing time value. The determining of the processing time value from among the plurality of processing time values may be further based on one or more parameters including any of: a reception time, a frequency range, a number of beams, a number of antenna panels, a number of transmission reception points (TRPs), a channel configuration, a channel parameter, a reference signal, a search space parameter, a type or category of a listen-before-talk (LBT) operation, a scheduled parameter of the transmission using the activated bandwidth part, a link type of the first transmission, a link type of the transmission using the activated bandwidth part, a WTRU capability, and/or a power parameter.

For example, the method may also include transmitting information using the activated bandwidth part no earlier than the determined processing time value. The determining of the processing time value from among the plurality of processing time values may be further based on one or more parameters including any of: a reception time, a frequency range, a number of beams, a number of antenna panels, a number of transmission reception points (TRPs), a channel configuration, a channel parameter, a reference signal, a search space parameter, a type or category of a listen-before-talk (LBT) operation, a scheduled parameter of a transmission using the activated bandwidth part, a link type of the first transmission, a link type of a transmission using the activated bandwidth part, a WTRU capability, and/or a power parameter.

For example, the determining the processing time value from among the plurality of processing time values may be based on an acknowledgement time, a type of reference signal, a measurement period of the reference signal, the target TCI state, a quasi-colocation type of the TCI state switch, and/or a slot length.

For example, a reference signal received power may be for a synchronization signal block or a channel state information (CSI) reference signal.

For example, the control command may be a media access control (MAC) control element (CE) command.

For example, the control command may be a radio resource control command.

For example, the method may also include monitoring for a transmission using the activated bandwidth part no earlier than the determined processing time value.

For example, the receiving the transmission may be on a shared channel.

For example, the method may also include transmitting information using the activated bandwidth part no earlier than the determined processing time value.

For example, the method may also include monitoring for a transmission using a deactivated bandwidth part no later than the determined processing time value.

In certain representative embodiments, a method may be implemented in a wireless transmit/receive unit (WTRU) which includes receiving a control command indicating a channel state information (CSI) request, determining a processing time value from among a plurality of processing time values based on the CSI request, processing to provide a CSI report no earlier than the determined processing time value.

For example, the determining of the processing time from among the plurality of processing time values may be based on a CSI type of the CSI request and based on a numerology.

For example, the determining the processing time from among the plurality of processing time values may be further based on a CSI reference signal processing time of a channel measurement or an interference measurement.

For example, the processing to provide the CSI report may include transmitting the CSI report on a channel no earlier than the determined processing time value.

For example, the channel may be a shared channel or an uplink channel.

For example, the determining of the processing time value from among the plurality of processing time values may be further based on one or more parameters including any of: a reception time, a subcarrier spacing, a frequency range, a TCI state, a number of beams, a number of antenna panels, a number of transmission reception points (TRPs), a channel configuration, a channel parameter, a reference signal, a search space parameter, a type or category of a listen-before-talk (LBT) operation, a scheduled parameter of a transmission of the CSI report, a link type of the transmission, a WTRU capability, and/or a power parameter.

In certain representative embodiments, a method may be implemented in a wireless transmit/receive unit (WTRU) which includes receiving a cell command, determining a processing time value from among a plurality of processing time values based on the cell command, and processing to provide a channel state information (CSI) report no earlier than the determined processing time value.

For example, the cell command may be a secondary cell activation command.

For example, the determining the processing time from among the plurality of processing time values may be further based on an acknowledgement time, a cell activation time, and a CSI reporting time.

For example, the cell command may be a secondary cell deactivation command.

For example, the determining the processing time from among the plurality of processing time values may be further based on any of an acknowledgement time, a cell deactivation time, a CSI reporting time, a reception time, a subcarrier spacing, a frequency range, a TCI state, a number of beams, a number of antenna panels, a number of transmission reception points (TRPs), a channel configuration, a channel parameter, a reference signal, a search space parameter, a type or category of a listen-before-talk (LBT) operation, a scheduled parameter of a transmission of the CSI report, a link type of the transmission, a WTRU capability, and/or a power parameter.

For example, the processing to provide the channel state information (CSI) report may include transmitting the CSI report no earlier than the determined processing time value.

In certain representative embodiments, a method may be implemented in a wireless transmit/receive unit (WTRU) which includes determining a processing time value from among a plurality of processing time values to replace a default processing time value associated with a target process, reporting the determined processing time value to a network entity, determining an application time value associated with the determined processing time value based on one or more of a subcarrier spacing, a frequency range, a priority, or a service type, and associating the determined processing time value with the target process according to the determined application time value.

For example, the associating the determined processing time value with the target process at the determined application time value may be after the reporting.

For example, the method may also include receiving a confirmation of the reporting from the network entity. The associating the determined processing time value with the target process according to the determined application time value may be after receiving the confirmation.

For example, the determined processing time value may be a preferred processing time value among the plurality of processing time values.

For example, the determining of the processing time value from among the plurality of processing time values may be further based on any of: a reception time, a subcarrier spacing, a frequency range, a TCI state, a number of beams, a number of antenna panels, a number of transmission reception points (TRPs), a channel configuration, a channel parameter, a reference signal, a search space parameter, a type or category of a listen-before-talk (LBT) operation, a scheduled parameter of a transmission of the CSI report, a link type of the transmission, a WTRU capability, and/or a power parameter.

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

What is claimed is:

1. A method implemented in a wireless transmit/receive unit (WTRU) comprising:
    sending beam switching capability information indicating a set of beam switching time values, wherein the beam switching time values in the set are based on panel information comprising different numbers of active panels;
    receiving information indicating to activate one or more panels;
    receiving information indicating beam switching to a first beam, of a set of one or more active beams, for a transmission, and information indicating an offset for the transmission;
    determining a number of active panels associated with the set of one or more active beams;
    determining a first beam switching time value from among the set of beam switching time values based on the determined number of the active panels associated with the one or more active beams; and
    on condition that the offset is greater than or equal to the determined first beam switching time value, communicating the transmission using the first beam.

2. The method of claim 1, wherein the determining of the number of the active panels associated with the one or more active beams is based on a time duration since the set of one or more active beams were last used.

3. The method of claim 1, wherein the information indicating beam switching to the first beam, of the set of one or more active beams, is received in downlink control information (DCI).

4. The method of claim 3, wherein the offset is determined from the DCI.

5. The method of claim 1, wherein a transmission configuration indicator (TCI) state is associated with the active panels.

6. The method of claim 1, wherein the offset is a number of symbols, mini-slots, slots, sub-frames, frames, or milliseconds, and/or the beam switching time value is a number of symbols, mini-slots, slots, sub-frames, frames, or milliseconds.

7. The method of claim 1, wherein the set of beam switching time values includes the first beam switching time value which is associated with a first number of active panels, and a second beam switching time value which is associated with a second number of active panels.

8. The method of claim 7, wherein the first beam switching time value is less than the second beam switching time value, and/or the first number is less than the second number.

9. The method of claim 1, wherein the communicating the transmission includes sending the transmission using the first beam.

10. The method of claim 1, wherein the communicating the transmission includes receiving the transmission using the first beam.

11. A wireless transmit/receive unit (WTRU) comprising: a processor and a transceiver which are configured to:
   send beam switching capability information indicating a set of beam switching time values, wherein the beam switching time values in the set are based on panel information comprising different numbers of active panels;
   receive information indicating to activate one or more panels;
   receive information indicating beam switching to a first beam, of a set of one or more active beams, for a transmission, and information indicating an offset for the transmission;
   determine a number of active panels associated with the set of one or more active beams;
   determine a first beam switching time value from among the set of beam switching time values based on the determined number of the active panels associated with the one or more active beams; and
   on condition that the offset is greater than or equal to the determined first beam switching time value, communicating the transmission using the first beam.

12. The WTRU of claim 11, wherein the determining of the number of the active panels associated with the one or more active beams is based on a time duration since the set of one or more active beams were last used.

13. The WTRU of claim 11, wherein the information indicating beam switching to the first beam, of the set of one or more active beams, is received in downlink control information (DCI).

14. The WTRU of claim 13, wherein the offset is determined from the DCI.

15. The WTRU of claim 11, wherein a transmission configuration indicator (TCI) state is associated with the active panels.

16. The WTRU of claim 11, wherein the offset is a number of symbols, mini-slots, slots, sub-frames, frames, or milliseconds, and/or the beam switching time value is a number of symbols, mini-slots, slots, sub-frames, frames, or milliseconds.

17. The WTRU of claim 11, wherein the set of beam switching time values includes the first beam switching time value which is associated with a first number of active panels, and a second beam switching time value which is associated with a second number of active panels.

18. The WTRU of claim 17, wherein the first beam switching time value is less than the second beam switching time value, and/or the first number is less than the second number.

19. The WTRU of claim 11, wherein the communicating the transmission includes sending the transmission using the first beam.

20. The WTRU of claim 11, wherein the communicating the transmission includes receiving the transmission using the first beam.

* * * * *